United States Patent
Ohmura et al.

(10) Patent No.: US 10,764,513 B2
(45) Date of Patent: Sep. 1, 2020

(54) COMMUNICATION TERMINAL, IMAGE DATA COMMUNICATION SYSTEM, AND COMMUNICATION METHOD

(71) Applicants: Yohhei Ohmura, Kanagawa (JP);
Kenichiro Morita, Tokyo (JP);
Takafumi Takeda, Tokyo (JP);
Hidekuni Annaka, Saitama (JP);
Takeshi Homma, Kanagawa (JP);
Mayu Hakata, Kanagawa (JP)

(72) Inventors: Yohhei Ohmura, Kanagawa (JP);
Kenichiro Morita, Tokyo (JP);
Takafumi Takeda, Tokyo (JP);
Hidekuni Annaka, Saitama (JP);
Takeshi Homma, Kanagawa (JP);
Mayu Hakata, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/519,216

(22) Filed: Jul. 23, 2019

(65) Prior Publication Data
US 2020/0045244 A1    Feb. 6, 2020

(30) Foreign Application Priority Data

Jul. 31, 2018  (JP) ................................. 2018-144567
Jul. 8, 2019   (JP) ................................. 2019-126955

(51) Int. Cl.
*H04N 7/14*    (2006.01)
*H04N 5/272*   (2006.01)
(Continued)

(52) U.S. Cl.
CPC ......... *H04N 5/272* (2013.01); *H04N 5/23238* (2013.01); *H04N 7/147* (2013.01); *H04N 7/15* (2013.01)

(58) Field of Classification Search
CPC ....................................................... H04N 7/14
See application file for complete search history.

(56) References Cited

U.S. PATENT DOCUMENTS

| | | | |
|---|---|---|---|
| 10,127,632 B1 * | 11/2018 | Burke | ................... G06T 3/4038 |
| 2014/0152764 A1 * | 6/2014 | Kira | ................... G01C 21/3647 |
| | | | 348/36 |

(Continued)

FOREIGN PATENT DOCUMENTS

| | | |
|---|---|---|
| JP | 2011-223076 | 11/2011 |
| JP | 2012-156820 | 8/2012 |
| JP | 2012-178135 | 9/2012 |

*Primary Examiner* — Olisa Anwah
(74) *Attorney, Agent, or Firm* — Oblon, McClelland, Maier & Neustadt, L.L.P.

(57) ABSTRACT

An image data communication system includes: a first communication terminal including first circuitry; and a second communication terminal including second circuitry. The first circuitry of the first communication terminal is configured to transmit a plurality of pieces of image data and layer display order information indicating a layer display order in which a plurality of images represented by the plurality of pieces of image data are to be displayed. The second circuitry of the second communication terminal is configured to display the plurality of images represented by the plurality of pieces of image data transmitted from the first communication terminal in the layer display order based on the layer display order information transmitted from the first communication terminal.

11 Claims, 37 Drawing Sheets

(51) Int. Cl.
*H04N 7/15* (2006.01)
*H04N 5/232* (2006.01)

(56) References Cited

U.S. PATENT DOCUMENTS

| | | |
|---|---|---|
| 2018/0097682 A1 | 4/2018 | Yoshida et al. |
| 2018/0098105 A1 | 4/2018 | Morita et al. |
| 2018/0191787 A1 | 7/2018 | Morita et al. |
| 2018/0227457 A1 | 8/2018 | Morita et al. |
| 2019/0082144 A1 | 3/2019 | Hakata et al. |
| 2019/0098211 A1 | 3/2019 | Ohmura et al. |
| 2019/0098253 A1 | 3/2019 | Soneda et al. |
| 2019/0230283 A1* | 7/2019 | Ollier .................. H04N 5/2254 |

* cited by examiner

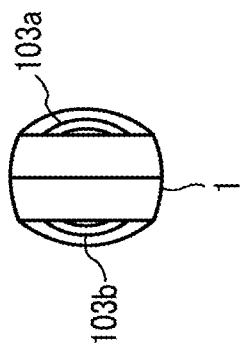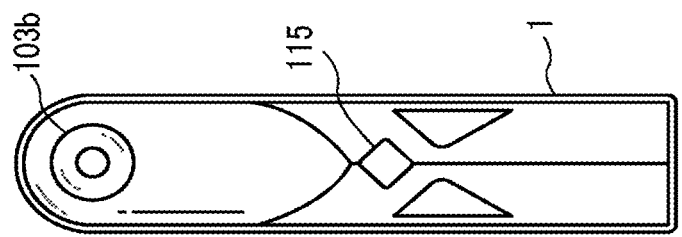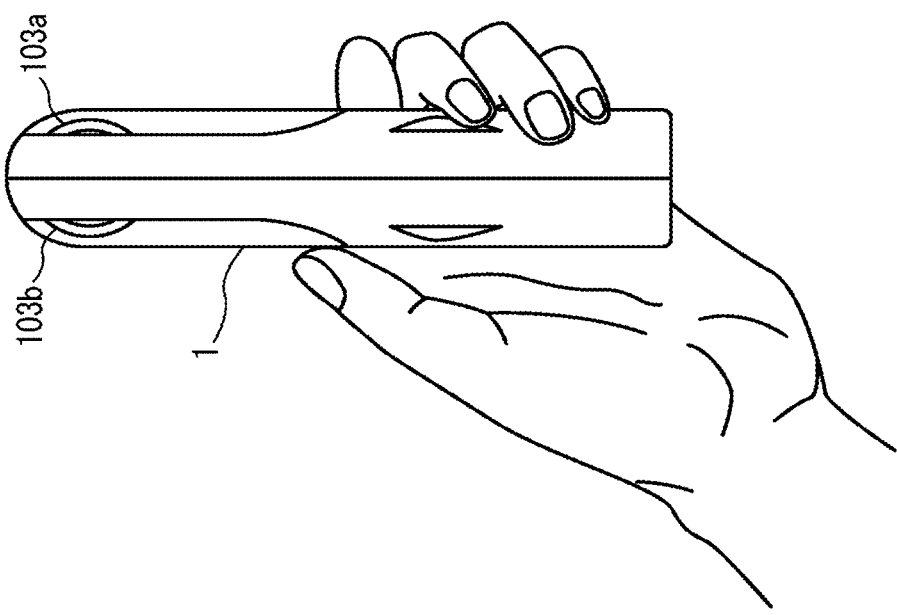

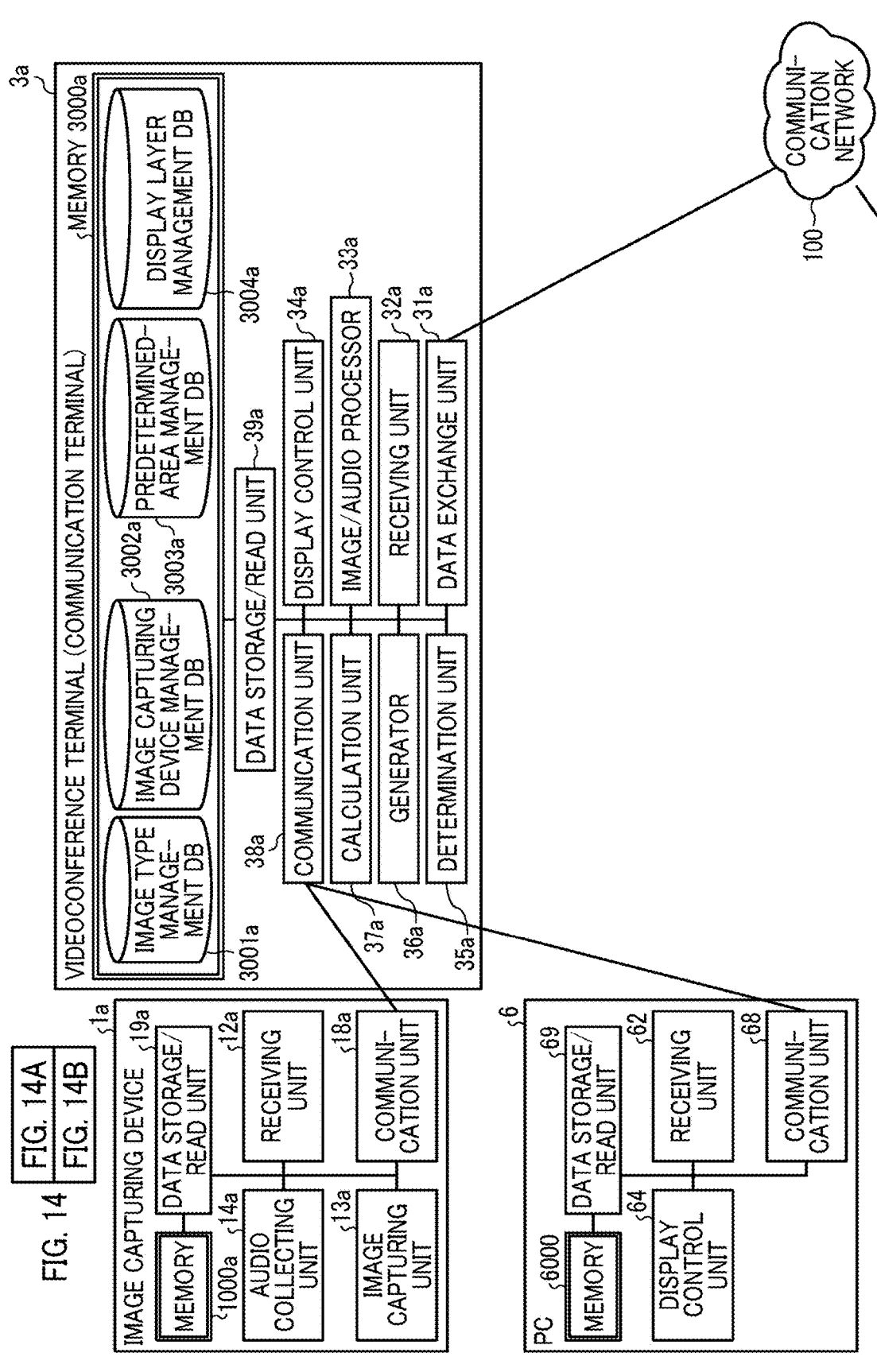

FIG. 16

IMAGE TYPE MANAGEMENT TABLE

| IMAGE DATA ID | IP ADDRESS OF SENDER TERMINAL | SOURCE NAME (IMAGE TYPE INFORMATION) |
|---|---|---|
| RS001 | 1.2.1.3 | Video_Theta |
| RS002 | 1.2.1.3 | Video |
| RS003 | 1.2.1.3 | Video_Contents |
| RS004 | 1.2.1.4 | Video_Theta |
| RS005 | 1.3.1.4 | Video |
| ... | ... | ... |

FIG. 17

IMAGE CAPTURING DEVICE MANAGEMENT TABLE

| VENDER ID AND PRODUCT ID OF GUID OF IMAGE CAPTURING DEVICE |
|---|
| vid_05ca&pid_2711 |
| vid_05ca&pid_3822 |
| ... |

FIG. 18

PREDETERMINED-AREA MANAGEMENT TABLE

| IP ADDRESS OF SENDER TERMINAL THAT SENDS IMAGE DATA | IP ADDRESS OF DESTINATION TERMINAL THAT RECEIVES IMAGE DATA (IP ADDRESS OF SENDER TERMINAL THAT SENDS PREDETERMINED-AREA INFORMATION) | PREDETERMINED-AREA INFORMATION | | |
|---|---|---|---|---|
| | | MOVING RADIUS (r) | POLAR ANGLE (θ) | AZIMUTH (φ) |
| 1.2.1.3 | 1.2.2.3 | 10 | 20 | 30 |
| 1.2.1.3 | 1.3.1.3 | 20 | 30 | 40 |
| 1.2.1.3 | 1.3.2.3 | 30 | 40 | 50 |
| 1.2.2.3 | 1.2.1.3 | ... | ... | ... |
| 1.2.2.3 | 1.3.1.3 | ... | ... | ... |
| 1.2.2.3 | 1.3.2.3 | ... | ... | ... |

FIG. 19

DISPLAY LAYER MANAGEMENT TABLE

| IMAGE DATA ID | LAYER LEVEL | DISPLAY COORDINATE (START POINT) | DISPLAY COORDINATE (END POINT) |
|---|---|---|---|
| RS001 | base | (0, 0) | (1280, 720) |
| RS002 | 1 | (0, 630) | (160, 720) |
| RS003 | 2 | (160, 630) | (320, 720) |
| ... | | | ... |

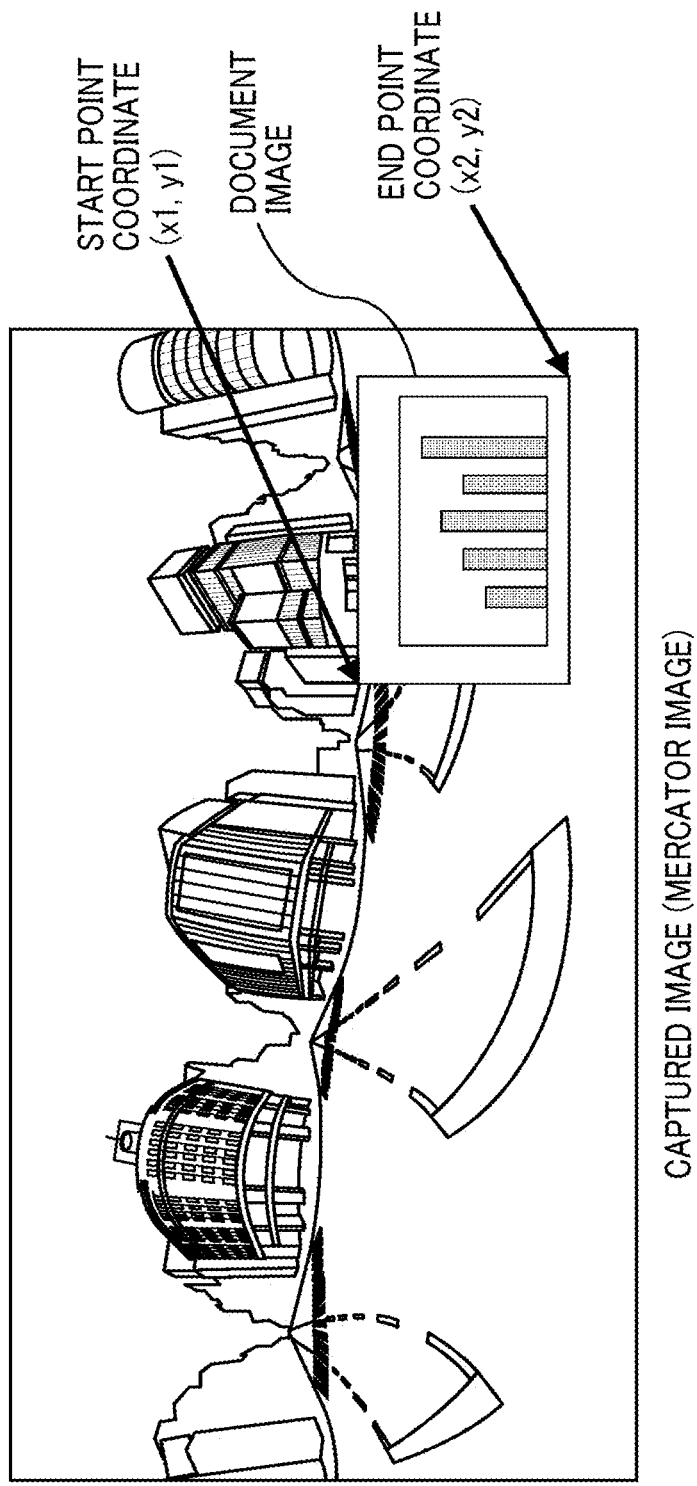

FIG. 21

SESSION MANAGEMENT TABLE

| SESSION ID | IP ADDRESS OF PARTICIPATING TERMINAL |
|---|---|
| se101 | 1.2.1.3, 1.2.1.4, 1.3.1.4 |
| se102 | 1.2.2.3, 1.3.1.4 |
| ... | ... |

FIG. 22

IMAGE TYPE MANAGEMENT TABLE

| SESSION ID | IMAGE DATA ID | IP ADDRESS OF SENDER TERMINAL | SOURCE NAME (IMAGE TYPE INFORMATION) |
|---|---|---|---|
| se101 | RS001 | 1.2.1.3 | Video_Theta |
| se101 | RS002 | 1.2.1.3 | Video |
| se101 | RS003 | 1.2.1.3 | Video_Contents |
| se101 | RS004 | 1.2.1.4 | Video_Theta |
| se101 | RS005 | 1.3.1.4 | Video |
| se102 | RS006 | ... | ... |
| se102 | RS007 | ... | ... |

FIG. 23

PREDETERMINED-AREA MANAGEMENT TABLE

| IP ADDRESS OF SENDER TERMINAL THAT SENDS IMAGE DATA | IP ADDRESS OF DESTINATION TERMINAL THAT RECEIVES IMAGE DATA | PREDETERMINED-AREA INFORMATION | | |
|---|---|---|---|---|
| | | MOVING RADIUS (r) | POLAR ANGLE (θ) | AZIMUTH (φ) |
| 1.2.1.3 | 1.2.2.3 | 10 | 20 | 30 |
| 1.2.1.3 | 1.2.2.3 | 20 | 30 | 40 |
| 1.2.1.3 | 1.2.2.3 | ... | ... | ... |
| 1.2.2.3 | 1.2.1.3 | ... | ... | ... |
| 1.2.2.3 | 1.2.1.3 | ... | ... | ... |
| ... | ... | ... | ... | ... |

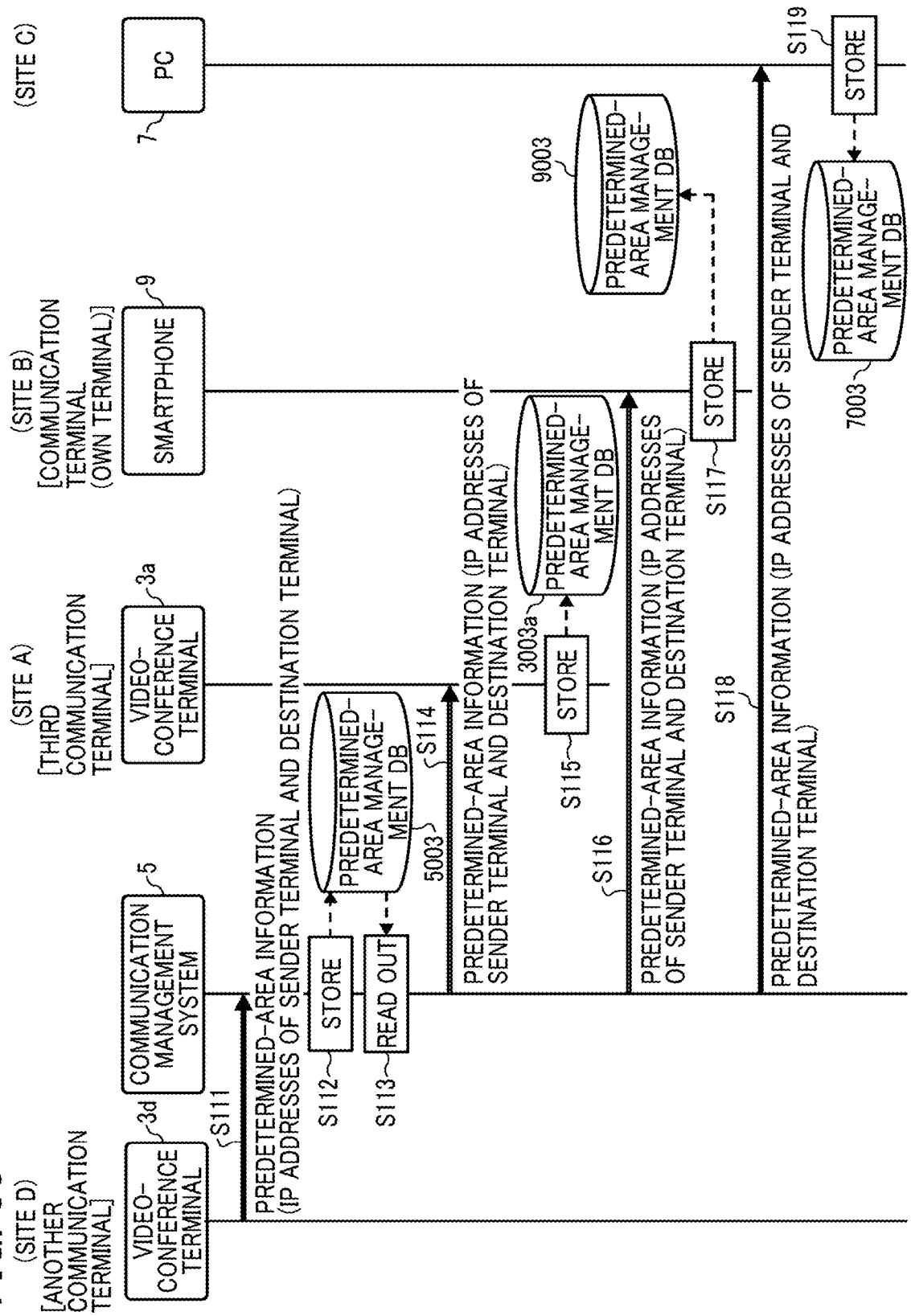

COMMUNICATION TERMINAL, IMAGE DATA COMMUNICATION SYSTEM, AND COMMUNICATION METHOD

CROSS-REFERENCE TO RELATED APPLICATIONS

This patent application is based on and claims priority under 35 U.S.C. § 119(a) to Japanese Patent Application Nos. 2018-144567, filed on Jul. 31, 2018, and 2019-126955, filed on Jul. 8, 2019, the entire disclosures of which are incorporated herein by reference.

BACKGROUND

Technical Field

Embodiments of the present disclosure relate to a communication terminal, an image data communication system, and a communication method.

Description of the Related Art

Videoconference systems are now in widespread use, allowing users at remote places to hold a remote conference via a communication network such as the Internet. In such videoconference systems, a communication terminal for a videoconference system is provided in a meeting room where attendants of one party in a remote conference are attending. This communication terminal collects an image or video of the meeting room including the attendants and sound such as speech made by the attendants, and transmits digital data converted from the collected image (video) and/or sound to the other party's communication terminal provided in a different meeting room. Based on the transmitted digital data, the other party's terminal displays images on a display or outputs audio from a speaker in the different meeting room to establish video communication (video calling). This enables to carry out a conference among remote sites, in a state close to an actual conference.

In addition, a technique is known that connects, to a communication terminal, an image capturing device that is configured to capture a spherical panoramic image in real time, and distributes the spherical panoramic image acquired by the image capturing device from the communication terminal to each of communication terminals of the other party. Each of the communication terminals of the other party sequentially converts the received spherical panoramic image to a predetermined-area image representing a predetermined area, which is a part of the spherical panoramic image, and displays the predetermined-area image on a display. This enables a user in each of remote sites to determine a predetermined-area image to be displayed, representing an image of a predetermined area that the user is interested in, from a whole image of the spherical panoramic image.

In addition, there is a known technique that according to which a relay server that relays a video image among two or more video communication terminals superimposes a predetermined figure on an object in the video image, the object being specified by the video communication terminal. This provides a video image in which the figure is combined with the object in the video image even when the object in the video image moves.

SUMMARY

Embodiments of the present disclosure describes an image data communication system, including: a first communication terminal including first circuitry; and a second communication terminal including second circuitry. The first circuitry of the first communication terminal is configured to transmit a plurality of pieces of image data and layer display order information indicating a layer display order in which a plurality of images represented by the plurality of pieces of image data are to be displayed. The second circuitry of the second communication terminal is configured to display the plurality of images represented by the plurality of pieces of image data transmitted from the first communication terminal in the layer display order based on the layer display order information transmitted from the first communication terminal.

BRIEF DESCRIPTION OF THE DRAWINGS

A more complete appreciation of the embodiments and many of the attendant advantages and features thereof can be readily obtained and understood from the following detailed description with reference to the accompanying drawings, wherein:

FIG. 1A is a left side view of an image capturing device, according to an embodiment of the present disclosure;

FIG. 1B is a front view of the image capturing device of FIG. 1A;

FIG. 1C is a plan view of the image capturing device of FIG. 1A;

FIG. 14A and FIG. 14B are a block diagram illustrating a part of a functional configuration of an image communication system, according to an embodiment of the present disclosure;

FIG. 16 is a conceptual diagram illustrating an image type management table, according to an embodiment of the present disclosure;

FIG. 17 is a conceptual diagram illustrating an image capturing device management table, according to an embodiment of the present disclosure;

FIG. 18 is a conceptual diagram illustrating a predetermined-area management table, according to an embodiment of the present disclosure;

FIG. 19 is a conceptual diagram illustrating a display layer management table (display position management table), according to an embodiment of the present disclosure;

FIG. 20 is an illustration for explaining a layer display order and a display position, according to an embodiment of the present disclosure;

FIG. 21 is a conceptual diagram illustrating a session management table, according to an embodiment of the present disclosure;

FIG. 22 is a conceptual diagram illustrating an image type management table, according to an embodiment of the present disclosure;

FIG. 23 is a conceptual diagram illustrating a predetermined-area management table, according to an embodiment of the present disclosure;

FIG. 30 is a sequence diagram illustrating an operation of sharing the predetermined-area information, according to an embodiment of the present disclosure;

Figure 2:
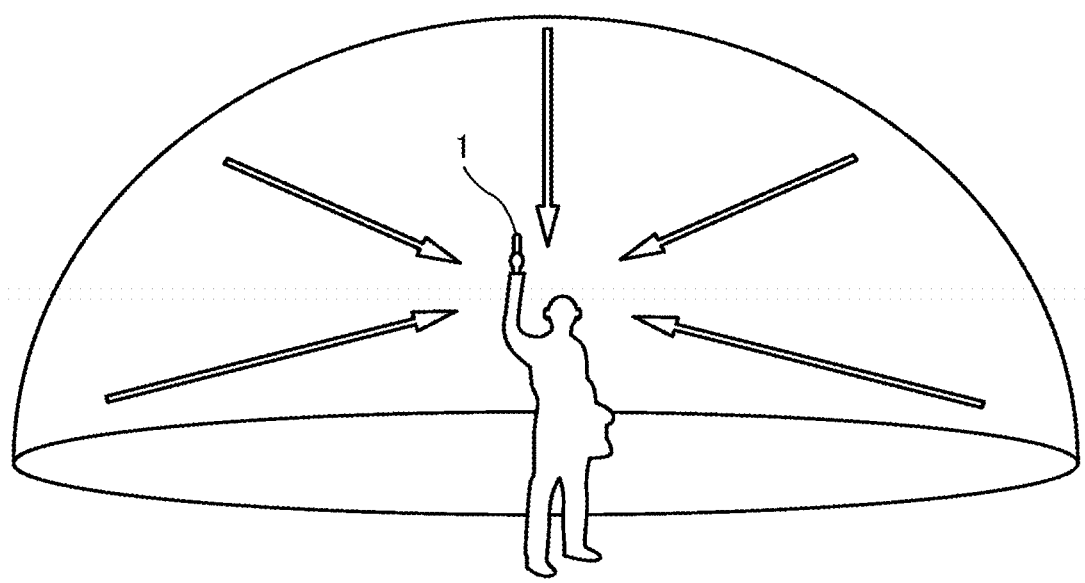
FIG. 2 is an illustration of how a user uses the image capturing device, according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Hereinafter, a description is given of an embodiment of the present disclosure, with reference to FIG. 1 to FIG. 39.

<Overview of Embodiment>
<Generation of Spherical Panoramic Image>

Referring to FIG. 1 (FIG. 1A to FIG. 1C) to FIG. 7, a description is given of generating a spherical panoramic image.

First, a description is given of an external view of an image capturing device 1, with reference to FIG. 1A to FIG. 1C. The image capturing device 1 is a digital camera for capturing images from which a spherical image is generated. In one example, the spherical image captured by the image capturing device 1 is a three-dimensional 360-degree spherical panoramic image. FIGS. 1A, 1B and 1C are respectively a left side view, a front view, and a plan view of the image capturing device 1.

As illustrated in FIG. 1A, the image capturing device 1 has a shape such that one can hold it with one hand. Further, as illustrated in FIGS. 1A, 1B, and 1C, an imaging element 103a is provided on a front side (anterior side) of an upper section of the image capturing device 1, and an imaging element 103b is provided on a back side (rear side) thereof. These imaging elements (image sensors) 103a and 103b are used in combination with optical members (e.g., fisheye lenses 102a and 102b, described below), each being configured to capture a hemispherical image having an angle of view of 180 degrees or wider. As illustrated in FIG. 1B, the image capturing device 1 further includes an operation unit 115 such as a shutter button on the rear side of the image capturing device 1, which is opposite of the front side of the image capturing device 1.

Next, a description is given of a situation where the image capturing device 1 is used, with reference to FIG. 2. FIG. 2 illustrates an example of how a user uses the image capturing device 1. As illustrated in FIG. 2, for example, the image capturing device 1 is used for capturing objects surrounding a user who is holding the image capturing device 1 in his or her hand. The imaging elements 103a and 103b illustrated in FIGS. 1A to 1C capture the objects surrounding the user to obtain two hemispherical images.

Figure 3A:
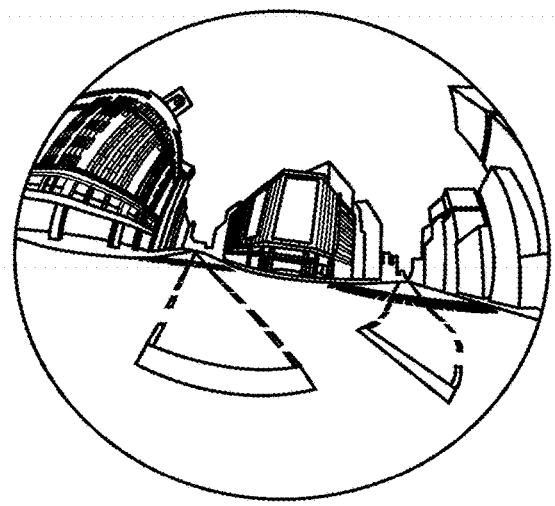
FIG. 3A is an illustration of a front side of a hemispherical image captured by the image capturing device, according to an embodiment of the present disclosure.
Figure 3B:
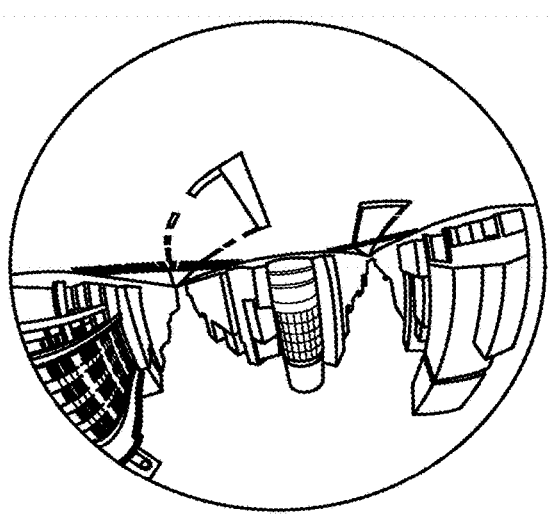
FIG. 3B is an illustration of a back side of a hemispherical image captured by the image capturing device, according to an embodiment of the present disclosure.
Figure 3C:
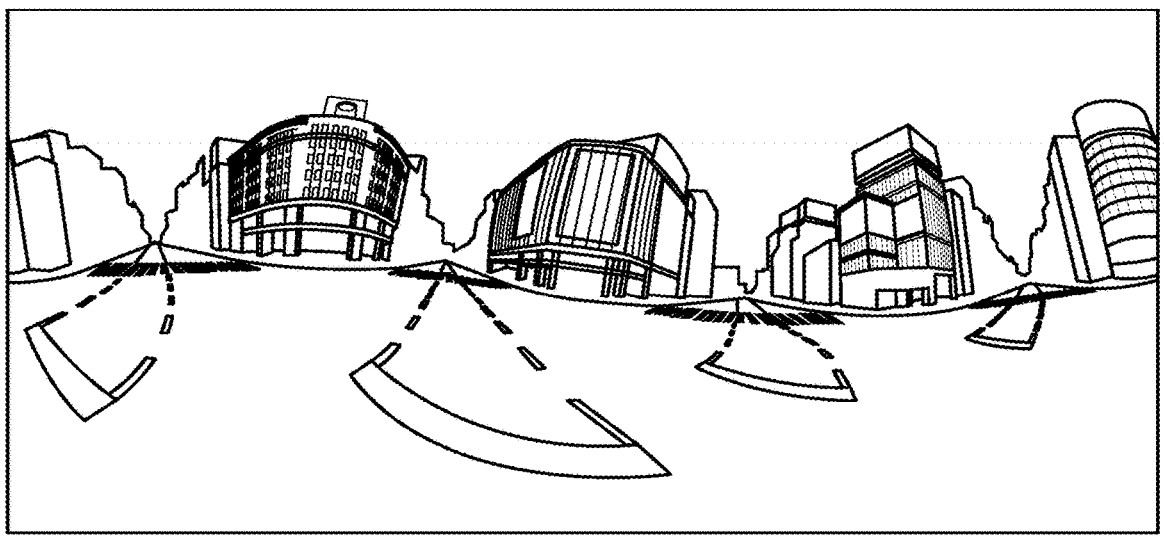
FIG. 3C is an illustration of an image captured by the image capturing device represented by Mercator projection, according to an embodiment of the present disclosure.
Figure 4B:
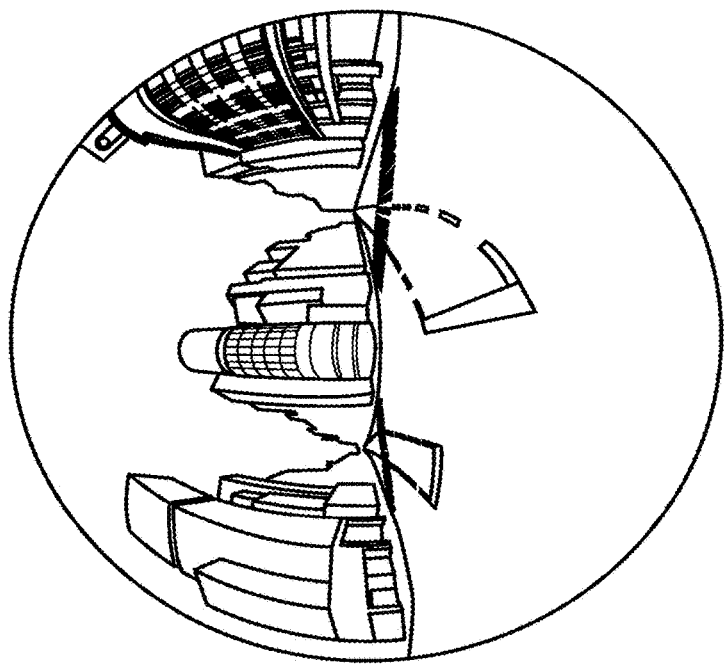
FIG. 4B is an illustration of a spherical panoramic image, according to an embodiment of the present disclosure.
Figure 4A:
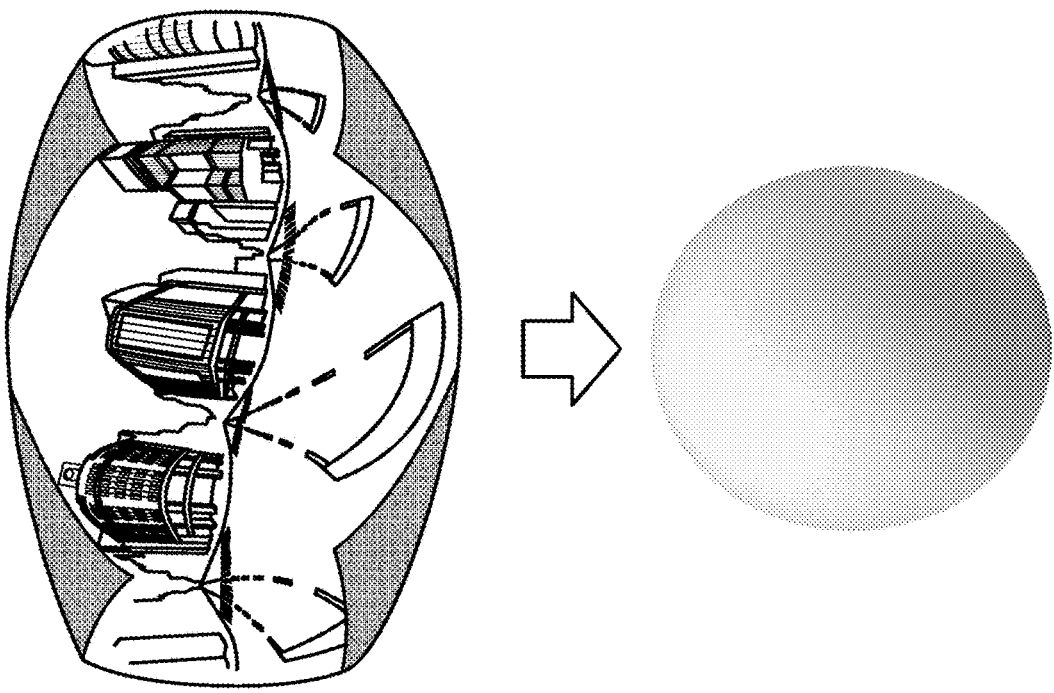
FIG. 4A is an illustration of a Mercator image covering a sphere, according to an embodiment of the present disclosure.

Next, a description is given of an overview of an operation of generating a spherical panoramic image from the images captured by the image capturing device 1, with reference to FIG. 3A to FIG. 3C and FIGS. 4A and 4B. FIG. 3A is a view illustrating a hemispherical image (front side) captured by the image capturing device 1. FIG. 3B is a view illustrating a hemispherical image (back side) captured by the image capturing device 1. FIG. 3C is a view illustrating an image in Mercator projection. The image in Mercator projection as illustrated in FIG. 3C is referred to as a "Mercator image" hereinafter. FIG. 4A is a conceptual diagram illustrating an example of how the Mercator image maps to a surface of a sphere. FIG. 4B is a view illustrating a spherical panoramic image.

As illustrated in FIG. 3A, an image captured by the imaging element 103a is a curved hemispherical image (front side) taken through the fisheye lens 102a described below. Also, as illustrated in FIG. 3B, an image captured by the imaging element 103b is a curved hemispherical image (back side) taken through the fisheye lens 102b described below. The image capturing device 1 combines one hemispherical image (front side) and the other hemispherical image (back side), which is reversed by 180-degree from the one hemispherical image (front side), to generate the Mercator image as illustrated in FIG. 3C.

The Mercator image is mapped to the sphere surface using Open Graphics Library for Embedded Systems (OpenGL ES) as illustrated in FIG. 4A. This results in generation of the spherical panoramic image as illustrated in FIG. 4B. In other words, the spherical panoramic image is represented as the Mercator image, which corresponds to a surface facing a center of the sphere. OpenGL ES is a graphic library used for visualizing two-dimensional (2D) and three-dimensional (3D) data. The spherical panoramic image is either a still image or a video image.

Figure 5:
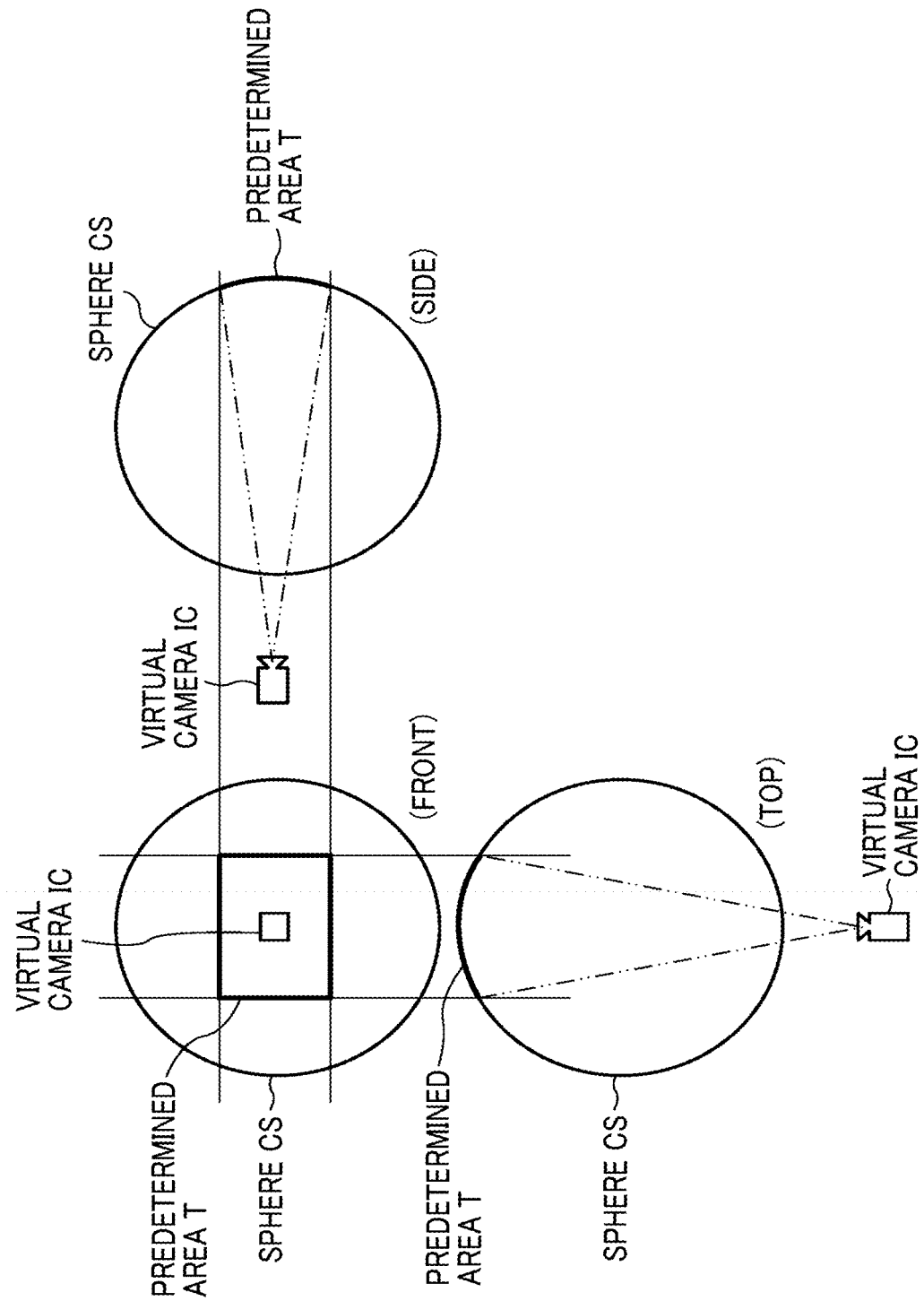
FIG. 5 is an illustration of relative positions of a virtual camera and a predetermined area in a case where the spherical panoramic image is represented as a three-dimensional sphere, according to an embodiment of the present disclosure.
Figure 6A:
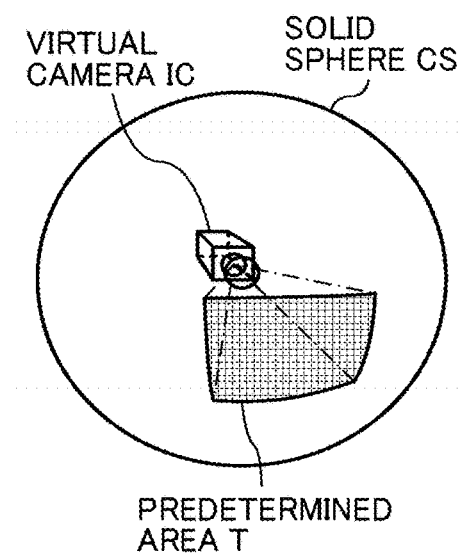
FIG. 6A is a perspective view of FIG. 5.
Figure 6B:
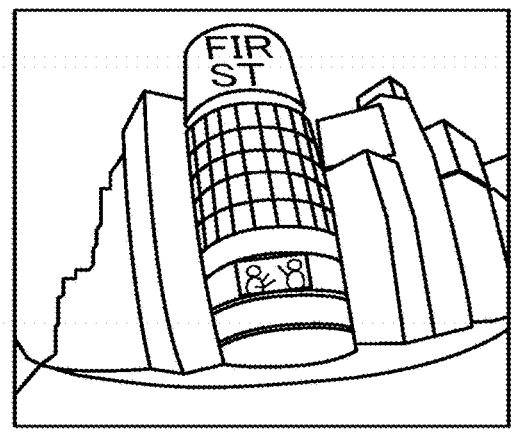
FIG. 6B is an illustration of an image of the predetermined area displayed on a display of a communication terminal, according to an embodiment of the present disclosure.

One may feel strange viewing the spherical panoramic image, because the spherical panoramic image is an image mapped to the sphere surface. To address this issue, an image of a predetermined area, which is a part of the spherical panoramic image, is displayed as a planar image having fewer curves. The image of the predetermined area is referred to as a "predetermined-area image" hereinafter. Referring to FIG. 5 and FIGS. 6A and 6B, a description is given of displaying the predetermined-area image.

FIG. 5 is a view illustrating relative positions of a virtual camera IC and a predetermined area T when the spherical image is represented as a surface area of a three-dimensional solid sphere, according to the present embodiment. The virtual camera IC corresponds to a position of a point of view (viewpoint) of a user who is viewing the spherical image CE represented as a surface area of the three-dimensional solid sphere CS. FIG. 6A is a perspective view of FIG. 5. FIG. 6B is a view illustrating the predetermined-area image when displayed on a display. In FIG. 6A, the spherical image CE illustrated in FIG. 4B is represented as a surface area of the three-dimensional solid sphere CS. Assuming that the spherical image CE is a surface area of the solid sphere CS, the virtual camera IC is outside of the spherical image CE as illustrated in FIG. 5. The predetermined area T in the spherical image CE is an imaging area of the virtual camera IC. Specifically, the predetermined area T is identified by predetermined-area information indicating an imaging direction and an angle of view of the virtual camera IC in a three-dimensional virtual space containing the spherical image CE.

The predetermined-area image Q, which is an image of the predetermined area T illustrated in FIG. 6A, is displayed on a display as an image of an imaging area of the virtual camera IC, as illustrated in FIG. 6B. An image illustrated in FIG. 6B is the predetermined-area image Q specified by the predetermined-area information that is set by default. In another example, the predetermined-area image Q is identified by an imaging area (X, Y, Z) of the virtual camera IC, i.e., the predetermined area T, rather than the predetermined-area information, i.e., the position coordinate of the virtual camera IC. In the following description of the embodiment, an imaging direction (rH, rV) and an angle of view α of the virtual camera IC are used.

Figure 7:
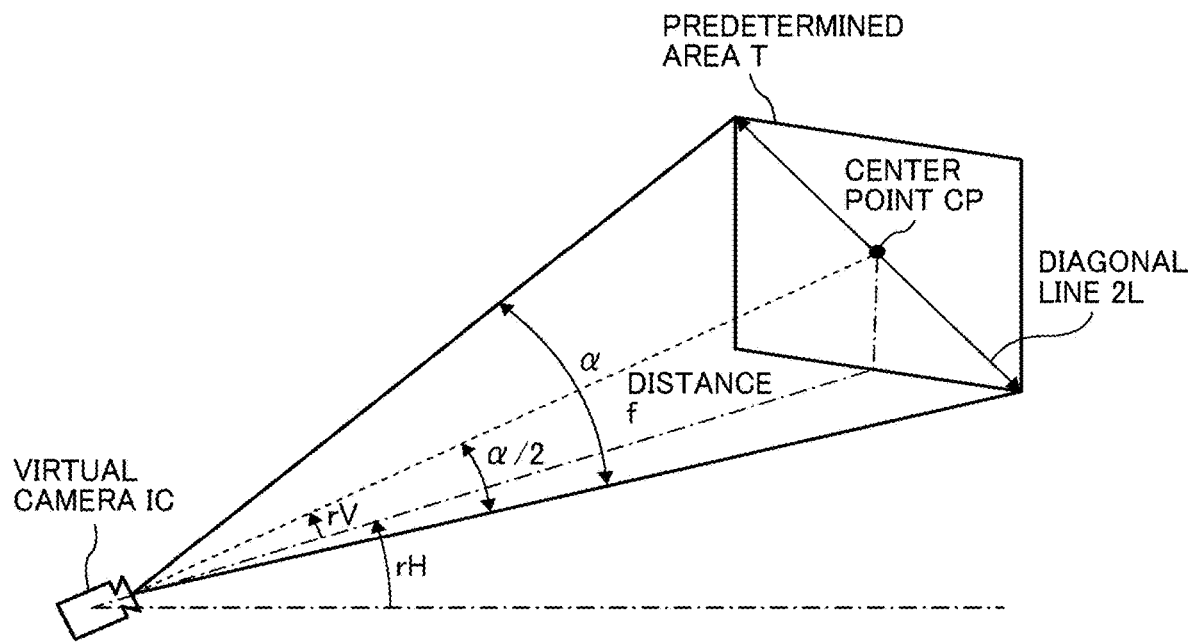
FIG. 7 is a diagram illustrating a relation between predetermined-area information and a predetermined area, according to an embodiment of the present disclosure.

Referring to FIG. 7, a relation between the predetermined-area information and an image of the predetermined area T is described. FIG. 7 is a view illustrating a relation between the predetermined-area information and the predetermined area T, according to the present embodiment. As illustrated in FIG. 7, "rH" denotes a horizontal radian, "rV" denotes a vertical radian, and "α" denotes an angle of view. The position of the virtual camera IC is adjusted, such that the point of gaze of the virtual camera IC, indicated by the imaging direction (rH, rV), matches a center point CP of the predetermined area T, which is the imaging area of the virtual camera IC. The predetermined-area image Q is an image of the predetermined area T, in the spherical image CE. "f" denotes a distance from the virtual camera IC to the center point CP of the predetermined area T. "L" is a distance between the center point CP and a given vertex of the predetermined area T (2L is a diagonal line). In FIG. 7, a trigonometric function equation generally expressed by the following equation 1 is satisfied.

$$L/f=\tan(\alpha/2) \quad \text{(Equation 1)}$$

Figure 8:
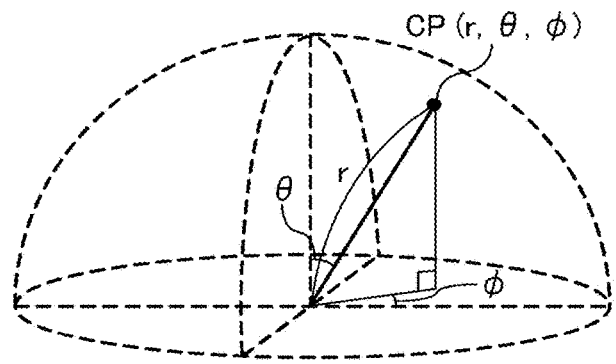
FIG. 8 is a diagram illustrating a point in a three-dimensional Euclidean space according to spherical coordinates, according to an embodiment of the present disclosure.

FIG. 8 is a view illustrating a point in a three-dimensional Euclidean space according to spherical coordinates, according to the present embodiment. A positional coordinate (r, θ, φ) is given when the center point CP is represented by a spherical polar coordinate system. The positional coordinate (r, θ, φ) represents a moving radius, a polar angle, and an azimuth angle. The moving radius r is a distance from the origin of the three-dimensional virtual space including the spherical panoramic image to the center point CP. Accordingly, the radius r is equal to "f". FIG. 8 illustrates the relation between these items. In the following description of the embodiment, the positional coordinates (r, θ, φ) of the virtual camera IC is used.

<Overview of Image Communication System>

Figure 9:
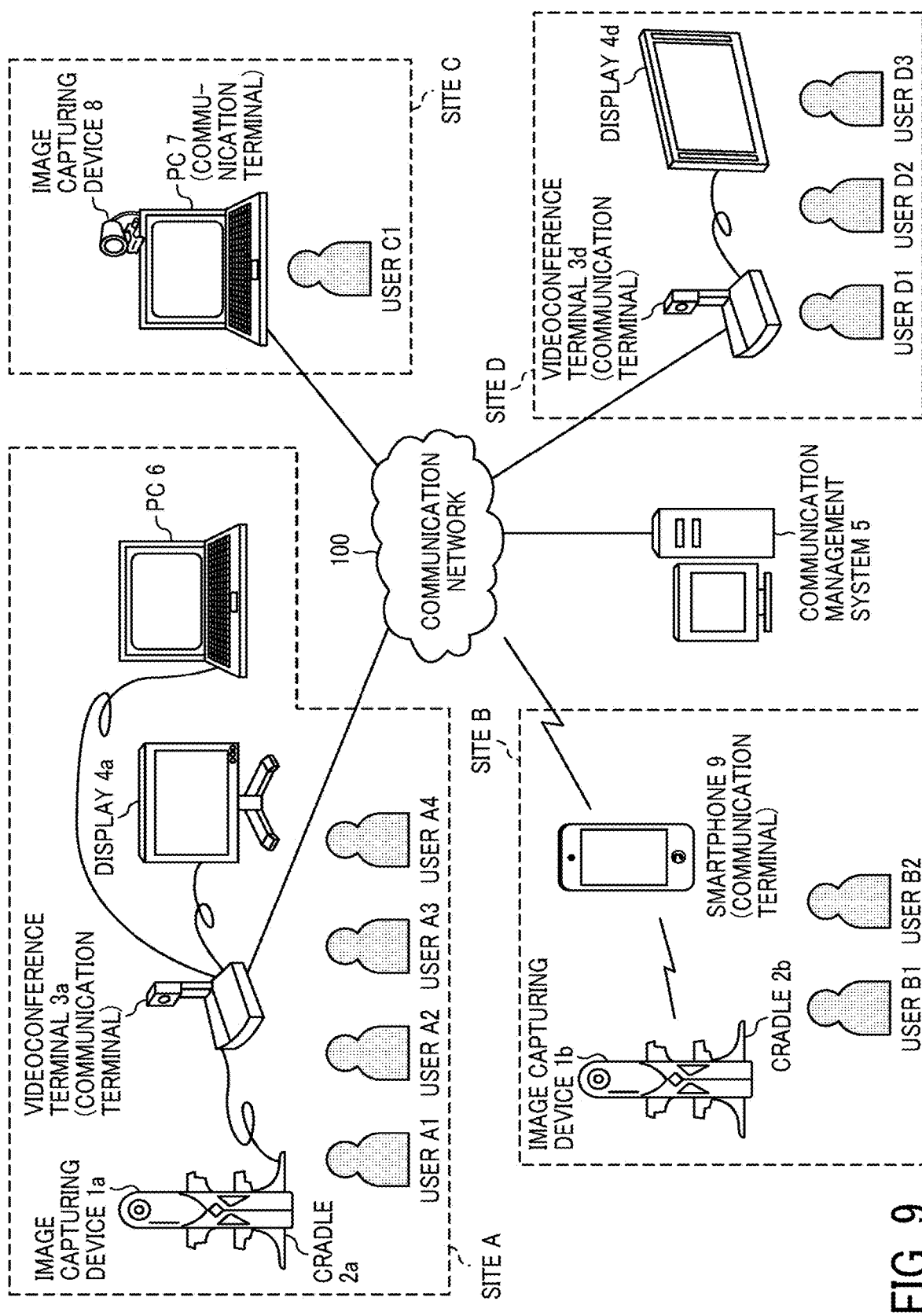
FIG. 9 is a schematic diagram illustrating a configuration of an image communication system, according to an embodiment of the present disclosure.

Referring to FIG. 9, an overview of a configuration of an image communication system according to the present embodiment is described. FIG. 9 is a schematic diagram illustrating a configuration of the image communication system, according to the present embodiment.

As illustrated in FIG. 9, the image communication system according to the present embodiment includes an image capturing device 1a, an image capturing device 1b, a videoconference terminal 3a, a videoconference terminal 3d, a display 4a, a display 4d, a communication management system 5, a personal computer (PC) 6, a PC 7, an image capturing device 8, and a smartphone 9. The videoconference terminal 3a, the smartphone 9, the PC 7, and the videoconference terminal 3d communicate data with one another via a communication network 100 such as the Internet. The communication network 100 can be either a wireless network or a wired network.

Each of the image capturing device 1a and the image capturing device 1b is a special digital camera, which captures an image of an object or surroundings such as scenery to obtain two hemispherical images, from which a spherical panoramic image is generated. By contrast, the image capturing device 8 is a general-purpose digital camera that captures an image of an object or surroundings such as scenery to obtain a general planar image.

Each of the videoconference terminal 3a and the videoconference terminal 3d is a terminal that is dedicated to videoconferencing. The videoconference terminal 3a and the videoconference terminal 3d display an image of video communication (video calling) on the display 4a and the display 4d, respectively, via a wired cable such as a universal serial bus (USB) cable. The videoconference terminal 3a usually captures an image by a camera 312, which is described below referring to FIG. 11. However, when the videoconference terminal 3a is connected to a cradle 2a on which the image capturing device 1a is mounted, the image capturing device 1a is preferentially used. Accordingly, two hemispherical images are obtained, from which a spherical panoramic image is generated. In addition, the videoconference terminal 3a is connected to the PC 6 and obtains a screen of the PC 6. When a wired cable is used for connecting the videoconference terminal 3a and the cradle 2a, the cradle 2a supplies power to the image capturing device 1a and holds the image capturing device 1a in addition to establishing communication between the image capturing device 1a and the videoconference terminal 3a. In the present embodiment, the image capturing device 1a, the cradle 2a, the videoconference terminal 3a, the display 4a, and the PC 6 are provided in the same site A. In the site A, four users A1, A2, A3 and A4 are participating in video communication. On the other hand, the videoconference terminal 3d and the display 4d are provided in the same site D. In the site D, three users D1, D2, and D3 are participating in video communication.

The communication management system 5 manages and controls communication among the videoconference terminal 3a, the videoconference terminal 3d, the PC 7 and the smartphone 9. Further, the communication management system 5 manages types (a general image type and a special image type) of image data to be exchanged in the communication among the videoconference terminal 3a, the videoconference terminal 3d, the PC 7 and the smartphone 9. In other words, the communication management system 5 is a communication control system. In the embodiment, the general image is a planar image. Further, in the embodiment, the special image is a spherical panoramic image. The communication management system 5 is provided, for example, at a service provider that provides video communication service. In one example, the communication management system 5 is configured as a single computer. In another example, the communication management system 5 is configured as a plurality of computers to which one or more units (functions, means, or storages) are arbitrarily allocated. In other words, the communication management system 5 can be implemented by a plurality of servers that operate in cooperation with one another.

The PC 6 generates document image data, which is image data of a document image to be displayed in the videoconference. In this disclosure, the document image is any image to be presented for participants during the videoconference. Examples of the document image includes, without limitation, an image displayed, created or edited by a general-purpose application operating on the PC 6, and an image photographed by a general-purpose digital camera or the like and reproduced on the PC 6.

The PC 7 performs video communication using the image capturing device 8 connected thereto. In the embodiment, the PC 7 and the image capturing device 8 are provided in the same site C. In the site C, one user C is participating in video communication.

The smartphone 9 includes a display 917, which is described below, and displays an image of video communication on the display 917. The smartphone 9 includes a complementary metal oxide semiconductor (CMOS) sensor 905, and usually captures an image using the CMOS sensor 905. In addition, the smartphone 9 is configured to obtain data of two hemispherical images captured by the image capturing device 1b, from which a spherical panoramic image is to be generated, using wireless communication such as Wireless Fidelity (Wi-Fi) and Bluetooth (registered trademark). When wireless communication is used for obtaining the data of two hemispherical images, a cradle 2b supplies power to the image capturing device 1b and holds the image capturing device 1b, but not establish a communication. In the embodiment, the image capturing device 1b, the cradle 2b, and the smartphone 9 are provided in the same site B. Further, in the site B, two users B1 and B2 are participating in video communication.

Each of the videoconference terminal 3a, the videoconference terminal 3d, the PC 7 and the smartphone 9 is an example of a communication terminal. OpenGL ES is installed in each of the communication terminals to enable each of the communication terminals to generate predetermined-area information that indicates a partial area of a spherical panoramic image, or to generate a predetermined-area image from a spherical panoramic image that is transmitted from a different one of the communication terminals.

The arrangement of the terminals (communication terminal, display, image capturing device), apparatuses and users illustrated in FIG. 9 is just an example, and any other suitable arrangement will suffice. For example, in the site C, an image capturing device configured to capture a spherical panoramic image can be used in place of the image capturing device 8. In addition, examples of the communication terminal include a digital television, a smartwatch, and a car navigation system. In the following description, any arbitrary one of the image capturing device 1a and the image capturing device 1b is referred to as "image capturing device 1". Further, any arbitrary one of the videoconference terminal 3a and the videoconference terminal 3d is referred to as "videoconference terminal 3", hereinafter. Furthermore, any arbitrary one of the display 4a and the display 4d is referred to as "display 4", hereinafter.

<Hardware Configuration of Embodiment>

Next, referring to FIG. 10 to FIG. 13, a detailed description is given hardware configurations of the image capturing device 1, the videoconference terminal 3, the communication management system 5, the PC 6, the PC 7, and the smartphone 9, according to the present embodiment. Since the image capturing device 8 is a general-purpose camera, a detailed description thereof is omitted.

<Hardware Configuration of Image Capturing Device 1>

Figure 10:
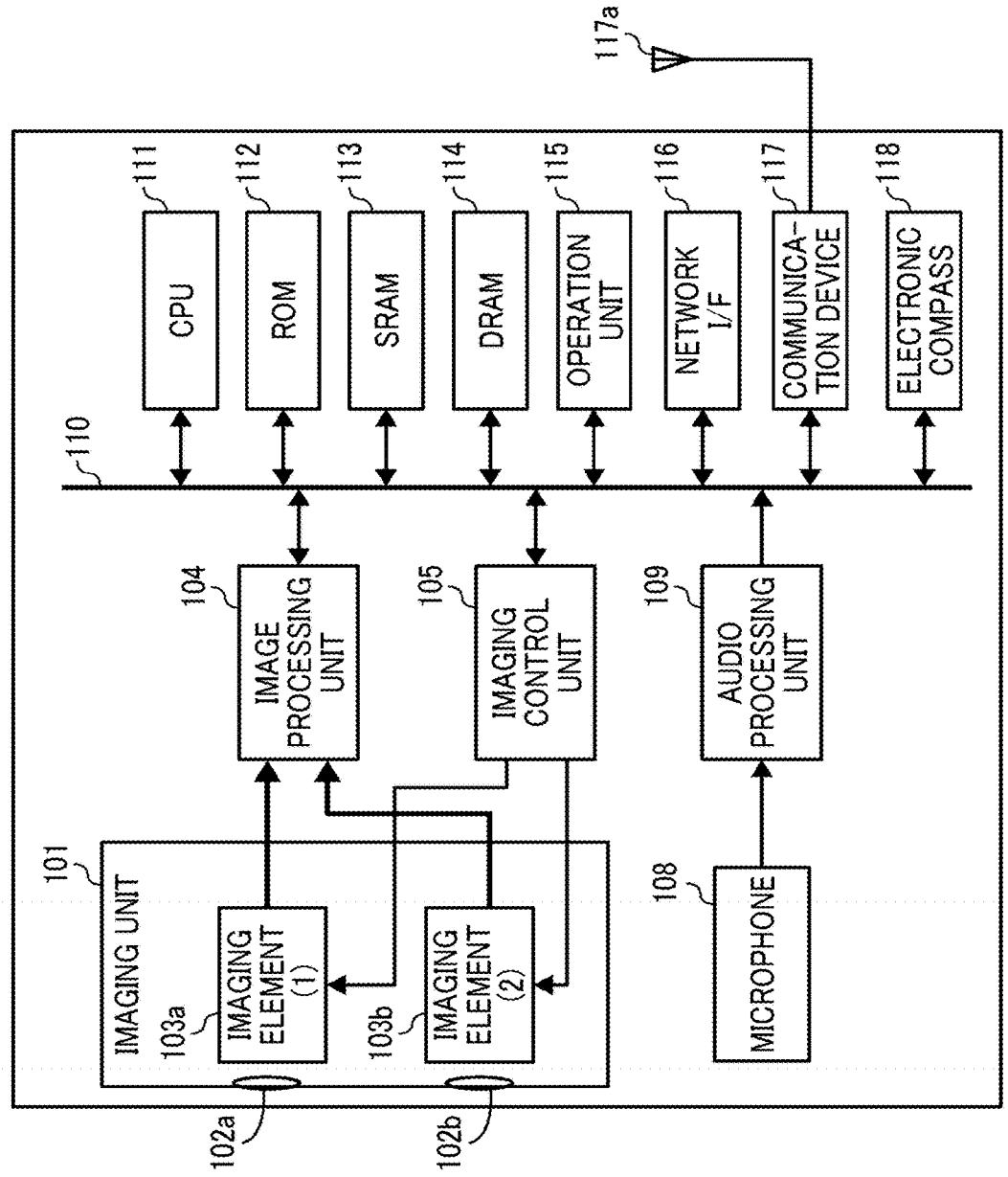
FIG. 10 is a block diagram illustrating a hardware configuration of the image capturing device, according to an embodiment of the present disclosure.

First, referring to FIG. 10, a hardware configuration of the image capturing device 1 is described, according to the present embodiment. FIG. 10 is a block diagram illustrating a hardware configuration of the image capturing device 1, according to the present embodiment. The following describes a case in which the image capturing device 1 is a spherical (omnidirectional) image capturing device having two imaging elements. However, the image capturing device 1 can include any suitable number of imaging elements, providing that it includes at least two imaging elements. In addition, the image capturing device 1 is not necessarily an image capturing device dedicated to omnidirectional image capturing. In another example, an external omnidirectional image capturing unit can be attached to a general-purpose digital camera or a smartphone to implement an image capturing device having substantially the same function as that of the image capturing device 1.

As illustrated in FIG. 10, the image capturing device 1 includes an imaging unit 101, an image processing unit 104, an imaging control unit 105, a microphone 108, an audio processing unit 109, a central processing unit (CPU) 111, a read only memory (ROM) 112, a static random access memory (SRAM) 113, a dynamic random access memory (DRAM) 114, the operation unit 115, a network interface (I/F) 116, a communication device 117, an antenna 117a, and electronic compass 118.

The imaging unit 101 includes two wide-angle lenses (so-called fisheye lenses) 102a and 102b, each having an angle of view of equal to or greater than 180 degrees so as to form a hemispherical image. The imaging unit 101 further includes the two imaging elements 103a and 103b corresponding to the wide-angle lenses 102a and 102b respectively. Each of the imaging elements 103a and 103b includes an imaging sensor such as a CMOS sensor and a charge-coupled device (CCD) sensor, a timing generation circuit, and a group of registers. The imaging sensor converts an optical image formed by the fisheye lenses 102a and 102b into electric signals to output image data. The timing generation circuit generates horizontal or vertical synchronization signals, pixel clocks and the like for the imaging sensor. Various commands, parameters and the like for operations of the imaging elements 103a and 103b are set in the group of registers.

Each of the imaging elements 103a and 103b of the imaging unit 101 is connected to the image processing unit 104 via a parallel I/F bus. In addition, each of the imaging elements 103a and 103b of the imaging unit 101 is connected to the imaging control unit 105 via a serial I/F bus such as an I2C bus. Each of the image processing unit 104 and the imaging control unit 105 is connected to the CPU 111 via a bus 110. Furthermore, the ROM 112, the SRAM 113, the DRAM 114, the operation unit 115, the network I/F 116, the communication device 117, and the electronic compass 118 are also connected to the bus 110.

The image processing unit 104 obtains image data from each of the imaging elements 103a and 103b via the parallel I/F bus and performs predetermined processing on the image data obtained from each of the imaging elements 103a and 103b separately. Thereafter, the image processing unit 104 combines these image data to generate data of the Mercator image as illustrated in FIG. 3C.

The imaging control unit 105 usually functions as a master device while each of the imaging elements 103a and 103b usually functions as a slave device. The imaging control unit 105 sets commands and the like in the group of registers of each of the imaging elements 103a and 103b via the I2C bus. The imaging control unit 105 receives various commands from the CPU 111. Further, the imaging control unit 105 obtains status data of the group of registers of each of the imaging elements 103a and 103b via the I2C bus. The imaging control unit 105 sends the obtained status data to the CPU 111.

The imaging control unit 105 instructs the imaging elements 103a and 103b to output the image data at a time when the shutter button of the operation unit 115 is pressed. The image capturing device 1 can support a preview display function (e.g., displaying a preview on a display such as a display of the videoconference terminal 3a) or a movie display function. In case of displaying movie, image data are continuously output from the imaging elements 103a and 103b at a predetermined frame rate (frames per minute).

Furthermore, the imaging control unit 105 operates in cooperation with the CPU 111, to synchronize the time when the imaging element 103a outputs image data and the time when the imaging element 103b outputs the image data. In the present embodiment, the image capturing device 1 does not include a display unit (display). However, in another example, the image capturing device 1 can include a display.

The microphone 108 converts sound into audio data (signals). The audio processing unit 109 obtains audio data output from the microphone 108 via an I/F bus and performs predetermined processing on the audio data.

The CPU 111 controls entire operation of the image capturing device 1 and performs necessary processing. The ROM 112 stores various programs for execution by the CPU 111.

Each of the SRAM 113 and the DRAM 114 operates as a work memory to store programs loaded from the ROM 112 for execution by the CPU 111 or data being currently processed. More specifically, in one example, the DRAM 114 stores image data currently processed by the image processing unit 104 and data of the Mercator image on which processing has been performed.

The operation unit 115 collectively refers to various operation keys, a power switch, the shutter button, and a touch panel having functions of both displaying information and receiving input from a user, which can be used in combination. A user operates the operation keys to input various image capturing (photographing) modes or image capturing (photographing) conditions.

The network I/F 116 collectively refers to an interface circuit such as a USB I/F that enables the image capturing device 1 to communicate data with an external medium such as a secure digital (SD) card or an external personal computer. The network I/F 116 supports at least one of wired and wireless communications. The data of the Mercator image, which is stored in the DRAM 114, can be stored in the external medium via the network I/F 116 or transmitted to the external device such as the videoconference terminal 3*a* via the network I/F 116, at any desired time.

The communication device 117 communicates with an external device such as the videoconference terminal 3*a* via the antenna 117*a* of the image capturing device 1 using a short-range wireless communication network such as Wi-Fi or Near Field Communication (NFC) standard. The communication device 117 is also configured to transmit the data of Mercator image to the external device such as the videoconference terminal 3*a*.

The electronic compass 118 computes an orientation and a tilt (roll angle) of the image capturing device 1 based on the Earth's magnetism to output orientation and tilt information. This orientation and tilt information is an example of related information, which is metadata described in compliance with Exif. This information is used for image processing such as image correction on captured images. The related information also includes data of a time (date) when an image is captured by the image capturing device 1, and data size of image data, for example.

<Hardware Configuration of Videoconference Terminal 3>

Figure 11:
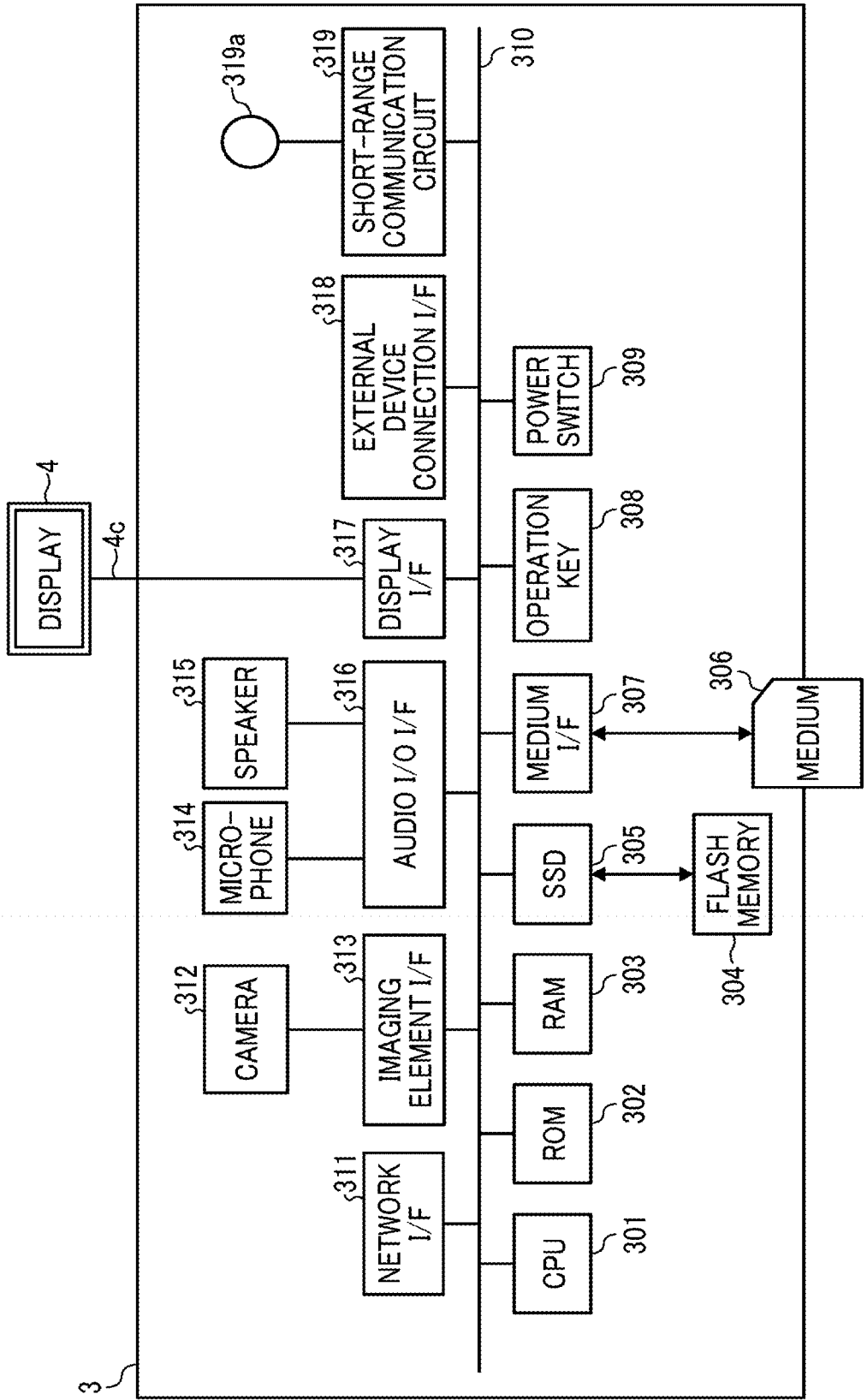
FIG. 11 is a block diagram illustrating a hardware configuration of a videoconference terminal, according to an embodiment of the present disclosure.

Next, referring to FIG. 11, a hardware configuration of the videoconference terminal 3 is described, according to the present embodiment. FIG. 11 is a block diagram illustrating a hardware configuration of the videoconference terminal 3, according to the present embodiment. As illustrated in FIG. 11, the videoconference terminal 3 includes a CPU 301, a ROM 302, a RAM 303, a flash memory 304, a solid state drive (SSD) 305, a medium I/F 307, an operation key 308, a power switch 309, a bus line 310, a network I/F 311, a camera 312, an imaging element I/F 313, a microphone 314, a speaker 315, an audio input/output I/F 316, a display I/F 317, an external device connection I/F 318, a short-range communication circuit 319, and an antenna 319*a* for the short-range communication circuit 319.

The CPU 301 controls entire operation of the videoconference terminal 3. The ROM 302 stores a control program such as an Initial Program Loader (IPL) to boot the CPU 301. The RAM 303 is used as a work area for the CPU 301. The flash memory 304 stores various data such as a communication control program, image data, and audio data. The SSD 305 controls reading and writing of various data from and to the flash memory 304 under control of the CPU 301. In alternative to the SSD, a hard disc drive (HDD) can be used. The medium I/F 307 controls reading and writing (storing) of data from and to a storage medium 306 such as a flash memory. The operation key (keys) 308 is operated by a user to input a user instruction such as a user selection of a communication destination of the videoconference terminal 3. The power switch 309 is a switch that turns on or off the power of the videoconference terminal 3.

The network I/F 311 in an interface that controls communication of data between the videoconference terminal 3 and an external device through the communication network 100 such as the Internet. The camera 312 is an example of a built-in imaging device configured to capture a subject under control of the CPU 301 to obtain image data. The imaging element I/F 313 is a circuit that controls driving of the camera 312. The microphone 314 is an example of a built-in audio collecting device configured to input audio. The audio input/output I/F 316 is a circuit for controlling input and output of audio signals between the microphone 314 and the speaker 315 under control of the CPU 301. The display I/F 317 is a circuit for transmitting image data to the display 4, which is external to the videoconference terminal 3, under control of the CPU 301. The external device connection I/F 318 is an interface that connects the videoconference terminal 3 to various external devices. The short-range communication circuit 319 is a communication circuit such as NFC standard, Bluetooth (registered trademark) and the like.

The bus line 310 is an address bus, a data bus or the like, which electrically connects the elements in FIG. 11 such as the CPU 301.

The display 4 is an example of a display device that displays an image of a subject, an operation icon, etc. The display 4 is configured as a liquid crystal display or an organic electroluminescence (EL) display, for example. The display 4 is connected to the display I/F 317 by a cable 4*c*. For example, the cable 4*c* is an analog red green blue (RGB) (video graphic array (VGA)) signal cable, a component video cable, a high-definition multimedia interface (HDMI) (registered trademark) signal cable, or a digital video interactive (DVI) signal cable.

The camera 312 includes a lens and a solid-state imaging element that converts an image (video) of a subject to electronic data by converting light to electric charge. As the solid-state imaging element, for example, a CMOS sensor or a CCD sensor is used. The external device connection I/F 318 is configured to connect the videoconference terminal 3 to an external device such as an external camera, an external microphone, or an external speaker through a USB cable or the like. When an external camera is connected, the external camera is driven in preference to the built-in camera 312 under control of the CPU 301. Similarly, when an external microphone is connected or when an external speaker is connected, the external microphone or the external speaker is driven in preference to the built-in microphone 314 or the built-in speaker 315 under control of the CPU 301.

The storage medium 306 is removable from the videoconference terminal 3. In addition to or in alternative to the flash memory 304, any suitable nonvolatile memory, such as an electrically erasable and programmable ROM (EEPROM) can be used, provided that it reads or writes data under control of CPU 301.

<Hardware Configuration of Communication Management System 5, PC 6, and PC 7>

Figure 12:
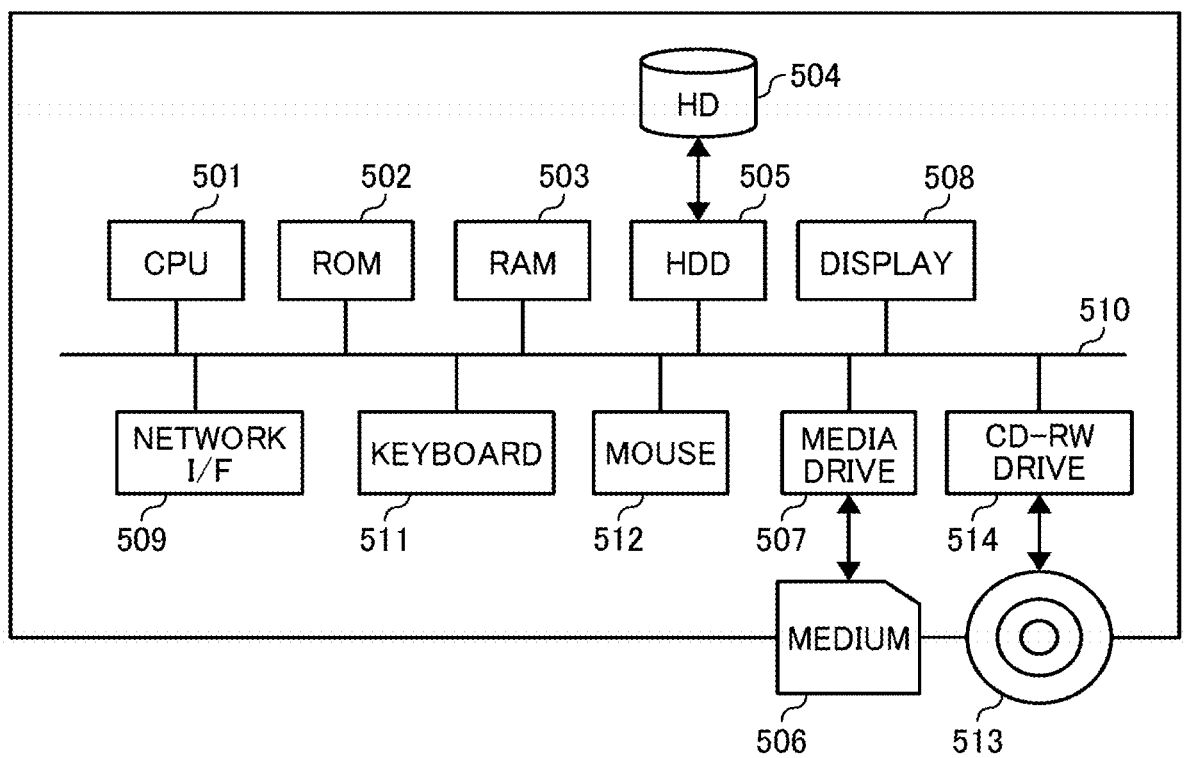
FIG. 12 is a block diagram illustrating a hardware configuration of any one of a communication management system and a personal computer, according to an embodiment of the present disclosure.

Next, referring to FIG. 12, a hardware configuration of any one of the communication management system 5, the PC 6 and the PC 7 is described, according to the present embodiment. FIG. 12 is a block diagram illustrating a hardware configuration of any one of the communication management system 5, PC 6 and the PC 7, according to the present embodiment. In the present embodiment, each of the communication management system 5, the PC 6 and the PC 7 is implemented by a computer. Therefore, a description is given of a configuration of the communication management system 5, and the description of a configuration of each of the PC 6 and the PC 7 is omitted, having the same or substantially the same configuration as that of the communication management system 5.

The communication management system 5 includes a CPU 501, a ROM 502, a RAM 503, a hard disc (HD) 504, an HDD 505, a media drive 507, a display 508, a network I/F 509, a keyboard 511, a mouse 512, a compact disc rewritable (CD-RW) drive 514, and a bus line 510. The CPU 501 controls entire operation of the communication management system 5. The ROM 502 stores a control program such as an IPL to boot the CPU 501. The RAM 503 is used as a work area for the CPU 501. The HD 504 stores various types of data, such as a control program for the communication management system 5. The HDD 505 controls reading and writing of various data from and to the HD 504 under control of the CPU 501. The media drive 507 controls reading and writing (storing) of data from and to a storage medium 506 such as a flash memory. The display 508 displays various information such as a cursor, menu, window, characters, or image. The network I/F 509 is an interface that controls communication of data between the communication management system 5 and an external device through the communication network 100. The keyboard 511 includes a plurality of keys to allow a user to input characters, numerals, or various instructions. The mouse 512 allows a user to select a specific instruction or execution, select a target for processing, or move a cursor being displayed. The CD-RW drive 514 controls reading and writing of various data from and to a CD-RW 513, which is one example of a removable storage medium. The bus line 510 is an address bus, a data bus or the like, which electrically connects the above-described hardware elements, as illustrated in FIG. 12.

<Hardware Configuration of Smartphone 9>

Figure 13:
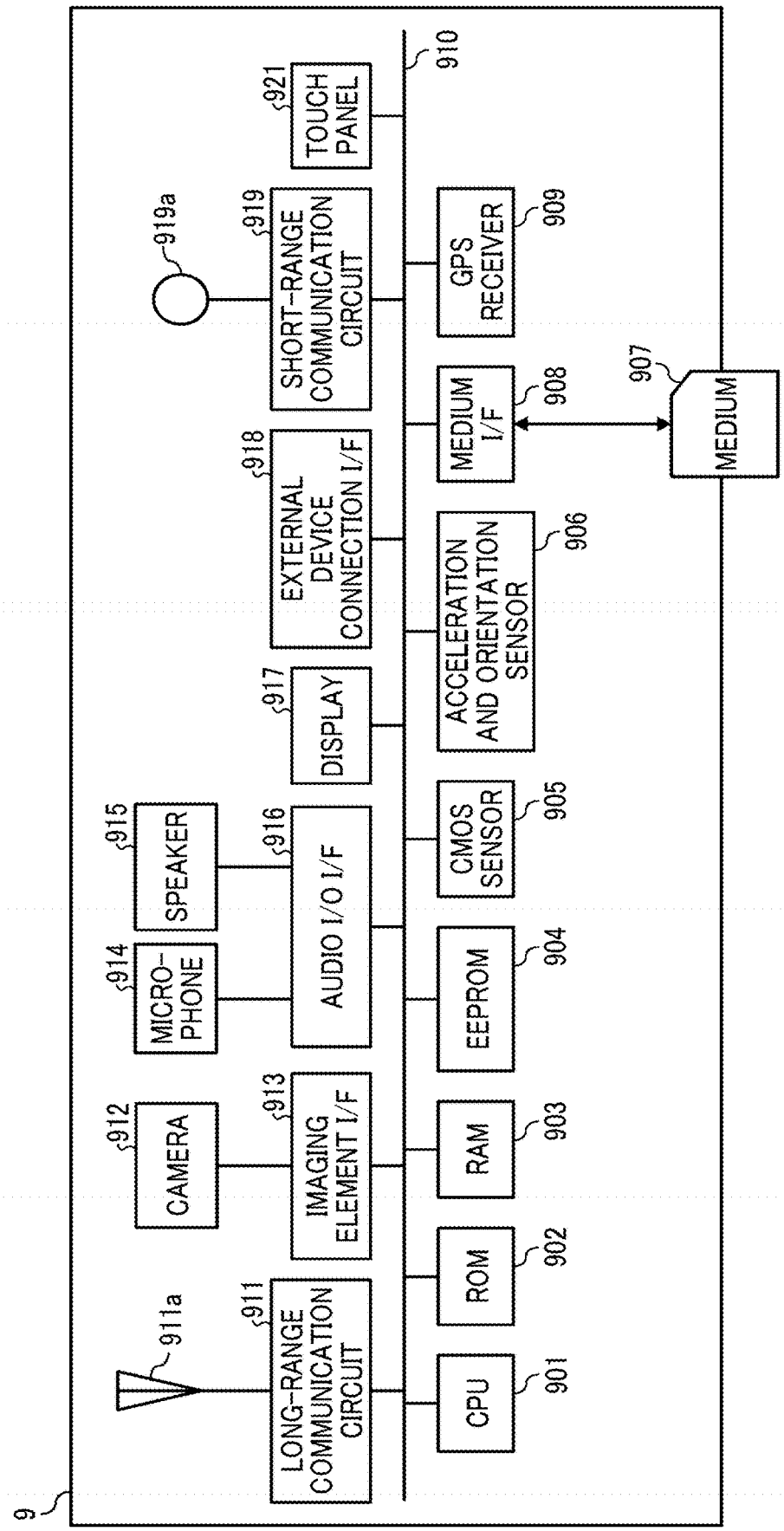
FIG. 13 is a block diagram illustrating a hardware configuration of a smartphone, according to an embodiment of the present disclosure.

Referring to FIG. 13, a hardware configuration of the smartphone 9 is described, according to the present embodiment. FIG. 13 is a block diagram illustrating a hardware configuration of the smartphone 9, according to the present embodiment. As illustrated in FIG. 13, the smartphone 9 includes a CPU 901, a ROM 902, a RAM 903, an EEPROM 904, a CMOS sensor 905, an acceleration and orientation sensor 906, a medium I/F 908, and a global positioning system (GPS) receiver 909.

The CPU 901 controls entire operation of the smartphone 9. The ROM 902 stores a control program such as an IPL to boot the CPU 901. The RAM 903 is used as a work area for the CPU 901. The EEPROM 904 reads or writes various data such as a control program for a smartphone under control of the CPU 901. The CMOS sensor 905 captures an object (mainly, a self-image of a user operating the smartphone 9) under control of the CPU 901 to obtain image data. The acceleration and orientation sensor 906 includes various sensors such as an electromagnetic compass for detecting geomagnetism, a gyrocompass, and an acceleration sensor. The medium I/F 908 controls reading and writing of data from and to a storage medium 907 such as a flash memory. The GPS receiver 909 receives GPS signals from a GPS satellite.

The smartphone 9 further includes a long-range communication circuit 911, a camera 912, an imaging element I/F 913, a microphone 914, a speaker 915, an audio input/output I/F 916, a display 917, an external device connection I/F 918, a short-range communication circuit 919, an antenna 919a for the short-range communication circuit 919, and a touch panel 921.

The long-range communication circuit 911 is a circuit that enables the smartphone 9 to communicate with other device through the communication network 100. The camera 912 is an example of a built-in imaging device configured to capture a subject under control of the CPU 901 to obtain image data. The imaging element I/F 913 is a circuit that controls driving of the camera 912. The microphone 914 is an example of a built-in audio collecting device configured to input audio. The audio input/output I/F 916 is a circuit for controlling input and output of audio signals between the microphone 914 and the speaker 915 under control of the CPU 901. The display 917 is an example of a display device that displays an image of a subject, various icons, etc. The display 917 is configured as a liquid crystal display or an organic EL display, for example. The external device connection IN 918 is an interface that connects the smartphone 9 to various external devices. The short-range communication circuit 919 is a communication circuit such as NFC standard, Bluetooth (registered trademark) and the like. The touch panel 921 is an example of an input device that enables a user to operate the smartphone 9 by touching a screen of the display 917.

The smartphone 9 further includes a bus line 910. The bus line 910 is an address bus, a data bus or the like, which electrically connects the elements in FIG. 13 such as the CPU 901.

In addition, a storage medium such as a CD-ROM storing any of the above-described programs and/or an HD storing any of the above-described programs can be distributed domestically or overseas as a program product.

<Functional Configuration of Embodiment>

Figure 14B:
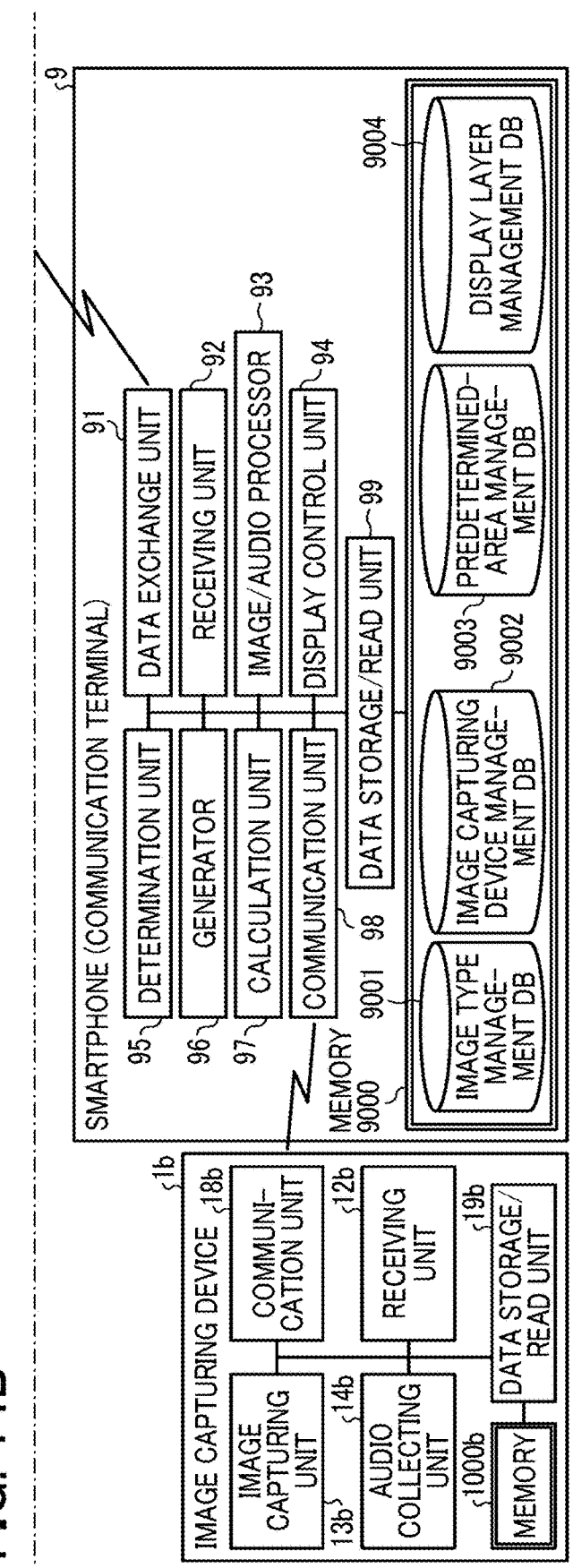
Figure 15:
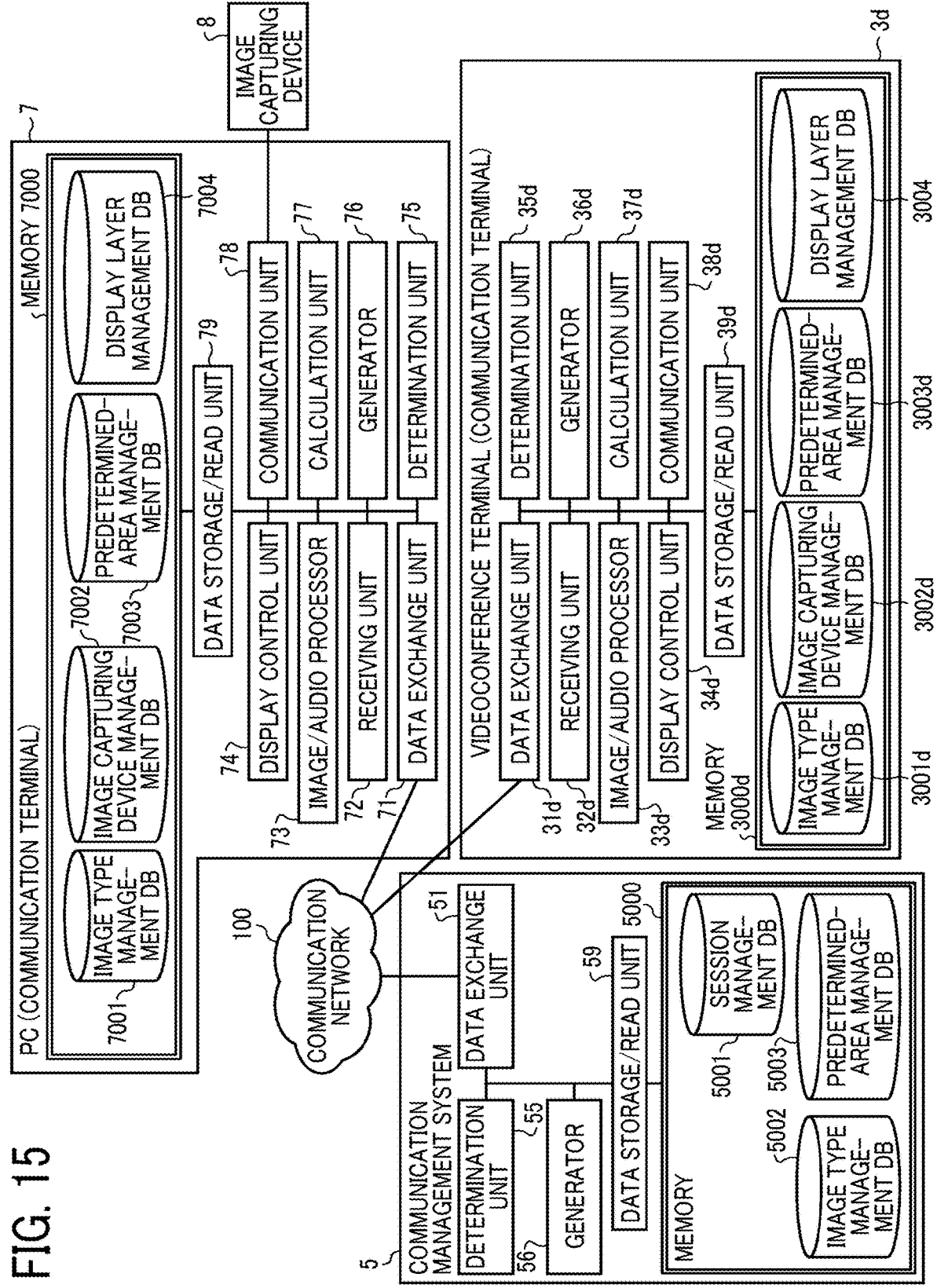
FIG. 15 is a block diagram illustrating another part of the functional configuration of the image communication system, according to an embodiment of the present disclosure.

Referring to FIGS. 14A and 14B to FIG. 23, a functional configuration of the image communication system is described according to the present embodiment. FIGS. 14A and 14B and FIG. 15 are block diagrams, each illustrating a part of a functional configuration of the image communication system.

<Functional Configuration of Image Capturing Device 1a>

As illustrated in FIG. 14A, the image capturing device 1a includes a receiving unit 12a, an image capturing unit 13a, an audio collecting unit 14a, a communication unit 18a, and a data storage/read unit 19a. Each of the above-mentioned units is a function or means that is implemented by or that is caused to function by operating any one or more of the hardware elements illustrated in FIG. 10 in cooperation with instructions from the CPU 111 according to a control program for the image capturing device 1a, expanded from the SRAM 113 to the DRAM 114.

The image capturing device 1a further includes a memory 1000a, which is implemented by the ROM 112, the SRAM 113, and/or the DRAM 114 illustrated in FIG. 10. The memory 1000a stores therein a globally unique identifier (GUID) identifying the own device (i.e., the image capturing device 1a itself).

As illustrated in FIG. 14B, the image capturing device 1b includes a receiving unit 12b, an image capturing unit 13b, an audio collecting unit 14b, a communication unit 18b, a data storage/read unit 19b, and a memory 1000b. These functional units of the image capturing device 1b implement the similar or substantially the similar functions as those of the receiving unit 12a, the image capturing unit 13a, the audio collecting unit 14a, the communication unit 18a, the data storage/read unit 19a, and the memory 1000a of the image capturing device 1a, respectively. Therefore, redundant descriptions thereof are omitted below.

(Each Functional Unit of Image Capturing Device 1a)

Referring to FIG. 10 and FIG. 14A, each of the functional units of the image capturing device 1a is described in detail.

The receiving unit 12a of the image capturing device 1a is mainly implemented by the operation unit 115 illustrated in FIG. 10, which operates under control of the CPU 111.

The receiving unit 12a receives an instruction input from the operation unit 115 according to a user operation.

The image capturing unit 13a is implemented mainly by the imaging unit 101, the image processing unit 104, and the imaging control unit 105, illustrated in FIG. 10, which operate under control of the CPU 111. The image capturing unit 13 captures an image of an object or surroundings such as scenery to obtain captured-image data.

The audio collecting unit 14a is mainly implemented by the microphone 108 and the audio processing unit 109 illustrated in FIG. 10, which operate under control of the CPU 111. The audio collecting unit 14a collects sounds around the image capturing device 1a.

The communication unit 18a, which is mainly implemented by instructions of the CPU 111, communicates data with a communication unit 38a of the videoconference terminal 3a using a short-range wireless communication network in compliance with NFC standard, Bluetooth (registered trademark), or Wi-Fi, for example.

The data storage/read unit 19a, which is mainly implemented by instructions of the CPU 111 illustrated in FIG. 10, stores various data or information in the memory 1000a or reads out various data or information from the memory 1000a.

<Functional Configuration of Videoconference Terminal 3a>

As illustrated in FIG. 14A, the videoconference terminal 3a includes a data exchange unit 31a, a receiving unit 32a, an image/audio processor 33a, a display control unit 34a, a determination unit 35a, a generator 36a, a calculation unit 37a, communication unit 38a, and a data storage/read unit 39a. Each of the above-mentioned units is a function or means that is implemented by or that is caused to function by operating any one or more of the hardware elements illustrated in FIG. 11 in cooperation with instructions from the CPU 301 according to a control program for the videoconference terminal 3a, expanded from the flash memory 304 to the RAM 303.

The videoconference terminal 3a further includes a memory 3000a, which is implemented by the ROM 302, the RAM 303, and the flash memory 304 illustrated in FIG. 11. The memory 3000a includes an image type management database (DB) 3001a, an image capturing device management DB 3002a, a predetermined-area management DB 3003a, and a display layer management DB 3004a. Among these DBs, the image type management DB 3001a is configured as an image type management table as illustrated in FIG. 16. The image capturing device management DB 3002a is configured as an image capturing device management table as illustrated in FIG. 17. The predetermined-area management DB 3003a is configured as a predetermined-area management table as illustrated in FIG. 18. The display layer management DB 3004a is configured as a display layer management table as illustrated in FIG. 19.

As illustrated in FIG. 15, the videoconference terminal 3d includes a data exchange unit 31d, a receiving unit 32d, an image/audio processor 33d, a display control unit 34d, a determination unit 35d, a generator 36d, a calculation unit 37d, a communication unit 38d, and a data storage/read unit 39d, and a memory 3000d. These functional units of the videoconference terminal 3d implement the similar or substantially the similar functions as those of the data exchange unit 31a, the receiving unit 32a, the image/audio processor 33a, the display control unit 34a, the determination unit 35a, the generator 36a, the calculation unit 37a, the communication unit 38a, the data storage/read unit 39a, and the memory 3000a of the videoconference terminal 3a, respectively. Therefore, redundant descriptions thereof are omitted below. In addition, the memory 3000d of the videoconference terminal 3d includes an image type management DB 3001d, and an image capturing device management DB 3002d, a predetermined-area management DB 3003d, and a display layer management DB 3004d. These DBs 3001d, 3002d, 3003d and 3004d have the same or the substantially the same data structure as the image type management DB 3001a, the image capturing device management DB 3002a, the predetermined-area management DB 3003a, and the display layer management DB 3004a of the videoconference terminal 3a, respectively. Therefore, redundant descriptions thereof are omitted below.

(Image Type Management Table)

FIG. 16 is an illustration of an example data structure of the image type management table, according to the present embodiment. The image type management table stores an image data identifier (ID), an internet protocol (IP) address, which is an example of an address of a terminal as a transmission source of image data, and a source name, in association with one another. The terminal as a transmission source is hereinafter referred to as a "sender terminal". The image data ID is one example of image data identification information identifying image data to be used in video communication. The same image data ID is assigned to image data transmitted from the same sender terminal. Accordingly, based on the image data, a destination terminal (that is, a communication terminal that receives image data) identifies a sender terminal from which the received image data is transmitted. The IP address of the sender terminal indicates an IP address of a communication terminal that transmits image data identified by an associated image data ID. The source name is a name for specifying an image capturing device that outputs image data identified by an associated image data ID. The source name is one example of image type information. The source name is a name generated by a communication terminal such as the videoconference terminal 3a according to a predetermined naming rule.

The example of the image type management table illustrated in FIG. 16 indicates that a communication terminal whose IP address is "1.2.1.3", transmits image data identified by the image data IDs "RS001", "RS002", and "RS003". Further, the example of the image type management table illustrated in FIG. 16 indicates that other communication terminals, whose IP addresses are respectively "1.2.1.4" and "1.3.1.4" transmit image data identified by the image data IDs "RS004" and "RS005", respectively. Further, according to the image type management table illustrated in FIG. 16, the image types represented by the source names of those three communication terminals are "Video_Theta", "Video", "Video_Contents", "Video_Theta" and "Video" that indicate the image types, which are "special image", "general image", "document image", "special image" and "general image", respectively. In the present embodiment, the "special image" is a spherical panoramic image.

In another example, data other than the image data representing the general image, the special image and the document image can be stored in the image type management table in association with the image data ID. Examples of the data other than the image data include audio data.

(Image Capturing Device Management Table)

FIG. 17 is an illustration of an example data structure of the image capturing device management table, according to the present embodiment. The image capturing device management table stores a vendor ID and a product ID among the GUIDs of an image capturing device that is configured to obtain two hemispherical images, from which a spherical panoramic image is generated. As the GUID, a combination of a vendor ID (VID) and a product ID (PID) used in a USB device is used, for example. The vendor ID and the product ID are stored in a communication terminal such as a videoconference terminal before shipment. In another example, these IDs are added and stored in the communication terminal after shipment.

(Predetermined-Area Management Table)

FIG. 18 is an illustration of an example data structure of the predetermined-area management table, according to the present embodiment. The predetermined-area management table stores an IP address of a communication terminal (sender terminal) as a transmission source of captured-image data, an IP address of a communication terminal (destination terminal) as a destination of the captured-image data, and predetermined-area information indicating a predetermined-area image being displayed at the destination terminal, in association with one another. The destination communication terminal of the captured-image data is identical to the sender communication terminal of the predetermined-area information. The predetermined-area information is a conversion parameter used to convert a captured image to an image (predetermined-area image) of a predetermined area T of the captured image, as illustrated in FIG. 6A, FIG. 6B, and FIG. 7. The IP address is used as one example of address information. Other examples of the address information include a MAC address and a terminal ID, which identifies a corresponding communication terminal. In the embodiment, an IPv4 address is simplified to represent the IP address. In another example, an IPv6 address is used as the IP address.

In the example of FIG. 18, the predetermined-area management table indicates, in the first line to the third line of the table, that in a case where the IP address of the videoconference terminal 3a is "1.2.1.3", the videoconference terminal 3a transmits captured-image data, via the communication management system 5, to the videoconference terminal 3d whose IP address is "1.2.2.3", the PC 7 whose IP address is "1.3.1.3", and the smartphone 9 whose IP address is "1.3.2.3". Further, the predetermined-area management table illustrated in FIG. 18 indicates that the videoconference terminal 3d is a sender communication terminal of the predetermined-area information (r=10, θ=20, φ=30). In substantially the same manner, the predetermined-area management table indicates that the PC 7 is a sender communication terminal of the predetermined-area information (r=20, θ=30, φ=40). Furthermore, the predetermined-area management table indicates that the smartphone 9 is a sender communication terminal of the predetermined-area information (r=30, θ=40, φ=50).

When the data exchange unit 31a newly receives predetermined-area information including the same pair of the IP address of the sender communication terminal of captured-image data and the destination communication terminal of captured-image data as that currently managed in the table, the data storage/read unit 39a overwrites currently managed predetermined-area information with the newly received predetermined-area information.

(Display Layer Management Table)

FIG. 19 is an illustration of an example data structure of the display layer management table, according to the present embodiment. The display layer management table stores the image data IDs stored in the image type management table illustrated in FIG. 16 in association with a layer display order that is unique to each of the IP addresses of the sender terminals.

Further, the display layer management table stores the image data IDs stored in the image type management table illustrated in FIG. 16 in association with display coordinates. Since the display layer management table stores the display coordinates as well as the layer display order, the display layer management table can be also referred to as a display position management table.

Referring to FIG. 20, a description is given of the layer display order. FIG. 20 is an illustration of a Mercator image of a spherical image with which a document image, which is a combination source image, is combined. The combination source image refers to an image to be combined with another image. The layer display order indicates an order in which images are to be combined with an image as a base layer. An image associated with the layer level "base" is a base layer image with which other image(s) are to be combined. For each of the IP addresses of the sender terminals, there should be one record storing the layer level "base". When the layer display order is represented by numbers, the numbers indicate an order in which images are to be combined with the base layer image. The images are combined with the base layer image in an ascending order of numbers. In other words, the larger the value of the number, the closer to the front the image is displayed. Although the numbers do not necessarily have to be sequential numbers, the numbers need to be unique for each of the IP addresses of the sender terminals. FIG. 20 illustrates an example in which a document image associated with the layer level "1" is combined with a Mercator image of a spherical image associated with the layer level "base".

Next, referring to FIG. 20, a description is given of the display coordinates. FIG. 20 is an illustration of a Mercator image of a spherical image with which a document image, which is the combination source image, is combined. The display coordinates include a start point coordinate and an end point coordinate. Assuming that the vertex position at the upper left corner of the document image, which is the combination source image, is a start point, the start point coordinate is (0, 0) and the end point coordinate is (xn, yn). In this case, when the document image is to combined with the Mercator image in manner that the start point coordinate (0, 0) and the end point coordinate (xn, yn) of the document image corresponds to a coordinate (x1, y1) and a coordinate (x2, y2) on the Mercator image, (x1, x2) is stored as the start point coordinate and (x2, y2) is stored as the end point coordinate in the display layer (position) management table. The IP address is one example of address information. Other examples of the address information include a MAC address and a terminal ID, which identifies a corresponding communication terminal. In the embodiment, an IPv4 address is simplified to represent the IP address. In another example, an IPv6 address is used as the IP address.

(Each Functional Unit of Videoconference Terminal 3a)

Referring to FIG. 11 and FIG. 14A, each of the functional units of the videoconference terminal 3a is described in detail.

The data exchange unit 31a of the videoconference terminal 3a is mainly implemented by the network I/F 311 illustrated in FIG. 11, which operates under control of the CPU 301. The data exchange unit 31a exchanges various data or information with communication management system 5 via the communication network 100.

The receiving unit 32a is mainly implemented by the operation key 308, which operates under control of the CPU 301. The receiving unit 32a receives selections or inputs according to a user operation. In another example, an input device such as a touch panel is used in addition to or in place of the operation key 308.

The image/audio processor 33a, which is implemented by instructions of the CPU 301 illustrated in FIG. 11, processes image data obtained by capturing a subject by the camera 312. After voice sound generated by a user is converted to audio signals by the microphone 314, the image/audio processor 33a processes audio data corresponding to the audio signals.

Further, the image/audio processor 33a processes image data received from another communication terminal based on the image type information such as the source name. The display control unit 34a causes the display 4 to display an image based on the processed image data. More specifically, when the image type information indicates "special image", the image/audio processor 33a converts the image data such as hemispherical image data as illustrated in FIG. 3A and FIG. 3B into spherical image data to generate a spherical panoramic image as illustrated in FIG. 4B. Furthermore, when there is a document image to be combined with the spherical image, the image/audio processor 33a generates a combined image, which is an image obtained by combining the document image with the spherical panoramic image, based on the document image data and the display position information. It should be noted that combining the spherical panoramic image, which is an example of a first image, with the document image, which is an example of a second image includes superimposing the second image on a part of the first image, and overwriting the second image on a part of the first image. In addition, the combining includes, for example, embedding the document image in place of a part of the spherical panoramic image. Further, the image/audio processor 33a generates a predetermined-area image as illustrated in FIG. 6B. Furthermore, the image/audio processor 33a outputs, to the speaker 315, audio signals according to audio data received from another communication terminal via the communication management system 5. The speaker 315 outputs sound based on the audio signal.

The display control unit 34a is mainly implemented by the display I/F 317, which operates under control of the CPU 301. The display control unit 34a causes the display 4 to display various images or characters.

The determination unit 35a, which is mainly implemented by instructions of the CPU 301, determines an image type corresponding to image data received from, for example, the image capturing device 1a. This determination is just one example performed by the determination unit 35a, and the determination unit 35a performs other various determinations regarding image data.

The generator 36a is mainly implemented by instructions of the CPU 301. The generator 36a generates a source name, which is one example of the image type information, according to the above-described naming rule, based on a determination result obtained by the determination unit 35a indicating one of a general image, a special image (the "special image" is a spherical panoramic image, in the embodiment), and a document image. For example, when the determination unit 35a determines that the image type corresponding to the received image data is a general image, the generator 36a generates a source name of "Video" that indicates a general image type. By contrast, when the determination unit 35a determines that the image type corresponding to the received image data is a special image, the generator 36a generates a source name of "Video_Theta" that indicates a special image type. Furthermore, when the determination unit 35a determines that the image type corresponding to the received image data is a document image, the generator 36a generates a source name of "Video_Contents" that indicates a document image.

The calculation unit 37a, which is mainly implemented by instructions of the CPU 301, calculates layer display order information.

The communication unit 38a is mainly implemented by the short-range communication circuit 319 and the antenna 319a, which operate under control of the CPU 301. The communication unit 38a communicates with the communication unit 18a of the image capturing device 1a using a short range wireless communication network in compliance with the NFC standard, Bluetooth (registered trademark), or Wi-Fi, for example. Although in the above description, the communication unit 38a and the data exchange unit 31a individually have a communication unit, alternatively the communication unit 38a and the data exchange unit 31a share a single communication unit.

The data storage/read unit 39a, which is mainly implemented by instructions of the CPU 301 illustrated in FIG. 11, stores various data or information in the memory 3000 or reads out various data or information from the memory 3000.

<Functional Configuration of Communication Management System 5>

Next, referring to FIG. 12 and FIG. 15, each of the functional units of the communication management system 5 is described in detail. The communication management system 5 includes a data exchange unit 51, a determination unit 55, a generator 56, and a data storage/read unit 59. Each of the above-mentioned units is a function or means that is implemented by or that is caused to function by operating any one or more of the hardware elements illustrated in FIG. 12 in cooperation with instructions from the CPU 501 according to a control program for the communication management system 5, expanded from the HD 504 to the RAM 503.

The communication management system 5 further includes a memory 5000, which is implemented by the RAM 503 and the HD 504 illustrated in FIG. 12. The memory 5000 includes a session management DB 5001, an image type management DB 5002, and a predetermined-area management DB 5003. The session management DB 5001 is implemented by a session management table illustrated in FIG. 21. The image type management DB 5002 is implemented by an image type management table illustrated in FIG. 22. The predetermined-area management DB 5003 is implemented by a predetermined-area management table illustrated in FIG. 23.

(Session Management Table)

FIG. 21 is an illustration of an example data structure of the session management table. The session management table stores a session ID and an IP address(es) of a participant communication terminal(s), in association with each other. The session ID is one example of session identification information for identifying a session that implements video communication. Each session ID is generated for a corresponding virtual conference room. One or more session IDs are also stored and managed in each communication terminal, such as the videoconference terminal 3a, to be used by each communication terminal to select a communication session. The IP address of the participant communication terminal indicates an IP address of the communication terminal participating in a virtual conference room identified by an associated session ID.

(Image Type Management Table)

FIG. 22 is an illustration of an example data structure of the image type management table, according to the present embodiment. The image type management table illustrated in FIG. 22 stores, in addition to the information items stored in the image type management table illustrated in FIG. 16, the same session IDs as those stored in the session management table, in association with one another. The example of the image type management table illustrated in FIG. 22 indicates that three communication terminals whose IP addresses are "1.2.1.3", "1.2.1.4", and "1.3.1.4" are participating in the virtual conference room identified by the session ID "se101". The communication management system 5 stores the same image data ID, IP address of the sender terminal, and image type information as those stored in a communication terminal, such as the videoconference terminal 3a. This enables the communication management system 5 to transmit the image type information, etc., to a communication terminal that is currently participating in the video communication and another communication terminal that newly participates in the video communication by entering a virtual conference room of the video communication. Accordingly, the communication terminal that is already in the video communication and the communication terminal that is newly participates in the video communication do not have to exchange such information including the image type information.

(Predetermined-Area Management Table)

FIG. 23 is an illustration of an example data structure of the predetermined-area management table, according to the present embodiment. The predetermined-area management table illustrated in FIG. 23 has substantially the same data structure as the predetermined-area management table illustrated in FIG. 18. However, as described later, since the data exchange unit 51 transmits, to each communication terminal, the latest predetermined-area information at preset intervals such as every thirty seconds, all the predetermined-area information received by the data exchange unit 51 during a time period from when the predetermined-area information is transmitted last time to when the latest predetermined-area information is transmitted, is kept stored without being deleted. In the example of FIG. 23, the more recent the predetermined-area information is, the upper record in the predetermined-area management table.

(Each Functional Unit of Communication Management System 5)

Next, referring to FIG. 12 and FIG. 15, each of the functional units of the communication management system 5 is described in detail.

The data exchange unit 51 of the communication management system 5 is mainly implemented by the network I/F 509, which operates under control of the CPU 501 illustrated in FIG. 12. The data exchange unit 51 exchanges various data or information with the videoconference terminal 3a, the videoconference terminal 3d, or the PC 7 through the communication network 100.

The determination unit 55, which is mainly implemented by instructions of the CPU 501, performs various determinations.

The generator 56, which is mainly implemented by instructions of the CPU 501, generates an image data ID.

The data storage/read unit 59 is mainly implemented by the HDD 505 illustrated in FIG. 12, which operates under control of the CPU 501. The data storage/read unit 59 stores various data or information in the memory 5000 or reads out various data or information from the memory 5000.

<Functional Configuration of PC 6>

Next, referring to FIG. 12 and FIG. 14A, a functional configuration of the PC 6 is described, according to the present embodiment.

As illustrated in FIG. 14A, the PC 6 includes a receiving unit 62, a display control unit 64, a communication unit 68, and a data storage/read unit 69. Each of the above-mentioned units is a function or means that is implemented by or that is caused to function by operating any one or more of the hardware elements illustrated in FIG. 12 in cooperation with instructions from the CPU 501 according to a control program for the PC 6, expanded from the HD 504 to the RAM 503.

The PC 6 further includes a memory 6000, which is implemented by the ROM 502, the RAM 503 and the HD 504 illustrated in FIG. 12.

(Each Functional Unit of PC 6)

The receiving unit 62 of the PC 6 is mainly implemented by the keyboard 511 and the mouse 512, which operate under control of the CPU 501. The receiving unit 62 implements the similar or substantially the similar function to that of the receiving unit 32a. The display control unit 64 is mainly implemented by instructions of the CPU 501. The display control unit 64 causes the display 508 to display various images or characters. The communication unit 68, which is mainly implemented by instructions of the CPU 501, communicates data with a communication unit 38a of the videoconference terminal 3a using a short-range wireless communication network in compliance with the NFC standard, Bluetooth (registered trademark), or Wi-Fi, for example. The data storage/read unit 69, which is mainly implemented by instructions of the CPU 501, stores various data or information in the memory 6000 or reads out various data or information from the memory 6000.

<Functional Configuration of PC 7 as Communication Terminal>

Referring to FIG. 12 and FIG. 15, a functional configuration of the PC 7 is described, according to the present embodiment. The PC 7 has substantially the same functions as those of the videoconference terminal 3a. In other words, as illustrated in FIG. 15, the PC 7 includes a data exchange unit 71, a receiving unit 72, an image/audio processor 73, a display control unit 74, a determination unit 75, a generator 76, a calculation unit 77, a communication unit 78, and a data storage/read unit 79. Each of the above-mentioned units is a function or means that is implemented by or that is caused to function by operating any one or more of the hardware elements illustrated in FIG. 12 in cooperation with instructions from the CPU 501 according to a control program for the PC 7, expanded from the HD 504 to the RAM 503.

The PC 7 further includes a memory 7000, which is implemented by the ROM 502, the RAM 503 and the HD 504 illustrated in FIG. 12. The memory 7000 includes an image type management DB 7001, an image capturing device management DB 7002, a predetermined-area management DB 7003, and a display layer management DB 7004. The image type management DB 7001, the image capturing device management DB 7002, the predetermined-area management DB 7003, and the display layer management DB 7004 have the same or substantially the same data structure as the image type management DB 3001a, the image capturing device management DB 3002a, the predetermined-area management DB 3003a, and the display layer management DB 3004a, respectively, and redundant descriptions thereof are omitted below.

(Each functional Unit of PC 7 as Communication Terminal)

The data exchange unit 71 of the PC 7 is mainly implemented by the network I/F 509, which operates under control of the CPU 501 illustrated in FIG. 12. The data exchange unit 71 implements the similar or substantially the similar function to that of the data exchange unit 31a.

The receiving unit 72 is mainly implemented by the keyboard 511 and the mouse 512, which operates under control of the CPU 501. The receiving unit 72 implements the similar or substantially the similar function to that of the receiving unit 32a. The image/audio processor 73, which is mainly implemented by instructions of the CPU 501, implements the similar or substantially the similar function to that of the image/audio processor 33a. The display control unit 74, which is mainly implemented by instructions of the CPU 501, implements the similar or substantially the similar function to that of the display control unit 34a. The determination unit 75, which is mainly implemented by instructions of the CPU 501, implements the similar or substantially the similar function to that of the determination unit 35a. The generator 76, which is mainly implemented by instructions of the CPU 501, implements the similar or substantially the similar function to that of the generator 36a. The calculation unit 77, which is mainly implemented by instructions of the CPU 501, implements the similar or substantially the similar function to that of the calculation unit 37a. The communication unit 78, which is mainly implemented by instructions of the CPU 501, implements the similar or substantially the similar function to that of the communication unit 38a. The data storage/read unit 79, which is mainly implemented by instructions of the CPU 501, stores various data or information in the memory 7000 or reads out various data or information from the memory 7000.

<Functional Configuration of Smartphone 9>

Referring to FIG. 13 and FIG. 14B, a functional configuration of the smartphone 9 is described, according to the present embodiment. The smartphone 9 has substantially the same functions as the videoconference terminal 3a. In other words, as illustrated in FIG. 14B, the smartphone 9 includes a data exchange unit 91, a receiving unit 92, an image/audio processor 93, a display control unit 94, a determination unit 95, a generator 96, a calculation unit 97, a communication unit 98, and a data storage/read unit 99. Each of the above-mentioned units is a function or means that is implemented by or that is caused to function by operating any one or more of the hardware elements illustrated in FIG. 13 in cooperation with instructions from the CPU 901 according to a control program for the smartphone 9, expanded from the EEPROM 904 to the RAM 903.

The smartphone 9 further includes a memory 9000, which is implemented by the ROM 902, the RAM 903, and the EEPROM 904 illustrated in FIG. 13. The memory 9000 includes an image type management DB 9001, an image capturing device management DB 9002, a predetermined-area management DB 9003, and a display layer management DB 9004. The image type management DB 9001, the image capturing device management DB 9002, the predetermined-area management DB 9003, and the display layer management DB 9004 have the same or substantially the same data structure as the image type management DB 3001a, the image capturing device management DB 3002a, the predetermined-area management DB 3003a, and the display layer management DB 3004a, respectively, and redundant descriptions thereof are omitted below.

(Each Functional Unit of Smartphone 9)

The data exchange unit 91 of the smartphone 9 is mainly implemented by the long-range communication circuit 911 illustrated in the FIG. 13, which operates under control of the CPU 901. The data exchange unit 91 implements the similar or substantially the similar function to that of the data exchange unit 31a.

The receiving unit 92 is mainly implemented by the touch panel 921, which operates under control of the CPU 901. The receiving unit 92 implements the similar or substantially the similar function to that of the receiving unit 32a.

The image/audio processor 93, which is mainly implemented by instructions of the CPU 901, implements the similar or substantially the similar function to that of the image/audio processor 33a. The display control unit 94, which is mainly implemented by instructions of the CPU 901, implements the similar or substantially the similar function to that of the display control unit 34a. The determination unit 95, which is mainly implemented by instructions of the CPU 901, implements the similar or substantially the similar function to that of the determination unit 35a. The generator 96, which is mainly implemented by instructions of the CPU 901, implements the similar or substantially the similar function to that of the generator 36a. The calculation unit 97, which is mainly implemented by instructions of the CPU 901, implements the similar or substantially the similar function to that of the calculation unit 37a. The communication unit 98, which is mainly implemented by instructions of the CPU 901, implements the similar or substantially the similar function to that of the communication unit 38a. The data storage/read unit 99, which is implemented by instructions of the CPU 901, stores various data or information in the memory 9000 or reads out various data or information from the memory 9000.

<Operation or Processes of Embodiment>

Referring to FIG. 24 to FIG. 39, a description is given of an operation or processes according to the present embodiment.

<Participation Process>

Figure 24:
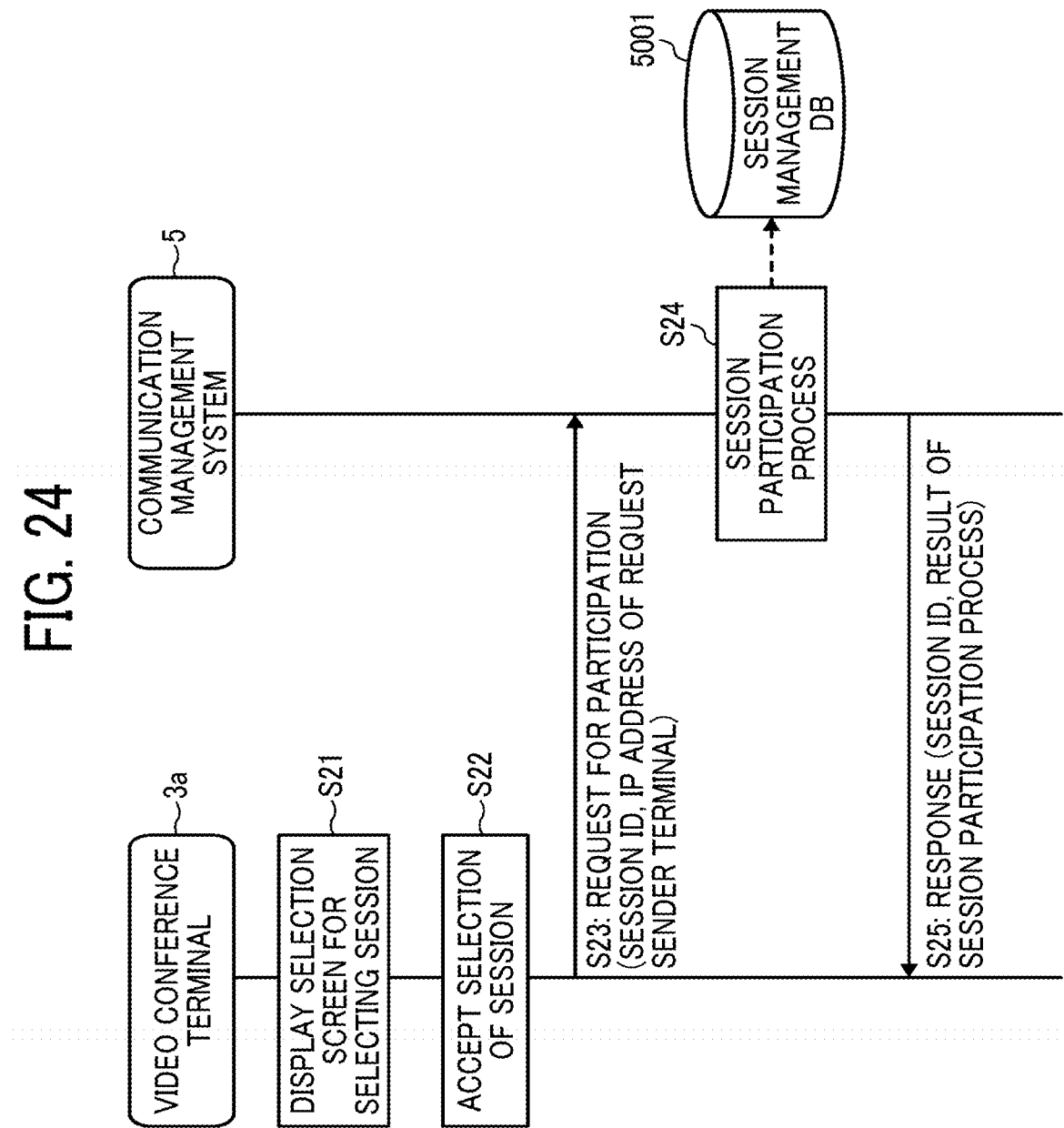
FIG. 24 is a sequence diagram illustrating an operation of participating in a specific communication session, according to an embodiment of the present disclosure.
Figure 25:
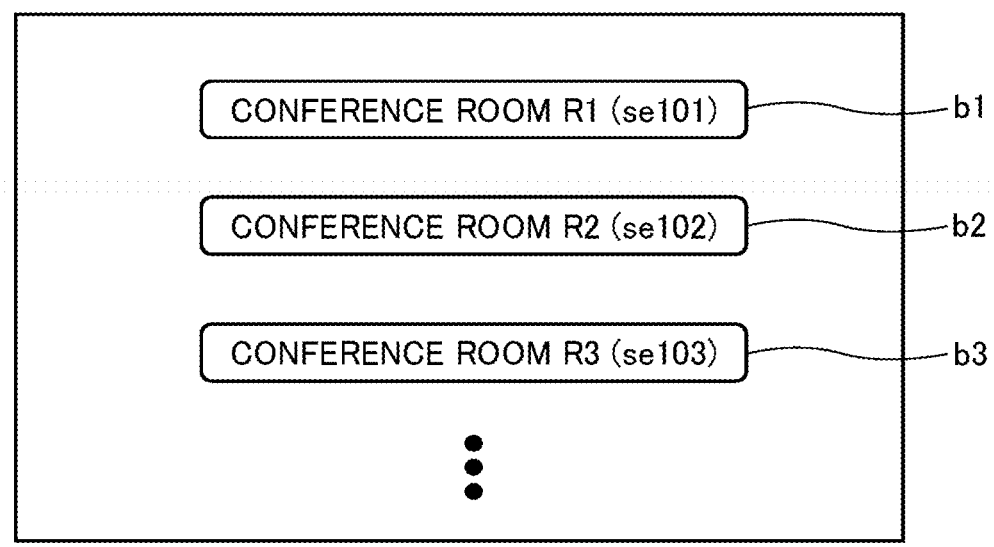
FIG. 25 is an illustration of a session selection screen for selecting a communication session (virtual conference room), according to an embodiment of the present disclosure.

Referring to FIG. 24 and FIG. 25, an operation of participating in a specific communication session is described, according to the present embodiment. FIG. 24 is a sequence diagram illustrating an operation of participating in a specific communication session, according to the present embodiment. FIG. 25 is an illustration of a session selection screen for selecting a communication session (virtual conference room), according to the present embodiment.

When a user in the site A (e.g., user A1) operates the videoconference terminal 3a to display the session selection screen for selecting a desired communication session (virtual conference room), the receiving unit 32a receives the operation to display the session selection screen. Accordingly, the display control unit 34a causes the display 4a to display the session selection screen as illustrated in FIG. 25 (step S21). In the session selection screen, selection buttons b1, b2, and b3 are displayed. The selection buttons b1, b2, and b3 respectively indicates virtual conference rooms R1, R2, R3, each of which is a selection target. Each of the selection buttons b1, b2, and b3 is associated with a corresponding session ID.

When the user A1 selects a desired selection button (in this example, the selection button b1) on the session selection screen, the receiving unit 32a receives selection of a corresponding communication session (step S22). Then, the data exchange unit 31a transmits a request to participate in the communication session, namely to enter the corresponding virtual conference room, to the communication management system 5 (step S23). This participation request includes a session ID identifying the communication session for which the selection is received in step S22, and the IP address of the videoconference terminal 3a, which is a request sender terminal. The communication management system 5 receives the participation request at the data exchange unit 51.

Next, the data storage/read unit 59 performs a process for causing the videoconference terminal 3a to participate in the communication session (step S24). More specifically, the data storage/read unit 59 adds, in the session management DB 5001 (FIG. 21), the IP address that is received in step S23 to a field of the participant terminal IP address in a record of the session ID that is the same as the session ID received in step S23. The data exchange unit 51 transmits a response to the participation request to the videoconference terminal 3a (step S25). This response to the participation request includes the session ID that is received in step S23, and a result of the participation operation. The videoconference terminal 3a receives the response to the participation request at the data exchange unit 31a. The following describes a case where the operation for causing the videoconference terminal 3a to participate in the communication session, namely the participation process, is successfully completed.

<Operation of Managing Image Type Information>

Figure 26:
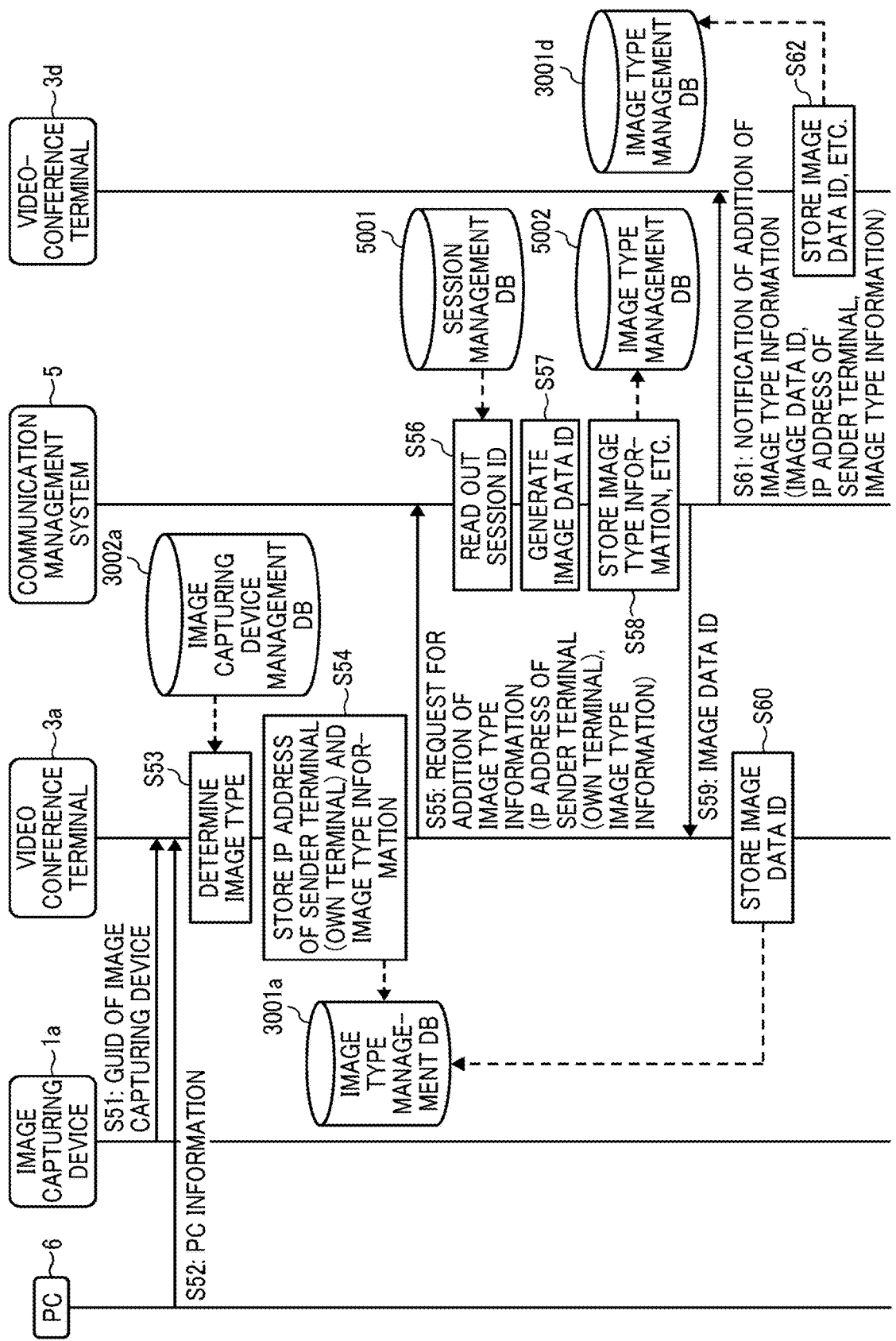
FIG. 26 is a sequence diagram illustrating an operation of managing image type information, according to an embodiment of the present disclosure.

Next, referring to FIG. 26, an operation of managing the image type information is described, according to the present embodiment. FIG. 26 is a sequence diagram illustrating an operation of managing the image type information, according to the present embodiment.

When a user (e.g., the user A1) in the site A connects the cradle 2a, to which the image capturing device 1a and the PC 6 is connected, to the videoconference terminal 3a, using a cable such as a USB cable, the data storage/read unit 19a of the image capturing device 1a reads out the GUID of the own device (e.g., the image capturing device 1a) from the memory 1000a. Then, the communication unit 18a of the image capturing device 1a transmits the own device's GUID to the communication unit 38a of the videoconference terminal 3a (step S51). The videoconference terminal 3a receives the GUID of the image capturing device 1a at the communication unit 38a.

Further, the data storage/read unit 69 of the PC 6 reads out PC information of the own device (i.e., PC 6) stored in the memory 6000, and the communication unit 68 of the PC 6 transmits the PC information of the own device to the communication unit 38a of the videoconference terminal 3a (step S52). The videoconference terminal 3a receives the PC information of the PC 6 at the communication unit 38a. The PC information can be any suitable information, provided that based on the PC information, the videoconference terminal 3a can identify the PC 6 as a PC that generates a document image (document image data). For example, information based on which the videoconference terminal 3a identifies a terminal that generates a document image is set in advance, such as product information of the PC 6 itself or product information of an application with which the PC 6 generates a document image.

For example, information such as product information of the PC 6 or product information of an application used by the PC 6 for generating the document image, which can be identified by the videoconference terminal 3a, can be set in advance as the PC information.

In addition, although as described with reference to FIG. 11, when the image capturing device 1a is connected, the image capturing device 1a is used in preference, the camera 312 that is built in the videoconference terminal 3a can be used in combination.

Next, the determination unit 35a of the videoconference terminal 3a determines an image type (step S53).

First, a description is given of how the determination unit 35a determines an image type of the image capturing device 1a. The determination unit 35a determines whether a vendor identifier (ID) and a product identifier (ID) same as the GUID received in step S51 are stored in the image capturing device management DB 3002a (see FIG. 17) to determine the image type (step S53). More specifically, the determination unit 35a determines that the image capturing device 1a is an image capturing device that captures a special image (a spherical panoramic image, in the embodiment), when the same vender ID and product ID are stored in the image capturing device management DB 3002a. By contrast, the determination unit 35a determines that the image capturing device 1a is an image capturing device that captures a general image, when the same vender ID and product ID are not stored in the image capturing device management DB 3002a. With respect to the camera 312 of the videoconference terminal 3a, the determination unit 35 of the videoconference terminal 3a determines that the camera 312 is an image capturing device that captures a general image, since the same vender ID and product ID are not stored in the image capturing device management DB 3002a.

Next, a description is given of how the determination unit 35a determines an image type of the PC 6. The determination unit 35a of the videoconference terminal 3a determines whether the PC information received in step S52 is the information that is set in advance for identifying a terminal that transmits a document image, to identify the image type. When the PC information received in step S52 is the information that is set in advance, the determination unit 35a identifies the PC 6 as an apparatus that generates a document image.

Next, the data storage/read unit 39a stores, in the image type management DB 3001a (see FIG. 16), the IP address of the own terminal (i.e., videoconference terminal 3a), which is a sender terminal of captured-image data, in association with the image type information, which is a determination result determined in step S53 (step S54). In this state, any image data ID is not yet associated with the image type information. Examples of the image type information include a source name, which is determined according to the naming rule, and an image type (general image, special image, or document image).

Next, the data exchange unit 31a transmits a request for addition of the image type information to the communication management system 5 (step S55). This request for addition of image type information includes the IP address of the own terminal (videoconference terminal 3a) as a sender terminal, and the image type information, both being stored in step S54 in association with each other. In the present embodiment, as an example, the request for addition of image type information includes the IP address of the own terminal (videoconference terminal 3a) as a sender terminal and three types of image type information indicating the general image, the special image, and the document image. The communication management system 5 receives the request for addition of the image type information at the data exchange unit 51.

Next, the data storage/read unit 59 of the communication management system 5 searches the session management DB 5001 (see FIG. 21) using the IP address of the sender terminal received in step S55 as a search key, to read out the session ID associated with the IP address (step S56).

Next, the generator 56 generates an image data ID unique to each image (step S57). In the present embodiment, the generator 56 generates the unique image data ID for each of the general image, the special image, and the document image.

Then, the data storage/read unit 59 adds, in the image type management DB 5002 (see FIG. 22), a new record associating the session ID that is read out in step S56, the image data ID generated in step S57, the IP address of the sender terminal and the image type information that are received in step S55, with one another (step S58). In the present embodiment, as an example, three records are added. One record of the three records associates the image data ID generated for the general image in step S57 with the IP address of the sender terminal and the image type information indicating the general image that are received in step S55. Another one record of the three records associates the image data ID generated for the special image in step S57 with the IP address of the sender terminal and the image type information indicating the special image that are received in step S55. Still another one record of the three records associates the image data ID generated for the document image in step S57 with the IP address of the sender terminal and the image type information indicating the document image that are received in step S55.

The data exchange unit 51 transmits the image data IDs generated in step S57 to the videoconference terminal 3a. The videoconference terminal 3a receives the image data IDs at the data exchange unit 31a (step S59).

Next, the data storage/read unit 39a of the videoconference terminal 3a stores, in the image type management DB 3001a (see FIG. 16), the image data IDs received in step S59, in association with the IP address of the own terminal (i.e., videoconference terminal 3a) as the sender terminal and the image type information that are stored in step S54 (step S60).

Further, the data exchange unit 51 of the communication management system 5 transmits a notification indicating the addition of the image type information to another communication terminal (videoconference terminal 3d in the present embodiment) (step S61). This notification indicating addition of the image type information includes the image data IDs generated in step S57, and the IP address of the own terminal (i.e., videoconference terminal 3a) as the sender terminal and the image type information that are stored in step S55. The videoconference terminal 3d receives the notification indicating the addition of the image type information at the data exchange unit 31d. The destination of the notification transmitted by the data exchange unit 51 is indicated by an 1P address associated with the session ID with which the IP address of the videoconference terminal 3a is associated in the session management DB 5001 (see FIG. 21). In other words, the destination includes other communication terminal(s) that is (are) in the same virtual conference room where the videoconference terminal 3a is participating.

Next, the data storage/read unit 39d of the videoconference terminal 3d adds, in the image type management DB 3001d (see FIG. 16), new records, each associating the image data ID, the IP address of the sender terminal, and the image type information, which are received in step S60 (step S62). In substantially the same manner, the notification of addition of the image type information is transmitted to the smartphone 9 and the PC 7, which are other communication terminals, and then the smartphone 9 and the PC 7 stores the image type information, etc. in the image type management DB 9001 and the image type management DB 7001, respectively. Through the operation as described above, the same information is shared among the communication terminals by being stored in the image type management DB 3001a, the image type management DB 3001d, the image type management DB 7001 and the image type management DB 9001.

<Operation of Communicating Captured-Image Data>

Figure 27:
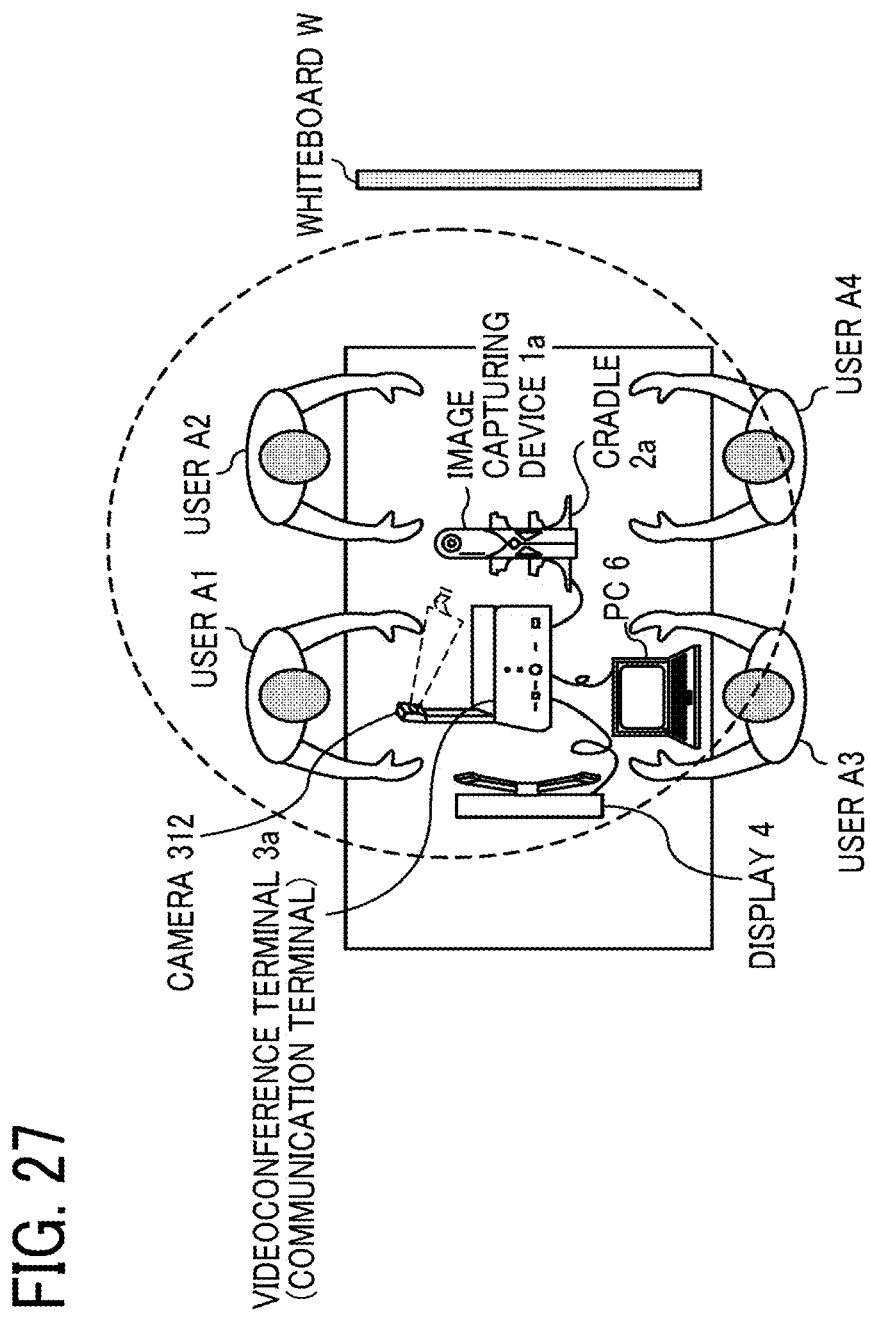
FIG. 27 is an illustration of a state of video communication, according to an embodiment of the present disclosure.

Next, referring to FIG. 27 to FIG. 35, an operation of communicating captured-image data and document image data in video communication is described according to the present embodiment. FIG. 27 is an illustration of an example state of video communication performed in the site A.

As illustrated in FIG. 27, the videoconference terminal 3a combines an image captured by the camera 312 and a document image generated by the PC 6 with a spherical panoramic image captured by the image capturing device 1a and displays, on the display 4, the spherical image with which the captured image and the document image is combined. In addition, a whiteboard W, which is illustrated in the right side of FIG. 27, is provided in the site A, and the users A1 to A4 can write characters or pictures on the whiteboard W.

Figure 28:
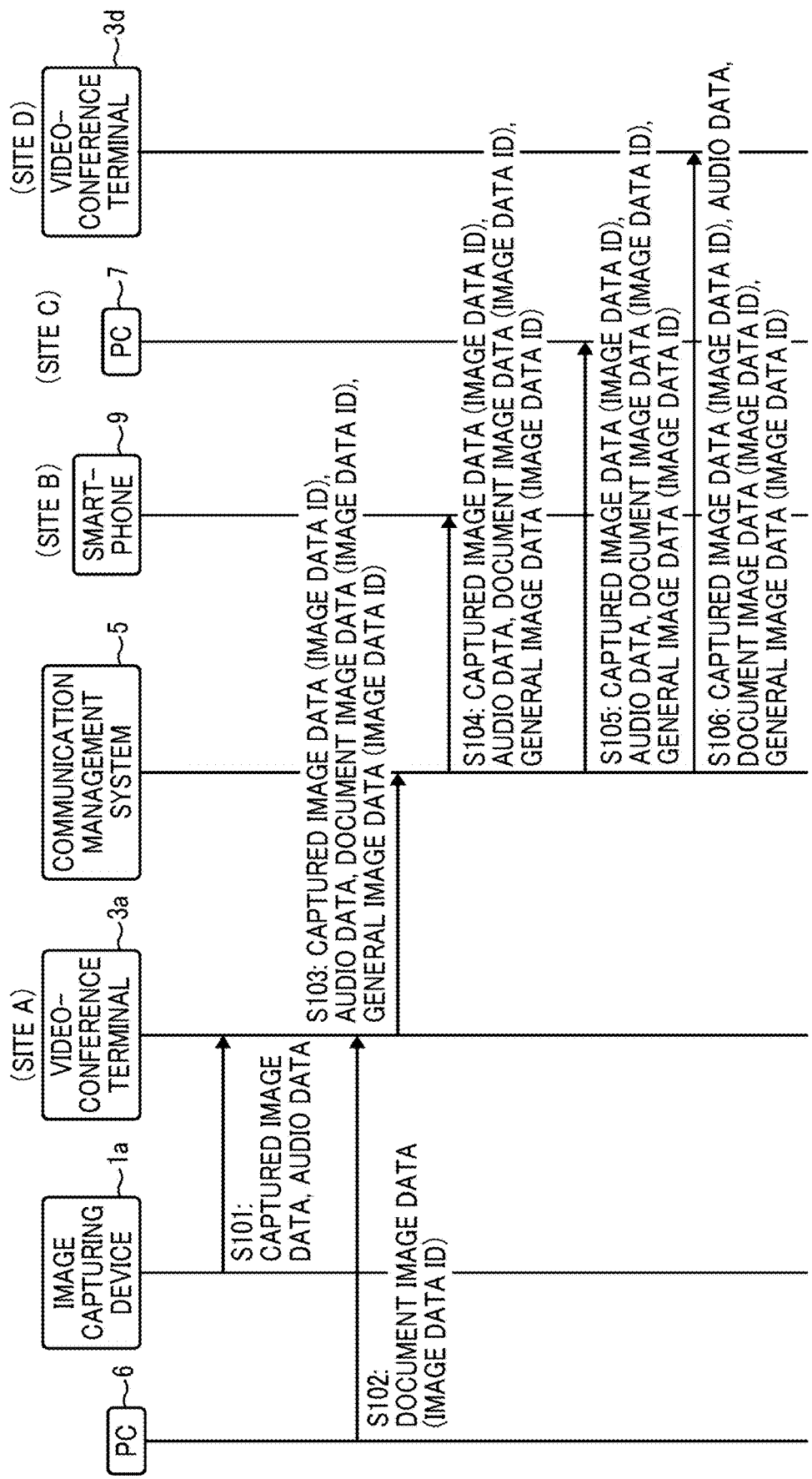
FIG. 28 is a sequence diagram illustrating an operation of transmitting captured-image data, audio data, and document image data in video communication, according to an embodiment of the present disclosure.

Referring to FIG. 28, a description is given of an operation of transmitting captured-image data, audio data and document image data obtained in the site A illustrated in FIG. 27 to each of other communication terminals (smartphone 9, PC 7, and videoconference terminal 3d) via the communication management system 5, according to the embodiment. FIG. 28 is a sequence diagram illustrating an operation of transmitting captured-image data and document image data in video communication, according to the embodiment.

The communication unit 18a of the image capturing device 1a transmits captured-image data obtained by capturing a subject or surrounding and audio data obtained by collecting sounds to the communication unit 38a of the videoconference terminal 3a (step S101). Because the image capturing device 1a is a device that is configured to obtain two hemispherical images, from which a spherical panoramic image is generated, the captured-image data is configured by data of the two hemispherical images as illustrated in FIG. 3A and FIG. 3B. The videoconference terminal 3a receives the captured-image data and the audio data at the communication unit 38a.

Next, the communication unit 68 of the PC 6 transmits the document image data displayed by the display control unit 64 to the communication unit 38a of the videoconference terminal 3a (step S102).

Next, the data exchange unit 31 of the videoconference terminal 3a transmits, to the communication management system 5, the captured-image data and the audio data received from the image capturing device 1a, the document image data received from the PC 6, and captured-image data of an image captured by the camera 312 of the videoconference terminal 3a (step S103). The communication management system 5 receives the captured-image data obtained by the image capturing device 1a, the captured-image data obtained by the camera 312, the audio data, and the document image data at the data exchange unit 51. Each of the captured-image data transmitted in step S103 includes an image data ID identifying the captured-image data, which is a transmission target.

Next, the data exchange unit 51 of the communication management system 5 transmits the captured-image data obtained by the image capturing device 1a, the captured-image data obtained by the camera 312, the audio data, and the document image data to each of other participant communication terminals (i.e., smartphone 9, the PC 7, and the videoconference terminal 3d) participating in the same video communication in which the videoconference terminal 3a is participating (steps S104, S105, S106). In each of these steps, along with each of the captured-image data, the image data ID identifying the captured-image data, which is a transmission target, is also transmitted. Accordingly, each of the data exchange unit 91 of the smartphone 9, the data exchange unit 71 of the PC 7 and the data exchange unit 31d of the videoconference terminal 3d receives the image data IDs associated respectively with the two pieces of captured-image data and the image data ID associated with the document image data, and further receives the audio data.

Figure 29A:
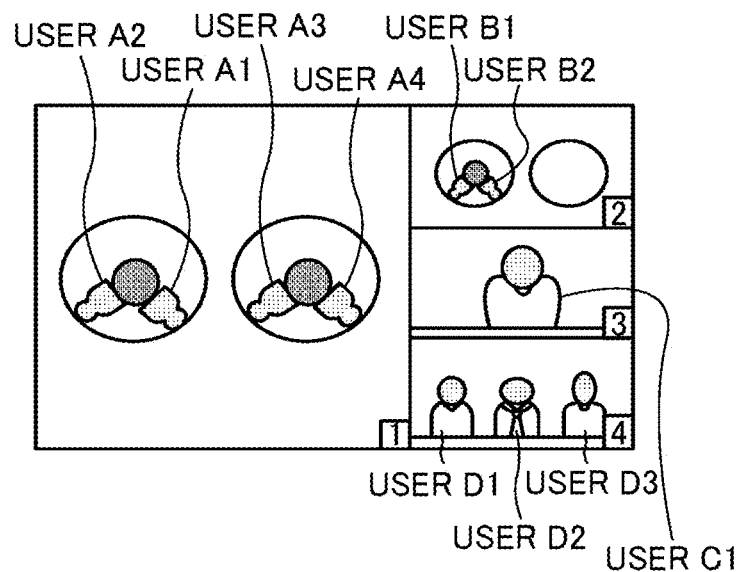
FIG. 29A is an illustration of an example of a screen of a display in one site, in which the display displays images corresponding to captured-image data image data transmitted via the videoconference terminal from the image capturing device of FIG. 1A to FIG. 1C, without generating a spherical panoramic image and a predetermined-area image, according to an embodiment of the present disclosure.
Figure 29B:
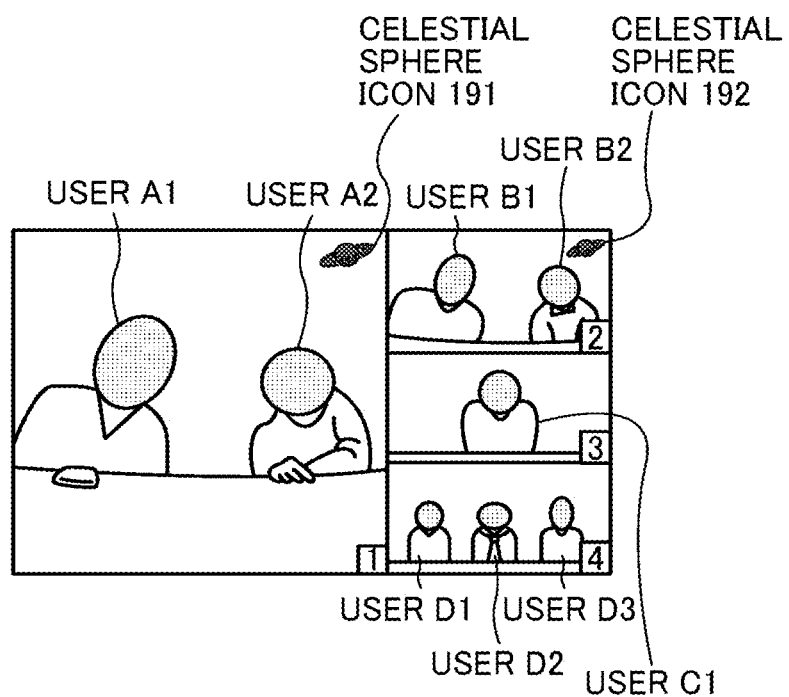
FIG. 29B is an illustration of another example of the screen of the display in one site, in which the display displays a spherical panoramic image and a predetermined-area image generated based on image data transmitted via the videoconference terminal from the image capturing device of FIG. 1A to FIG. 1C, according to an embodiment of the present disclosure.
Figure 29C:
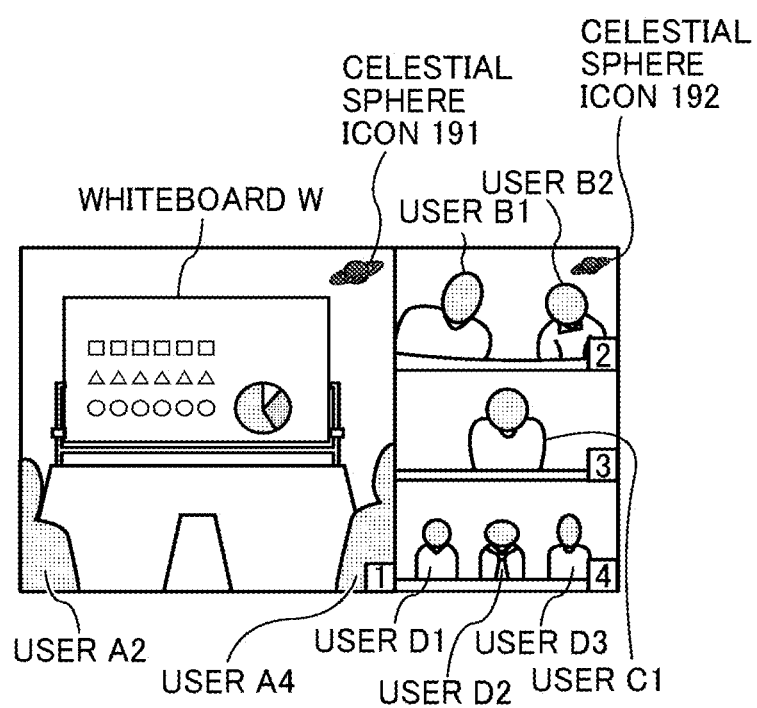
FIG. 29C is an illustration of still another example of the screen of a display in one site, in which the predetermined-area image of FIG. 29B is changed, according to an embodiment of the present disclosure.

Next, referring to FIG. 29A, FIG. 29B and FIG. 29C, examples of a screen of the display 917 in the site B are described, according to the present embodiment. FIG. 29A, FIG. 29B, and FIG. 29C are illustrations of examples of a screen displayed on the display 917 in the site B, according to the present embodiment. FIG. 29A is an illustration of a screen displayed in the site B, in which the screen includes an image based on captured-image data transmitted from the image capturing device 1a in the site A via the videoconference terminal 3a, and another image based on captured-image data transmitted from the image capturing device 1b in the site B, without generating a spherical panoramic image and a predetermined-area image. On the other hand, FIG. 29B is an illustration of a screen displayed in the site B, in which the screen includes images that are displayed after a spherical panoramic image and a predetermined-area image are generated based on the captured-image data transmitted from the image capturing device 1a in the site A via the videoconference terminal 3a and the captured-image data transmitted from the image capturing device 1b in the site B. In the example of FIG. 27A to FIG. 27C, an image of the site A is displayed in a left-side display area (layout number "1") of the display 917, and an image of the site B (own site) is displayed in an upper-right display area (layout number "2"). Further, in a middle-right display area (layout number "3") of the display 917, an image of the site C is displayed, and an image of the site D is displayed in a lower-right display area (layout number "4"). The display area having the layout number "1" is a main display area, and the display areas with the layout numbers "2", "3" and "4" are sub display areas. An image to be displayed in the main display area and an image to be displayed in the sub display area can be switched in each communication terminal. In general, an image in which a main person in the video communication is included is displayed in the main display area at each site.

When captured-image data transmitted from the image capturing device 1a and the image capturing device 1b, each being configured to capture a spherical panoramic image, are displayed as they are, the images of the site A and the site B are displayed as illustrated in FIG. 29A, i.e., each image is displayed as a combination of a hemispherical image on the front side and a hemispherical image on the back side, as respectively illustrated in FIG. 3A and FIG. 3B.

On the other hand, when the image/audio processor 93 generates a spherical panoramic image based on the captured-image data output from the image capturing device 1a and the image capturing device 1b, each of which is configured to obtain two hemispherical images from which a spherical panoramic image is generated, and further generates a predetermined-area image, the predetermined-area image, which is a planar image, is displayed as illustrated in FIG. 29B. Further, in both of FIG. 29A and FIG. 29B, a general image (planar image in the present embodiment) is displayed in each of the display areas of the site C and site D, because the image capturing device 8 and the camera 312 built in the videoconference terminal 3d, each being an image capturing device that obtains a general image, are used in the site C and the site D, respectively.

Furthermore, a user in each site can change the predetermined area corresponding to the predetermined-area image in the same spherical panoramic image. For example, when the user B1 operates the touch panel 921, the receiving unit 92 receives a user operation to shift the predetermined-area image, and the display control unit 94 shifts, rotates, reduces, or enlarges the predetermined-area image. Thereby, a default predetermined-area image in which the user A1 and the user A2 are displayed as illustrated in FIG. 29B, is changeable to another predetermined-area image as illustrated in FIG. 29C, for example. More specifically, FIG. 29C illustrates an example of the screen in which the predetermined-area image is changed from one including the users A1 and A2 to another one including the whiteboard W, in the captured image of the site A as illustrated in FIG. 27.

A celestial sphere icon 191 illustrated in FIG. 29B and a celestial sphere icon 192 illustrated in FIG. 29C are examples of a special image identification icon indicating that an image being displayed is a predetermined-area image corresponding to the predetermined area T, which is a part of a spherical panoramic image. Although in examples of FIG. 29B and FIG. 29C, each of the celestial sphere icon 191 and the celestial sphere icon 192 is displayed in an upper right corner, alternatively, each of the celestial sphere icon 191 and the celestial sphere icon 192 is displayed at any other suitable position such as in an upper left corner, a lower left corner, a lower right corner. In addition, a type of each of the celestial sphere icon 191 and the celestial sphere icon 192 is not limited to the one illustrated in FIG. 29B and FIG. 29C. Further, in alternative to or in addition to the celestial sphere icon 191 and the celestial sphere icon 192, a character string such as "Spherical Image", or a combination of the icon and characters can be used.

Referring to FIG. 30, an operation performed by the image communication system is described, when a predetermined-area image as illustrated in FIG. 29B is displayed and the predetermined-area image is changed from the one as illustrated in FIG. 29B to another one as illustrated in FIG. 29C. FIG. 30 is a sequence diagram illustrating an operation of sharing predetermined-area information. In FIG. 30, the videoconference terminal 3a in the site A is an example of a third communication terminal, the videoconference terminal 3d in the site D is an example of another communication terminal, and the smartphone 9 in the site B is an example of a communication terminal (own terminal).

First, when the user D1, D2 or D3 operates the videoconference terminal 3d in the site D to display the predetermined-area image of the site A as illustrated in FIG. 29B, the data exchange unit 31d of the videoconference terminal 3d transmits, to the communication management system 5, predetermined-area information indicating the predetermined-area image currently being displayed (step S111). This predetermined-area information includes the IP address of the videoconference terminal 3a, which is a sender terminal of the captured-image data, and the IP address of the videoconference terminal 3d, which is a destination terminal of the captured-image data. In this example, the videoconference terminal 3d is also a sender terminal of the predetermined-area information. The communication management system 5 receives the predetermined-area information including the IP addresses at the data exchange unit 51.

The data storage/read unit 59 of the communication management system 5 stores, in the predetermined-area management DB 5003, the predetermined-area information and the IP address of the sender terminal and the IP address of the destination terminal, which are received in step S111, in association with one another (step S112). The processes in steps S111 and 112 are performed each time the predetermined-area image is changed in the videoconference terminal 3d, for example, from the one as illustrated in FIG. 29B to another one as illustrated in FIG. 29C.

The data storage/read unit 59 of the communication management system 5 reads out, from a plurality of sets of the predetermined-area information and the IP addresses of the sender terminal and the destination terminal stored in the predetermined-area management DB 5003, the latest (the most recently stored) set of predetermined-area information and the IP addresses of the sender terminal and the destination terminal, at preset intervals such as every thirty seconds (step S113). Next, the data exchange unit 51 distributes (transmits) the predetermined-area information including the IP addresses read in step S113, to other communication terminals (the videoconference terminal 3a, the smartphone 9, the PC 7) participating in the same video communication in which the videoconference terminal 3d, which is the sender terminal of the predetermined-area information, is participating (steps S114, S116, S118). The videoconference terminal 3a receives the predetermined-area information and the IP addresses at the data exchange unit 31a. The data storage/read unit 39a stores the predetermined-area information and the IP addresses received in step S114 in association with one another in the predetermined-area management DB 3003a (step S115). In substantially the same manner, the smartphone 9 receives the predetermined-area information and the IP addresses at the data exchange unit 91. The data storage/read unit 99 stores the predetermined-area information and the IP addresses received in step S116 in association with one another in the predetermined-area management DB 9003 (step S117). Further, the PC 7 receives the predetermined-area information and the IP addresses at the data exchange unit 71. The data storage/read unit 79 stores, in the predetermined-area management DB 7003, the predetermined-area information received in step S118 in association with the IP addresses that are also received in step S118 (step S119).

Figure 31:
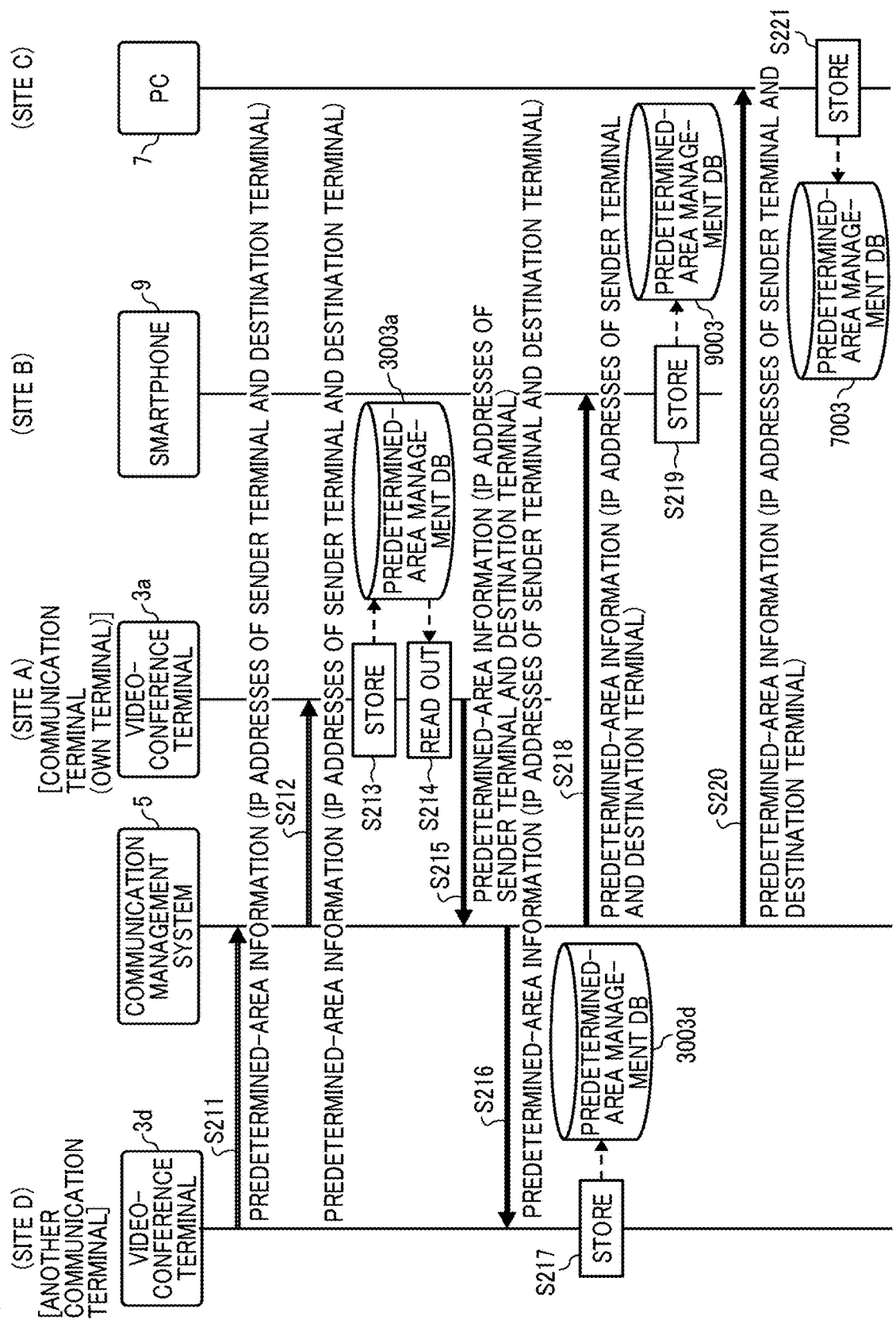
FIG. 31 is a sequence diagram illustrating another operation of sharing the predetermined-area information, according to an embodiment of the present disclosure.

Referring to FIG. 31, another operation of sharing predetermined-area information is described according to the present embodiment. FIG. 31 is a sequence diagram illustrating another example of an operation of sharing predetermined-area information described above referring to FIG. 30. In FIG. 31, the videoconference terminal 3a in the site A is an example of a communication terminal (own terminal), and the videoconference terminal 3d in the site D is an example of another communication terminal.

In the operation described above referring to FIG. 30, the communication management system 5 once stores predetermined-area information transmitted from any one of the communication terminals (see step S112) and transmits the predetermined-area information at regular intervals to each of the other communication terminals other than the communication terminal that transmits the predetermined-area information (see steps S114 to S119). By contrast, according to the present embodiment, in the operation illustrated in FIG. 31, not the communication management system 5 but any one of the communication terminals as a sender terminal of captured-image data (the videoconference terminal 3a, in this example) once stores predetermined-area information (see step S213), and transmits the predetermined-area information to each of the other communication terminals than the own terminal (the videoconference terminal 3a) at regular intervals (see steps S215 to S221). In other words, in the present embodiment, a communication terminal as a sender terminal of captured-image data manages how a predetermined-area image representing the predetermined area T1 is displayed by each of the other communication terminals based on the captured-image data transmitted from the own terminal (the videoconference terminal 3a, in this example).

The operation illustrated in FIG. 31 is implemented by a common hardware configuration that implements the operation illustrated in FIG. 30. Therefore, a description of a hardware configuration for implementing the operation illustrated in FIG. 31 is omitted.

In the operation illustrated in FIG. 31, firstly, when the user D1, D2 or D3 operates the videoconference terminal 3d in the site D to display a predetermined-area image of the site A, the data exchange unit 31d of the videoconference terminal 3d transmits, to the communication management system 5, predetermined-area information indicating the predetermined-area image currently being displayed (step S211). This predetermined-area information includes the IP address of the videoconference terminal 3a, which is a sender terminal of the captured-image data, and the IP address of the videoconference terminal 3d, which is a destination terminal of the captured-image data. In this example, the videoconference terminal 3d is also a sender terminal of the predetermined-area information. Thus, the data exchange unit 51 of the communication management system 5 receives the predetermined-area information.

Next, the data exchange unit 51 of the communication management system 5 transmits the predetermined-area information including the IP addresses received in step S211 to the videoconference terminal 3a, which is a sender terminal of the captured-image data (step S212). The videoconference terminal 3a receives the predetermined-area information and the IP addresses at the data exchange unit 31a.

Next, the data storage/read unit 39a of the videoconference terminal 3a stores, in the predetermined-area management DB 3003a, the predetermined-area information, the IP address of the sender terminal and the IP address of the destination terminal, which are received in step S212, in association with one another (step S213). This process of step S213 is a process of managing how the captured-image data transmitted from the own terminal (videoconference terminal 3a, in this example) is displayed in each of the other communication terminals. The processes in steps S211 to S213 are performed each time the predetermined-area image is changed in the videoconference terminal 3d.

The data storage/read unit 39a of the videoconference terminal 3a reads out, from a plurality of sets of the predetermined-area information and the IP addresses the sender terminal and the destination terminal stored in the predetermined-area management DB 3003a, the latest (the most recently stored) set of predetermined-area information and the IP addresses of the sender terminal and the destination terminal, at preset intervals such as every thirty seconds (step S214). Then, the data exchange unit 31a transmits the predetermined-area information including the IP addresses read out in step S214 to the communication management system 5 (step S215). Thus, the data exchange unit 51 of the communication management system 5 receives the predetermined-area information.

Next, the data exchange unit 51 of the communication management system 5 transmits (distributes) the predetermined-area information including the IP addresses received in step S215 to each of the communication terminals (videoconference terminal 3d, smartphone 9, PC 7) (steps S216, S218, S220). The videoconference terminal 3d receives the predetermined-area information including the IP addresses at the data exchange unit 31d. The data storage/read unit 39d stores, in the predetermined-area management DB 3003d, the predetermined-area information received in step S216 in association with the IP addresses that are also received in step S216 (step S217). In substantially the same manner, the smartphone 9 receives the predetermined-area information and the IP addresses at the data exchange unit 91. The data storage/read unit 99 stores, in the predetermined-area management DB 9003, the predetermined-area information received in step S218 in association with the IP addresses that are also received in step S218 (step S219). Further, the PC 7 receives the predetermined-area information and the IP addresses at the data exchange unit 71. The data storage/read unit 79 stores, in the predetermined-area management DB 7003, the predetermined-area information received in step S220 in association with the IP addresses that are also received in step S220 (step S221).

Thus, the predetermined-area information indicating the predetermined-area image changed in the site A is transmitted to each of the communication terminals in the other sites B, C and D participating in the same video communication. As a result, the predetermined-area information indicating the predetermined-area image being displayed in the site A is shared by the other communication terminals in the other sites B, C and D. This operation is performed in substantially the same manner, when the predetermined-area image being displayed at any one of the communication terminals in the sites B, C, and D is changed. Accordingly, the predetermined-area information indicating the predetermined-area image being displayed by the communication terminal in any one of the sites is shared by the other communication terminals in the other sites which are participating in the same video communication.

<Changing Layer Display Order>

Figure 32:
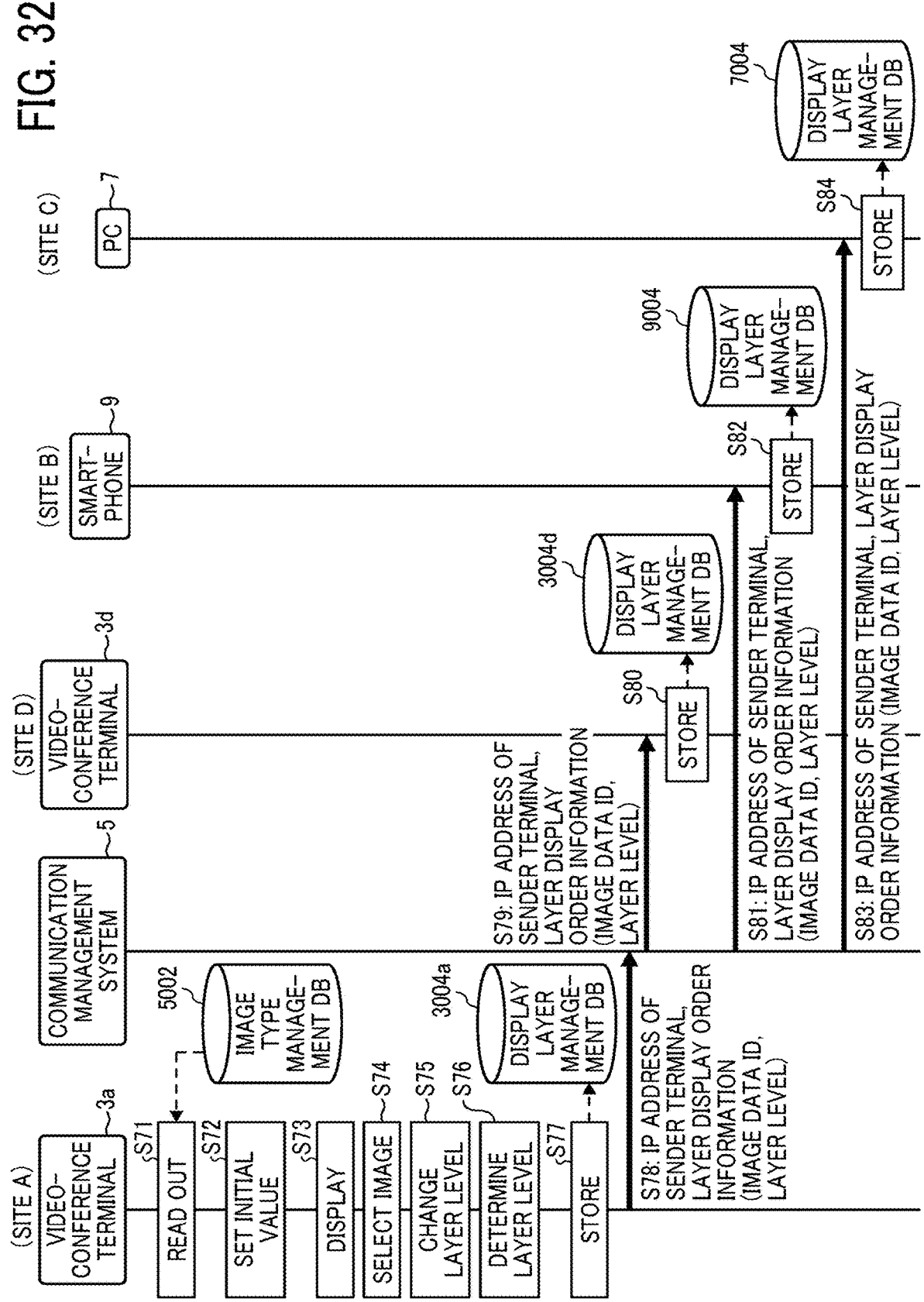
FIG. 32 is a sequence diagram illustrating an operation of sharing layer display order information, according to an embodiment of the present disclosure.

Hereinafter, referring to FIG. 32 to FIG. 34, a description is given of setting of a layer display order for a document image. FIG. 32 is a sequence diagram illustrating an operation performed by the image communication system. More specifically, FIG. 32 is a sequence diagram illustrating an operation performed when the videoconference terminal 3a, which is a sender terminal of an image and provided in the site A, changes a layer display order of a document image with a spherical panoramic image when combining the document image with the spherical panoramic image.

First, the data storage/read unit 39a of the videoconference terminal 3a reads out, from the image type management DB 5002, image data IDs associated with the IP address of the own terminal (i.e. the videoconference terminal 3a) (step S71).

Next, the generator 36a sets an initial value of the layer level of each of the image data IDs in association with each of the read-out image data IDs (step S72). For example, the generator 36a sets the initial value of the layer level of the image data ID stored in the first record of the image type management DB 5002 to "base", and sets the initial values of the layer levels of the image data IDs stored in the subsequent records to sequential numbers such as "1" and "2". This layer display order set by the generator 36a is unique to each of the IP addresses of the sender terminals. In another example, the generator 36a can further set the initial values of display coordinates. For example, the generator 36a sets the display coordinates of an image corresponding to the layer level "base", such that the image is displayed in a full screen size. Further, for example, the generator 36a sets the display coordinates of images corresponding to the layer level "1" and subsequent numbers, such that each of the images is displayed in a fixed size. Furthermore, for example, the generator 36a sets the display coordinates of an image corresponding to the layer level "1", such that the image is displayed in the left corner of the full screen. Still further, for example, the generator 36a sets the display coordinates of images corresponding to the layer level "1" and subsequent numbers, such that one image corresponding to a given level is displayed to the right side of another image corresponding to a level lower than the given level by one.

Next, the display control unit 34a displays a combined image obtained by combining the images corresponding to the image data IDs that is read out in step S71 in accordance with the initial values set in step S72 (step S73). In a case where the display coordinates of the images are not set, the combined image is displayed in accordance with the layer display order, with the display positions of the images being arbitrary.

Next, a description is given of changing the layer display order. The receiving unit 32a receives selection of a document image according to an operation by the user A1, A2, A3 or A4 in the site A (step S74). For example, the user A1, A2, A3 or A4 selects the document image by right clicking, double clicking, or pressing a corresponding key on the document image displayed in a preview screen of the spherical panoramic image being distributed from the videoconference terminal 3a. In a case where a terminal including a touch panel as an input device is used, the user can select the document image by long tapping or double tapping the document image displayed in the preview screen.

Next, the receiving unit 32a receives a change of the layer level of the document image according to an operation by the user A1, A2, A3 or A4 (step S75).

Next, the receiving unit 32a receives determination of the layer level of the document image according to an operation by the user A1, A2, A3 or A4, and the calculation unit 37a generates layer display order information (step S76). For example, the receiving unit 32a receives that the layer display order is determined automatically after the operation in step S75. In another example, the receiving unit 32a receives the determination of the layer display order according to the user operation of pressing an "Enter" button on the screen or pressing a preset key.

Figure 33:
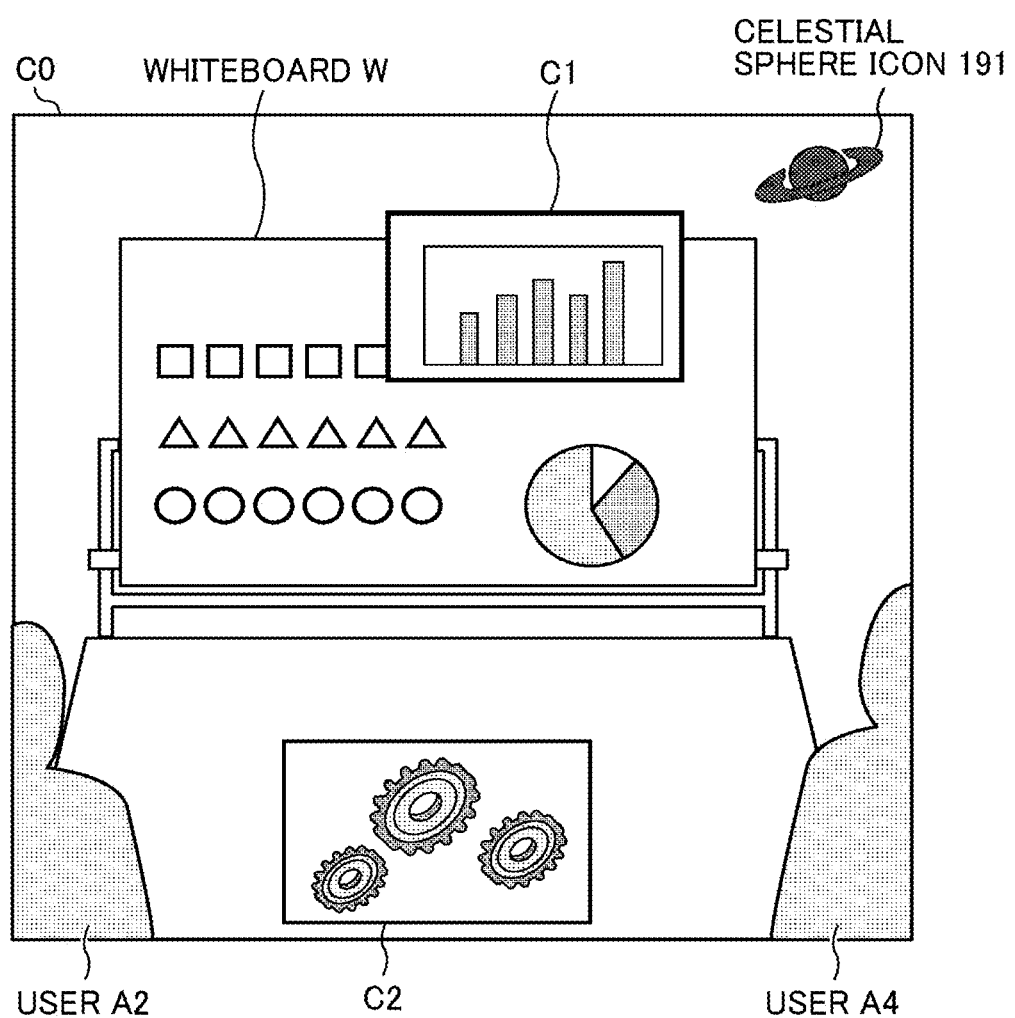
FIG. 33 is an illustration of an example of a screen displayed in one site, according to an embodiment of the present disclosure.
Figure 34:
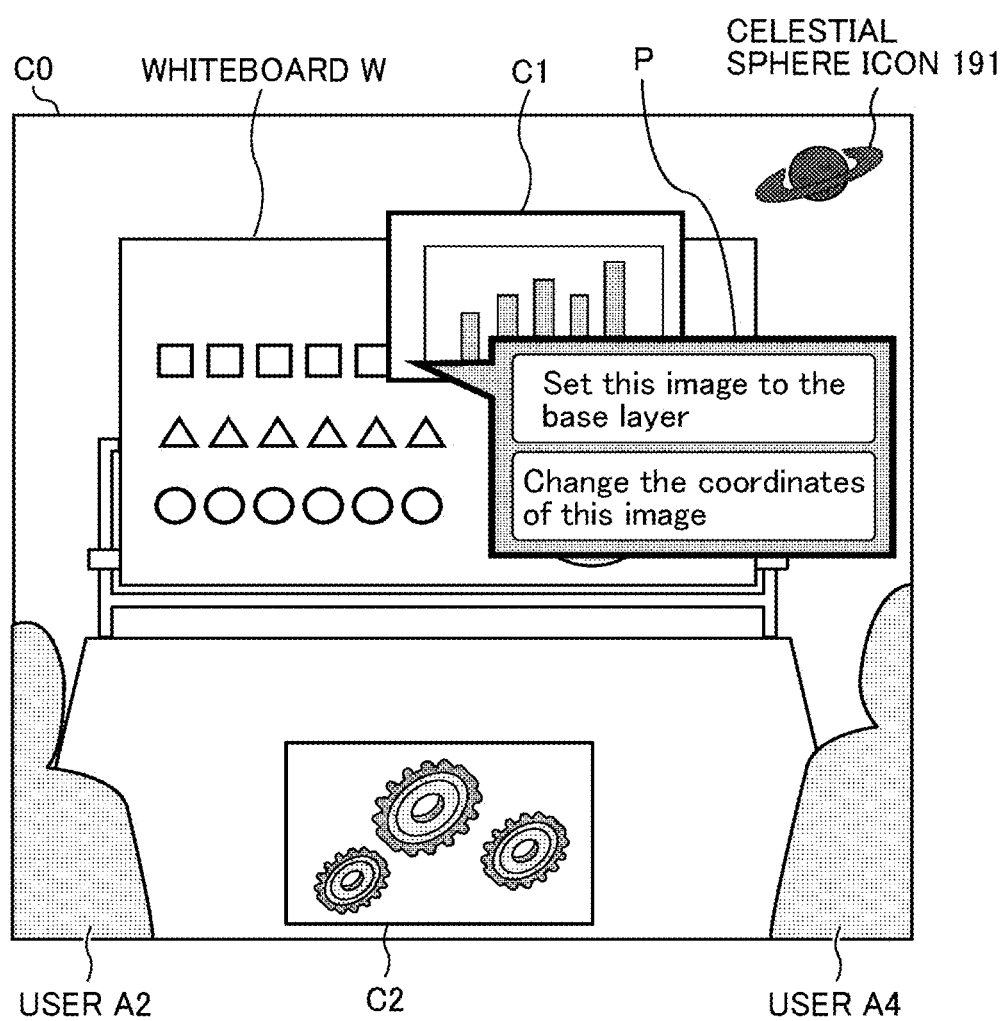
FIG. 34 is an illustration of an example of a screen displayed when changing a layer display order, according to an embodiment of the present disclosure.

Referring to FIG. 33 and FIG. 34, a description is given of an example of a screen displayed when the user A1, A2, A3 or A4 changes the layer level of the document image. FIG. 33 is an illustration of an example of a preview screen of a spherical panoramic image in the site A. In the present embodiment, the preview screen refers to a screen viewed by a user in a given site so that the user confirms a video image that is distributed by a communication terminal provided in the given site, not through the communication network 100. As illustrated in FIG. 33, a predetermined-area image, which is a part of the spherical panoramic image and includes the user A2, the user A4, and the whiteboard W, is displayed as a base layer image in Region C0 of the preview screen. Characters and a pie chart are written on the whiteboard W. In the preview screen illustrated in FIG. 33, a document image generated by the PC 6 is displayed in Region C1 and a general image captured by the camera 312 of the videoconference terminal 3a is displayed in Region C2, based on the layer display order information and the display position information associated with the image data IDs of the document image and the general image.

In other words, in the preview screen illustrated in FIG. 33, the spherical panoramic image is displayed in accordance with the current layer level "base" associated with the image data ID of the spherical panoramic image in Region C0 that corresponds to the display coordinate associated with the image data ID of the spherical panoramic image. Further, the document image is displayed in accordance the layer level "1", for example, associated with the image data ID of the document image in Region C1 that corresponds to the display coordinate associated with the image data ID of the document image. Further, the general image is displayed in accordance the layer level "2", for example, associated with the image data ID of the general image in Region C2 that corresponds to the display coordinate associated with the image data ID of the general image.

Referring to FIG. 34, operations by the user A1, A2, A3 or A4 are described, in association with steps S74 to S76 described above. First, when the user A1, A2, A3 or A4 selects the document image displayed in Region C1 (step S74), a popup dialogue box P is displayed. In the popup dialogue box, messages "Set this image to the base layer" and "Change the coordinates of this image" are displayed. The user selects "Set this image to the base layer" from the messages (step S75). In accordance with this operation, a base layer image corresponding to the layer level "base" is switched from the spherical panoramic image currently being displayed in Region C0 to the document image currently being displayed in Region C1. Any suitable message other than the above-described messages can be set and displayed, such as "bring forward" or "bring backward". Then, the user performs an operation for determining the layer display order after the change (step S76).

Referring again to FIG. 32, the data storage/read unit 39a of the videoconference terminal 3a stores the determined layer display order in the display layer management DB 3004d (step S77).

Next, the communication unit 38a transmits the IP address of the sender terminal of the image data and the layer display order information after the change to the data exchange unit 51 of the communication system 5 (step S78). The layer display order information includes the layer level after the change associated with each of the image data IDs. Thus, the data exchange unit 51 of the communication management system 5 receives the layer display order information.

Next, the data exchange unit 51 of the communication management system 5 distributes (transmits) the sender terminal IP address and the layer display order information to other communication terminals (the videoconference terminal 3d, the smartphone 9, the PC 7) participating in the same video communication in which the videoconference terminal 3a, which is the sender terminal of the layer display order information, is participating (steps S79, S81, S83). The videoconference terminal 3d receives the sender terminal IP address and the layer display order information at the data exchange unit 31d. The data storage/read unit 39d stores, in the display layer management DB 3004a, the layer display order information received in step S79 in association with the image IDs that are also received in step S79 (step S80). In substantially the same manner, the smartphone 9 receives the sender terminal IP address and the layer display order information at the data exchange unit 91. The data storage/read unit 99 stores, in the display layer management DB 9004, the layer display order information received in step S81 in association with the image IDs that are also received in step S81 (step S82). Further, the PC 7 receives the sender terminal ID address and the layer display order information at the data exchange unit 71. The data storage/read unit 79 stores, in the display layer management DB 7004, the layer display order information received in step S83 in association with the image IDs that are also received in step S83 (step S84).

Note that the initial setting process from steps S71 to S73 is executed when no association is set in the display layer management table. Therefore, the initial setting process is executed when displaying a combined image for the first time such as when starting video communication. When the changing process of the layer display order in step S73 and subsequent steps is executed twice or more, the changing process of the second and subsequent times can be executed without executing steps S71 to S72.

<Changing Display Position>

Figure 35:
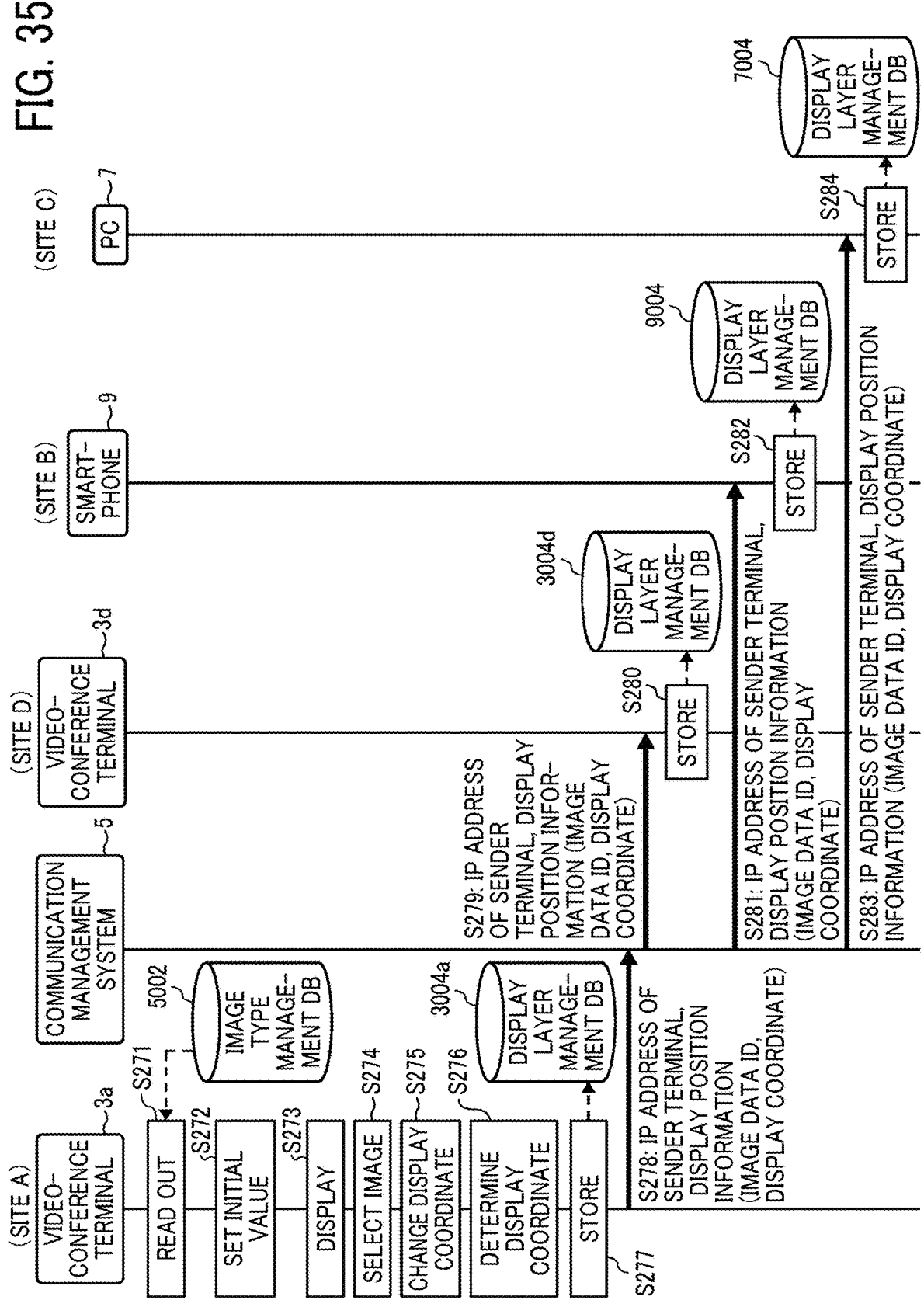
FIG. 35 is a sequence diagram illustrating an operation of sharing display position information, according to an embodiment of the present disclosure.
Figure 36:
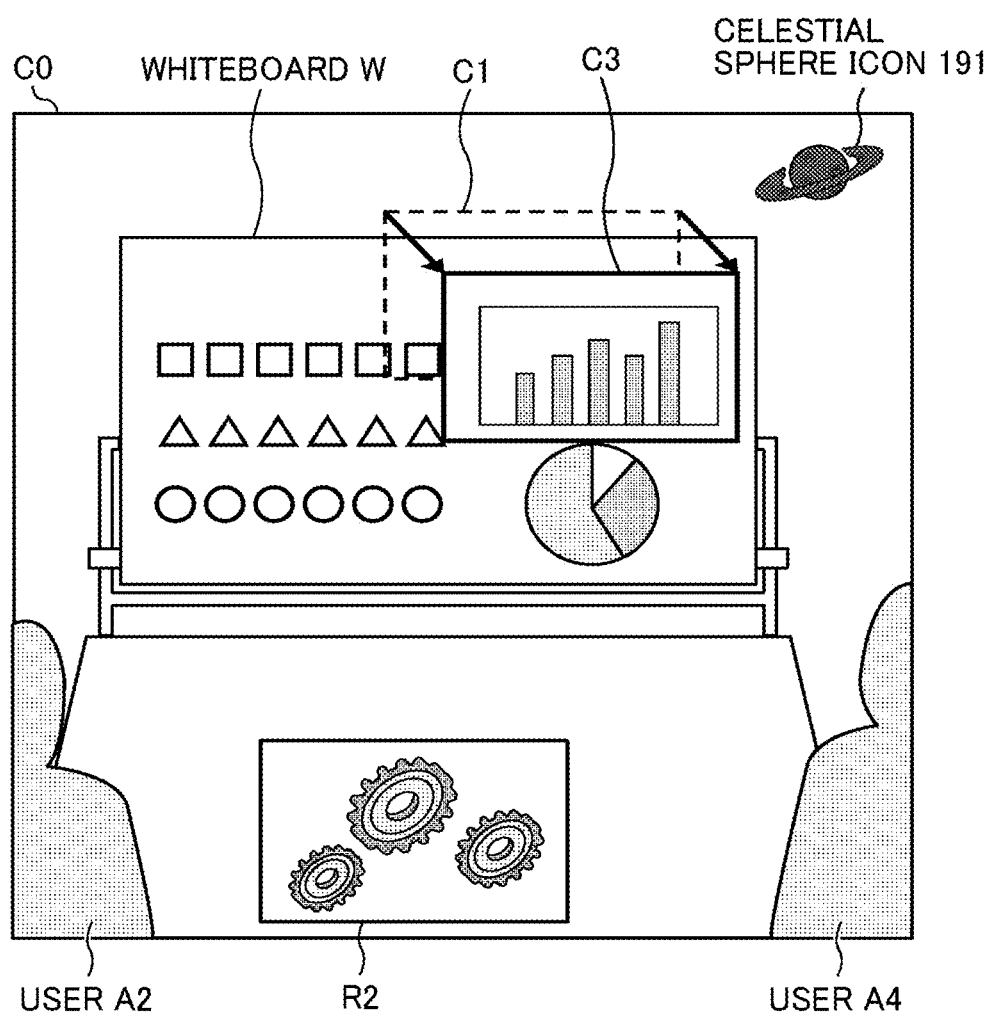
FIG. 36 is an illustration of an example of a screen displayed when changing a display position, according to an embodiment of the present disclosure.

Referring to FIG. 35 and FIG. 36, a description is now given of setting of a display position of a document image. FIG. 35 is a sequence diagram illustrating an operation performed by the image communication system. More specifically, FIG. 35 is a sequence diagram illustrating an operation performed when the videoconference terminal 3a, which is a transmission source of an image and provided in the site A, changes a display position at which a document image is to be combined with a spherical panoramic image.

First, in the operation illustrated in FIG. 35, the data storage/read unit 39a of the videoconference terminal 3a reads out image data IDs associated with the IP address of the own terminal stored in the image type management DB 5002 (step S271).

Next, the generator 36a sets an initial value of the layer display order of image data associated with the read-out image data IDs (step S272). For example, the generator 36a sets the initial value of the layer display order of the image data ID stored in the first record of the image type management DB 5002 to "base", and sets the initial values of the layer display order of the image data IDs stored in the subsequent records to sequential numbers such as "1" and "2". This layer display order set by the generator 36a is unique to each of the IP addresses of the sender terminals. In another example, the generator 36a can further set the initial values of display coordinates. For example, the generator 36a sets the display coordinate of an image corresponding to the value "base" of the layer display order, such that the image is displayed in a full screen size. Further, for example, the generator 36a sets the display coordinates of images corresponding to the value "1" and subsequent numbers of the layer display order, such that each of the images is displayed in a fixed size. Furthermore, for example, the generator 36a sets the display coordinates of an image corresponding to the value "1" of the layer display order, such that the image is displayed in the left corner of the full screen. Still further, for example, the generator 36a sets the display coordinates of images corresponding to the values of the subsequent numbers of the layer display order, such that one image corresponding to a given value of the layer display order is displayed to the right of another image corresponding to a value smaller than the given value by one.

Next, the display control unit 34a displays a combined image obtained by combining the images corresponding to the image data IDs that is read out in step S271 in accordance with the initial values set in step S272 (step S273). In a case where the display coordinates of the images are not set, the combined image is displayed in accordance with the layer display order, with the display positions of the images being arbitrary.

Next, a description is given of changing the display position. First, the receiving unit 32*a* receives selection of a document image according to an operation by the user A1, A2, A3 or A4 in the site A (step S274). For example, the user A1, A2, A3 or A4 selects the document image by right clicking, double clicking, or pressing a corresponding key on the document image displayed in a preview screen of the spherical panoramic image being distributed from the videoconference terminal 3*a* provided in the site A. In a case where a terminal including a touch panel as an input device is used, the user can select the document image by long tapping or double tapping the document image displayed in the preview screen. Next, the receiving unit 32*a* receives a change of the display position of the document image according to an operation by the user A1, A2, A3 or A4 (step S275).

Next, the receiving unit 32*a* receives determination of the display position of the document image according to an operation by the user A1, A2, A3 or A4, and the calculation unit 37*a* generates display position information (step S276). For example, the receiving unit 32*a* receives that the display position is determined automatically after the operation in step S275. In another example, the receiving unit 32*a* receives the determination of the display position according to the user operation of pressing an "Enter" button on the screen or pressing a preset key.

Referring to FIG. 34 and FIG. 36, operations by the user A1, A2, A3 or A4 are described, in association with steps S274 to S276 described above. First, when the user A1, A2, A3 or A4 selects the document image displayed in Region C1 on the preview screen as illustrated in FIG. 34 (step S274), a popup dialogue box P is displayed. In the popup dialogue box, messages "Set this image to the base layer" and "Change the coordinates of this image" are displayed. The user selects "Change the coordinates of this image" from the messages (step S275). Next, for example, as illustrated in FIG. 36, the user drags and drops the document image from Region C1 to Region C3, which is the display position after the change, to perform an operation for determining the display position after the change (step S276).

Referring again to FIG. 35, the data storage/read unit 39*a* of the videoconference terminal 3*a* stores the determined display position information in the display layer management DB 3004*d* (step S277). The communication unit 38*a* transmits, to data exchange unit 51 of the communication management system 5, the display position information after the change (step S278). The display position information includes the display coordinates after the change associated with the image data IDs. The communication management system 5 receives the display position information at the data exchange unit 51.

Next, the data exchange unit 51 of the communication management system 5 distributes (transmits) the sender terminal IP address and the display position information to other communication terminals (the videoconference terminal 3*d*, the smartphone 9, the PC 7) participating in the same video communication in which the videoconference terminal 3*a*, which is the sender terminal of the layer display order information, is participating (steps S279, S281, S283). The videoconference terminal 3*d* receives the sender terminal IP address and the display position information at the data exchange unit 31*d*. The data storage/read unit 39*d* stores, in the display layer management DB 3004*a*, the display position information received in step S279 in association with the image IDs that are also received in step S279 (step S280). In substantially the same manner, the smartphone 9 receives the display position information at the data exchange unit 91. The data storage/read unit 99 stores, in the display layer management DB 9004, the display position information received in step S281 in association with the image IDs that are also received in step S281 (step S282). Further, the PC 7 receives the sender terminal ID address and the display position information at the data exchange unit 71. The data storage/read unit 79 stores, in the display layer management DB 7004, the display position information received in step S283 in association with the image IDs that are also received in step S283 (step S284).

Note that the initial setting process from steps S271 to S273 is executed when no association is set in the display layer management table. Therefore, the initial setting process is executed when displaying a combined image for the first time such as when starting video communication. When the changing process of the display position in step S273 and subsequent steps is executed twice or more, the changing process of the second and subsequent times can be executed without executing steps S271 and S272.

<Display Process by Receiver Terminal>

Figure 37:
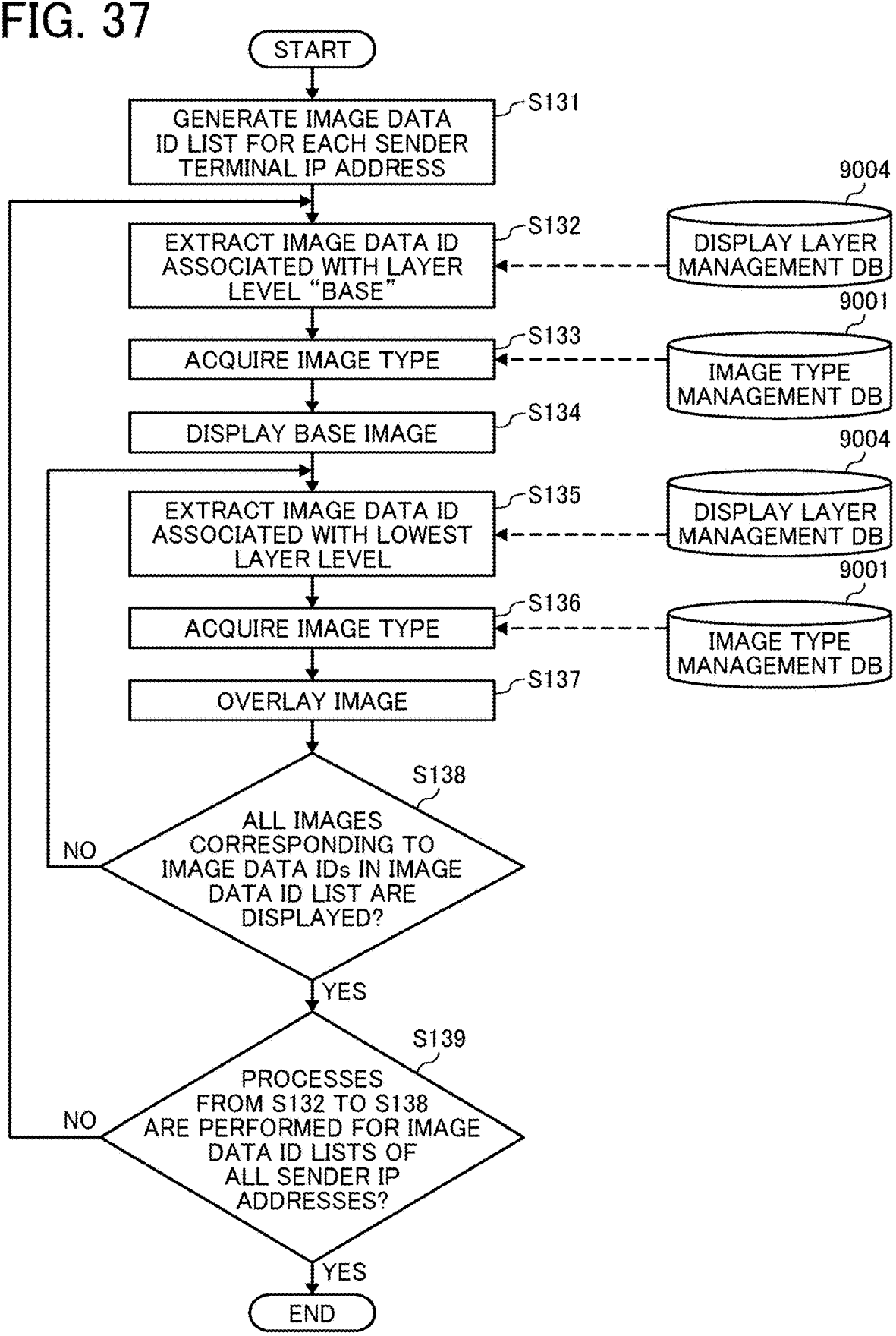
FIG. 37 is a flowchart illustrating steps in an operation of displaying an image, according to an embodiment of the present disclosure.

FIG. 37 is a flowchart illustrating steps in an operation of displaying a document image by a receiver terminal, according to the present embodiment. Since the same or the substantially the same operation is performed at each of the receiver terminals (smartphone 9, the PC 7, and videoconference terminal 3*d*), an operation performed by the smartphone 9 in the site B is described, as an example.

First, the generator 96 of the smartphone 9 generates on the RAM 903 a composite list including image data IDs associated with the same sender terminal IP address from the received sender terminal IP addresses and layer display order information (the image data IDs and the layer levels) (step S131). The smartphone 9 receives the sender terminal IP address and the layer display order information (the image data IDs and the layer levels) from the videoconference terminal 3*a* as described above in step S81 of FIG. 32. This is just one example, and the smartphone 9 successively receives the sender terminal IP address and the layer display order information from each of the communication terminals participating in the same video communication in which the smartphone 9 is participating.

Next, the data storage/read unit 99*a* extracts, from the display layer management DB 9004, an image data ID associated with the layer level "base" among the image data IDs in the generated composite list (step S132). The data storage/read unit 99*a* acquires the image type of the image data ID extracted in step S132 from the image type management DB 9001 (step S133) Then, the display control unit 94 displays an image represented by image data identified by the image data ID associated with the layer level "base" as a base layer image on the preview screen in a manner corresponding to the image type (step S134). For example, when the image type is "Video_Theta" indicating a spherical image, the display control unit 94 displays the image as described above in the <Generation of Spherical Panoramic Image> section.

Next, the data storage/read unit 99*a* extracts, from the display layer management DB 9004, another image data ID associated with the lowest layer level among the image data IDs identifying images that are not displayed yet listed in the generated composite list (step S135). The data storage/read unit 99*a* acquires the image type of the image data ID extracted in step S135 from the image type management DB 9001 (step S136).

Next, the display control unit 94 displays an image obtained by overlaying an image represented by the image data ID extracted in step S136 on the base layer image (step S137) in a manner corresponding to the image type. In this step, in a region where display positions of the overlaid images overlap with each other, an image having the highest layer level is displayed.

Next, the determination unit 95 determines whether images represented by all the image data IDs in the image data ID list have been displayed (step S138). The processes from step S135 to step S137 are repeated until the images represented by all the image data IDs are displayed. When the display of the images represented by all the image data IDs is completed, the determination unit 95 determines whether the processes from step S132 to step S138 are completed with respect to all the sender terminal IP addresses (step S139). The processes from step S132 to step S138 are repeated until the processes are performed with respect to all the sender terminal IP addresses. When the processes are completed with respect to all the sender terminal IP addresses, the operation of FIG. 37 ends.

Figure 38:
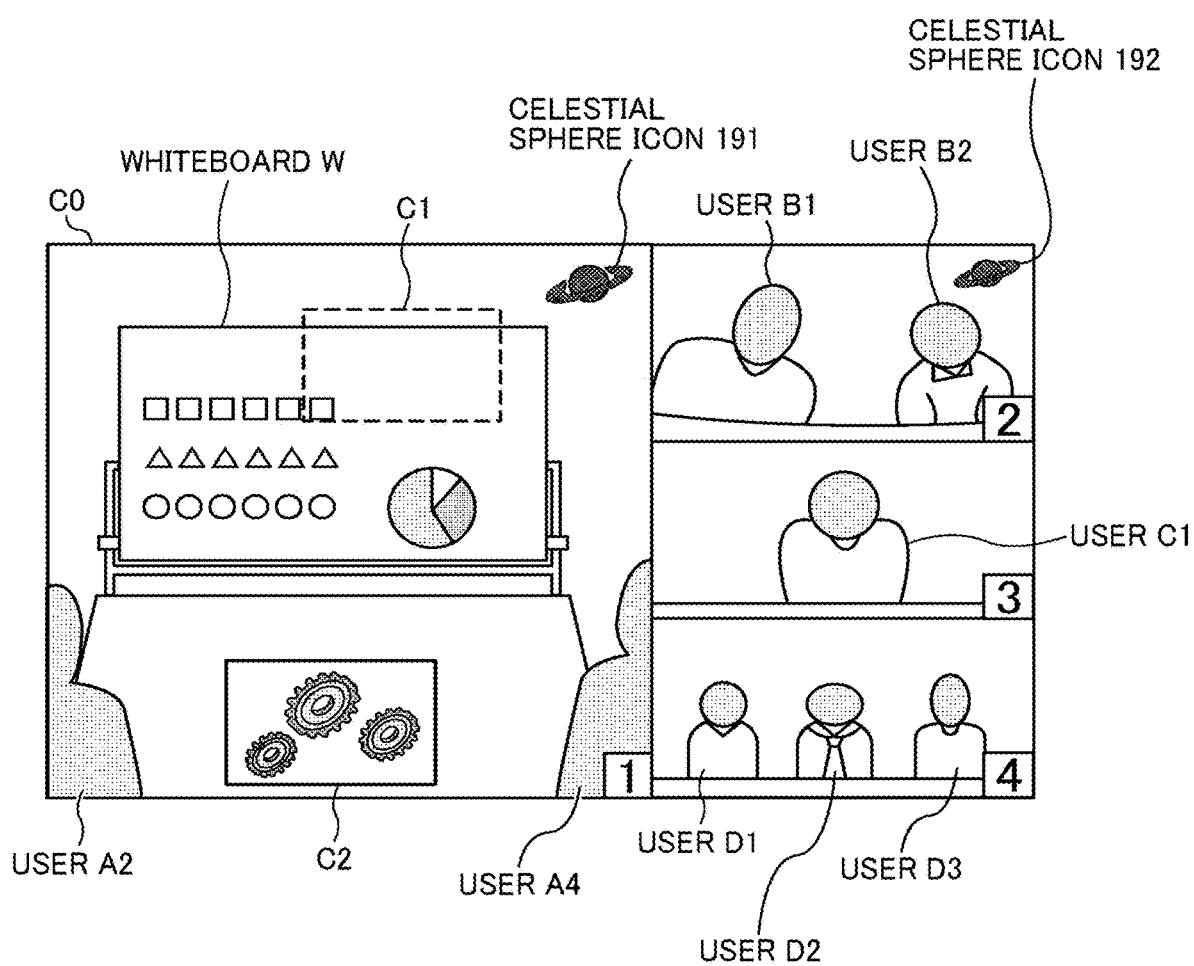
FIG. 38 is an illustration of an example of a screen displayed in one site after execution of a layer display order changing process, according to an embodiment of the present disclosure.

FIG. 38 is a diagram illustrating an example of a display screen displayed by the smartphone 9 provided in the site B after the changing process of the layer display order described with reference to FIG. 34 is performed. As illustrated in FIG. 38, the smartphone 9 provided in the site B displays the combined image in which the images are combined in the layer display order changed by the videoconference terminal 3a provided in the site A as described above with reference to FIG. 34. The document image that was displayed in Region C1 as illustrated in FIG. 34 before the changing process of the layer display order is changed to the base layer image. Accordingly, the document image is sent to back and gets invisible as being behind all other images.

As described above, the layer display order information that is changed by the videoconference terminal 3a provided in the site A is transmitted to the other communication terminals (the smartphone 9, the PC7, the videoconference terminal 3d) provided in the other sites B, C and D which are participating in the same video communication. Accordingly, the document image is displayed by the other communication terminal provided in the other sites B, C and D in the same layer level as the videoconference terminal 3a provided in the site A.

Figure 39:
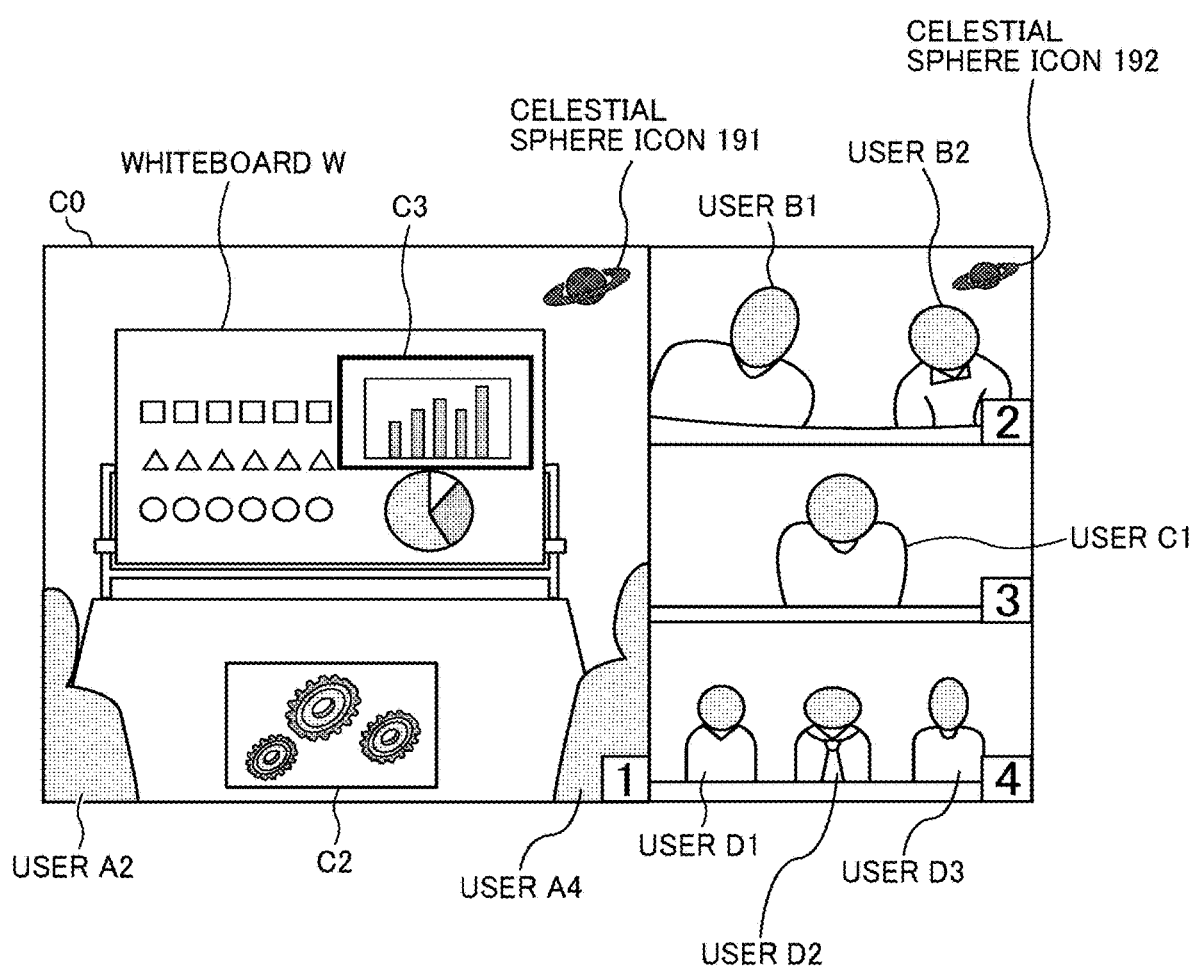
FIG. 39 is an illustration of an example of a screen displayed in one site after execution of a display position changing process, according to an embodiment of the present disclosure.

FIG. 39 is a diagram illustrating an example of a display screen displayed by the smartphone 9 provided in the site B after the changing process of the display position described with reference to FIG. 36 is performed. As illustrated in FIG. 39, the smartphone 9 provided in the site B displays the combined image in which the images are positioned in the display positions changed by the videoconference terminal 3a provided in the site A as described above with reference to FIG. 36. The document image that was displayed in Region C1 as illustrated in FIG. 34 before the process of changing the display position is displayed in Region C3.

As described above, the display position information that is changed by the videoconference terminal 3a provided in the site A is transmitted to the other communication terminals (the smartphone 9, the PC7, the videoconference terminal 3d) provided in the other sites B, C and D which are participating in the same video communication. Accordingly, the document image is displayed by the other communication terminal provided in the other sites B, C and D in the same display position as the videoconference terminal 3a provided in the site A.

As described heretofore, the communication terminal, such as the videoconference terminal 3a, according to one or more of the embodiments, generates a spherical panoramic image and a predetermined-area image based on image type information associated with the image data ID transmitted with image data. This prevents the front-side hemispherical image and the back-side hemispherical image from being displayed as illustrated in FIG. 29A.

In the related art, when causing a terminal on the receiving side to display a plurality of images, a terminal on the transmission side cannot change a layer display order of the plurality of images. For this reason, the plurality of images are displayed as being overlaid one above the other in a relative front-back order that is different from the one intended by the sender side. Interference of the plurality of images makes it difficult for a user to view and recognize the images in a conference system or the like.

According to one or more embodiments of the present disclosure, in a remote conference system in which a receiver communication terminal displays a plurality of images received from other communication terminal(s), a layer display order can be changed when the plurality of images are displayed as being overlaid with one another in a relative front-back order that is different from the one intended by a sender, and/or when one wants to change the relative front-back order of the plurality of images during the remote conference. Accordingly, when the plurality of images are displayed as being overlaid with one another in the relative front-back order that is different from the one intended by the sender, and/or when one wants to change the relative front-back order of the plurality of images, the plurality of images are made more suitable for viewing and easier to recognize by changing the layer display order.

In the above-described embodiment, a captured image (whole image) is a three-dimensional spherical panoramic image, as an example of a panoramic image, which is a destination image on which another image is to be superimposed. In another example, the captured image can be a two-dimensional panoramic image. For example, the spherical panoramic image can be a wide-angle view image having an angle of about 180 to 360 degrees in the horizontal direction. In addition, in this disclosure, the spherical image does not have to be a full-view spherical image.

Further, in the above-described embodiments, the communication management system 5 transfers the predetermined-area information transmitted from each communication terminal. In another example, each communication terminal can directly transmit or receive the predetermined-area information from or to any one or more of the other communication terminals.

Each of the functions of the above-described embodiments may be implemented by one or more processing circuits or circuitry. The processing circuitry includes a programmed processor, as a processor includes circuitry. A processing circuit also includes devices such as an application specific integrated circuit (ASIC), a digital signal processor (DSP), a field programmable gate array (FPGA), a system on a chip (SOC), a graphics processing unit (GPU), and conventional circuit components arranged to perform the recited functions.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

Any one of the above-described operations may be performed in various other ways, for example, in an order different from the one described above.

What is claimed is:

1. An image data communication system, comprising:
a first communication terminal including first circuitry; and
a second communication terminal including second circuitry,
the first circuitry of the first communication terminal being configured to transmit a plurality of pieces of image data and layer display order information indicating a layer display order in which a plurality of images represented by the plurality of pieces of image data are to be displayed on different overlapping layer levels on a same overall display region such that when a region where display positions of at least two of the plurality of images overlap with each other, an image from the at least two of the plurality of images with a highest layer level is visible in the region,
the second circuitry of the second communication terminal being configured to display the plurality of images represented by the plurality of pieces of image data transmitted from the first communication terminal in the layer display order based on the layer display order information transmitted from the first communication terminal.

2. The image data communication system of claim 1, wherein the second circuitry of the second communication terminal is further configured to perform image processing of displaying the plurality of images based on the layer display order information.

3. The image data communication system of claim 1, wherein the first circuitry of the first communication terminal is further configured to:
receive a setting of the layer display order; and
transmit the layer display order information after the setting.

4. The image data communication system of claim 1, wherein the plurality of pieces of image data include captured-image data and document image data.

5. The image data communication system of claim 4, wherein an image represented by the captured-image data is a spherical panoramic image.

6. A communication terminal, comprising circuitry to:
receive a setting of a layer display order in which a plurality of images represented by a plurality of pieces of image data are to be displayed; and
transmit, to another communication terminal, the plurality of pieces of image data and layer display order information, which is information indicating the layer display order, for which the setting is received, in which a plurality of images represented by the plurality of pieces of image data are to be displayed on different overlapping layer levels on a same overall display region such that when a region where display positions of at least two of the plurality of images overlap with each other, an image from the at least two of the plurality of images with a highest layer level is visible in the region,
wherein the another communication terminal is caused to display the transmitted plurality of images in the layer display order based on the transmitted layer display order information.

7. The communication terminal of claim 6,
wherein the plurality of pieces of image data include captured-image data and document image data.

8. The communication terminal of claim 7,
wherein an image represented by the captured-image data is a spherical panoramic image.

9. An image data communication system, comprising:
the communication terminal of claim 6;
the another communication terminal; and
a communication management system configured to control communication of image data between the communication terminal and the another communication terminal.

10. The image data communication system of claim 9,
wherein the another communication terminal comprises circuitry to:
receive the plurality of pieces of image data and the layer display order information transmitted from the communication terminal;
overlaying the plurality of images with each other in an order indicated by the layer display order information; and
display an image obtained by overlaying the plurality of images with each other.

11. A method of communicating a plurality of pieces of image data by a communication terminal, the method comprising:
receiving a setting of a layer display order in which a plurality of images represented by the plurality of pieces of image data are to be displayed on different overlapping layer levels on a same overall display region such that when a region where display positions of at least two of the plurality of images overlap with each other, an image from the at least two of the plurality of images with a highest layer level is visible in the region; and
transmitting, to another communication terminal, the plurality of pieces of image data and layer display order information, which is information indicating the layer display order for which the setting is received.

* * * * *